United States Patent [19]
Norita et al.

[11] Patent Number: 5,668,631
[45] Date of Patent: Sep. 16, 1997

[54] MEASURING SYSTEM WITH IMPROVED METHOD OF READING IMAGE DATA OF AN OBJECT

[75] Inventors: Toshio Norita, Mishima-Gun; Fumiya Yagi, Ibaraki; Satoru Hirose, Tondahayashi, all of Japan

[73] Assignee: Minolta Co., Ltd., Osaka, Japan

[21] Appl. No.: 358,306

[22] Filed: Dec. 19, 1994

[30] Foreign Application Priority Data

Dec. 20, 1993 [JP] Japan .................. 5-320245
Dec. 20, 1993 [JP] Japan .................. 5-320246
Dec. 20, 1993 [JP] Japan .................. 5-320247
Jun. 15, 1994 [JP] Japan .................. 6-132998

[51] Int. Cl.⁶ ............................................ G01B 11/24
[52] U.S. Cl. ................ 356/376; 250/559.22; 359/213
[58] Field of Search .......................... 356/372, 375, 356/376; 250/201.2, 559.23, 559.22, 559.31, 236; 359/213

[56] References Cited

U.S. PATENT DOCUMENTS

| | | | |
|---|---|---|---|
| 4,758,093 | 7/1988 | Stern et al. | 356/376 |
| 4,794,262 | 12/1988 | Sato et al. | 356/376 |
| 4,882,490 | 11/1989 | Takasaki et al. | 359/213 |
| 4,939,379 | 7/1990 | Horn | 356/376 |
| 5,024,529 | 6/1991 | Svetkoff et al. | 356/376 |
| 5,175,595 | 12/1992 | Fukase | 356/387 |
| 5,362,958 | 11/1994 | Ando | 250/201.2 |

FOREIGN PATENT DOCUMENTS

| | | |
|---|---|---|
| 57-157107 | 9/1982 | Japan . |
| 3-209112 | 9/1991 | Japan . |
| 4-83133 | 3/1992 | Japan . |
| 4-259809 | 9/1992 | Japan . |
| 5-196432 | 8/1993 | Japan . |

*Primary Examiner*—Hoa Q. Pham
*Attorney, Agent, or Firm*—Burns, Doane, Swecker & Mathis, LLP

[57] ABSTRACT

When a scanning start position set signal is input in an area image sensor, the content is transferred to a vertical scanning circuit, and the scan start position is set. Image of a desired row is read by horizontal scanning. Then, one shift signal for vertical scanning is input, the position of scanning is shifted by one row, and horizontal scanning is performed. Thus image of the next row is read. By repeating this operation, a desired strip-shaped image is read. The shape of the object is determined and when a portion is determined to have complicated shape, the image data is input by means of a lens having long focal length, and image data of other portions are input by means of a lens having short focal length. By putting together a plurality of input image data, image data as a whole is generated.

32 Claims, 62 Drawing Sheets

FIG.26
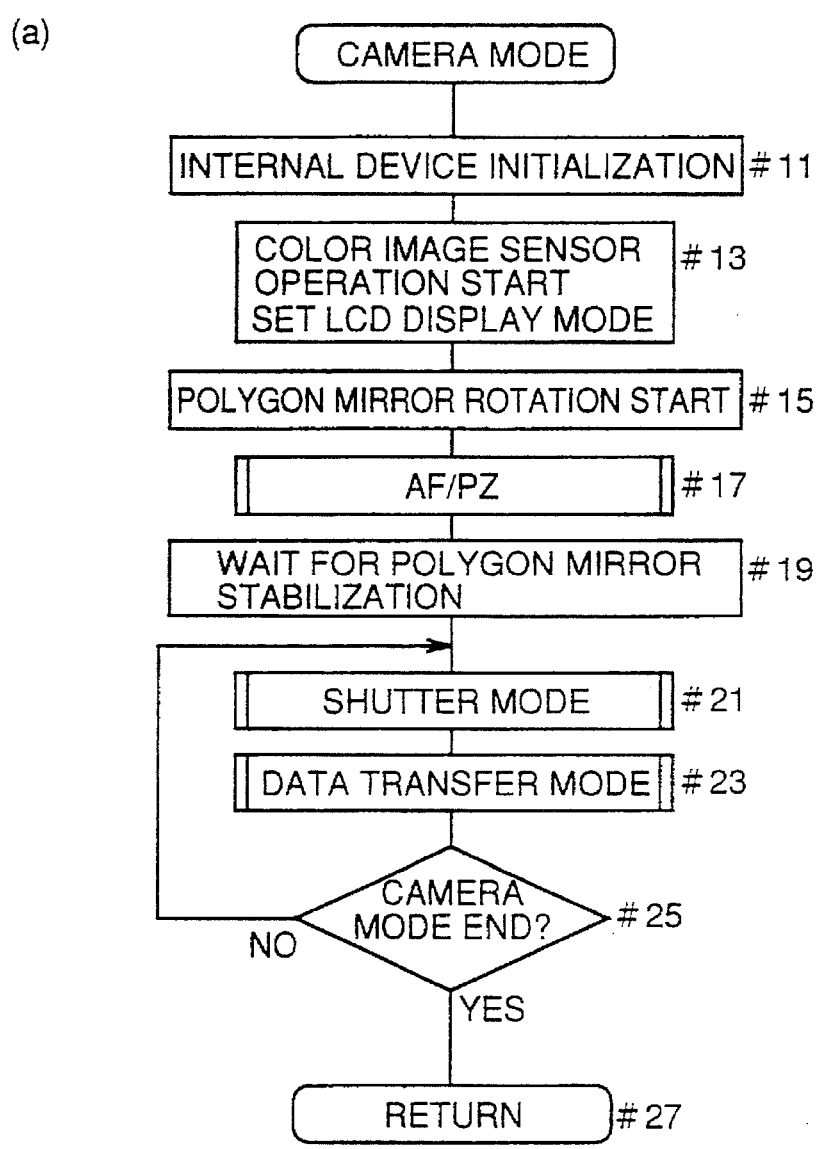
(a)
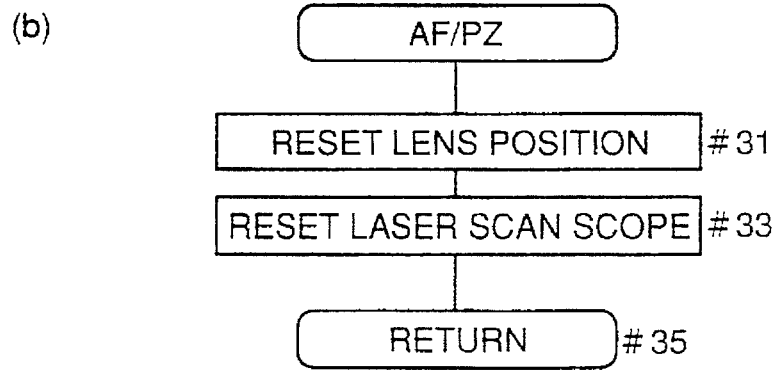
(b)

FIG.32
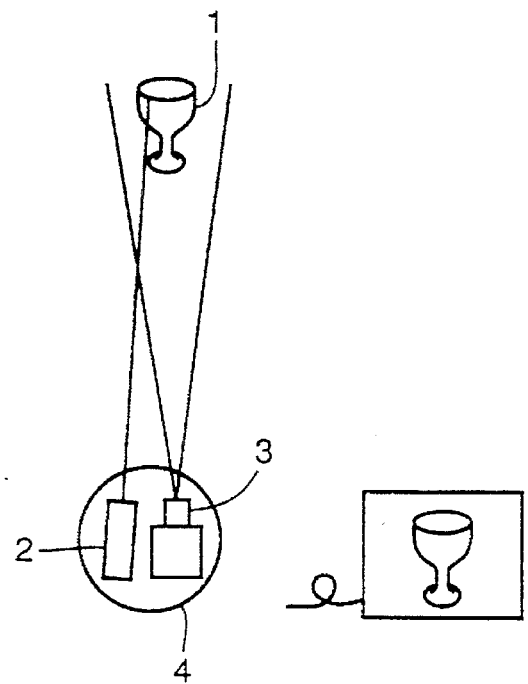
(a)
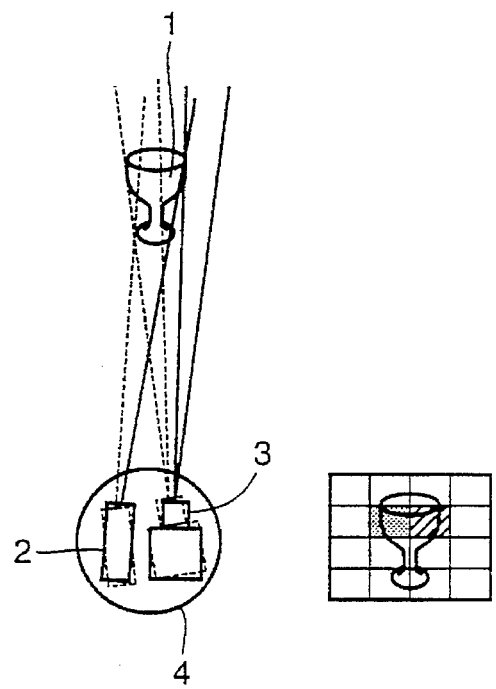
(b)

FIG.38
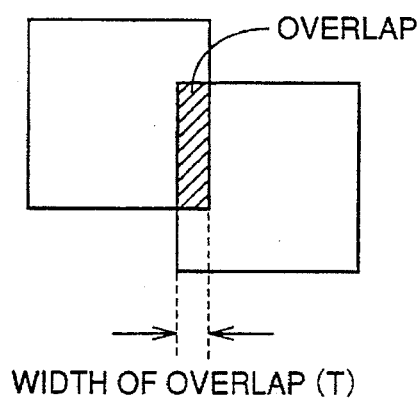
FIG.39
(a) 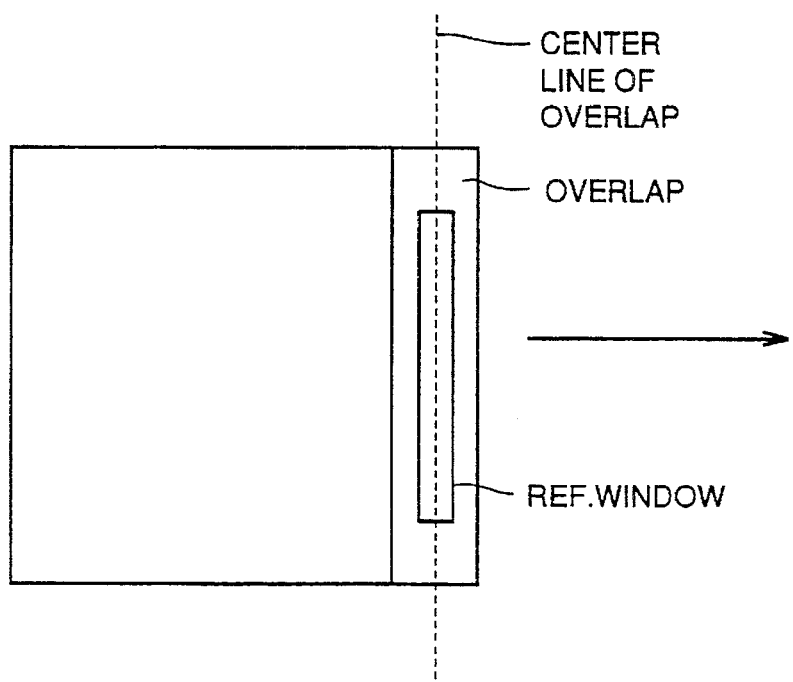  (b) 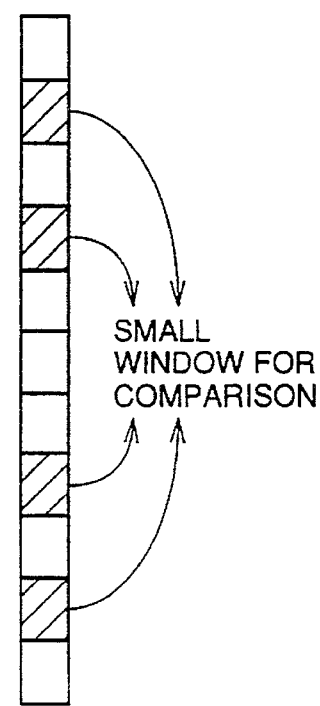

(a)

(b)

BOUNDARY

FIG.72
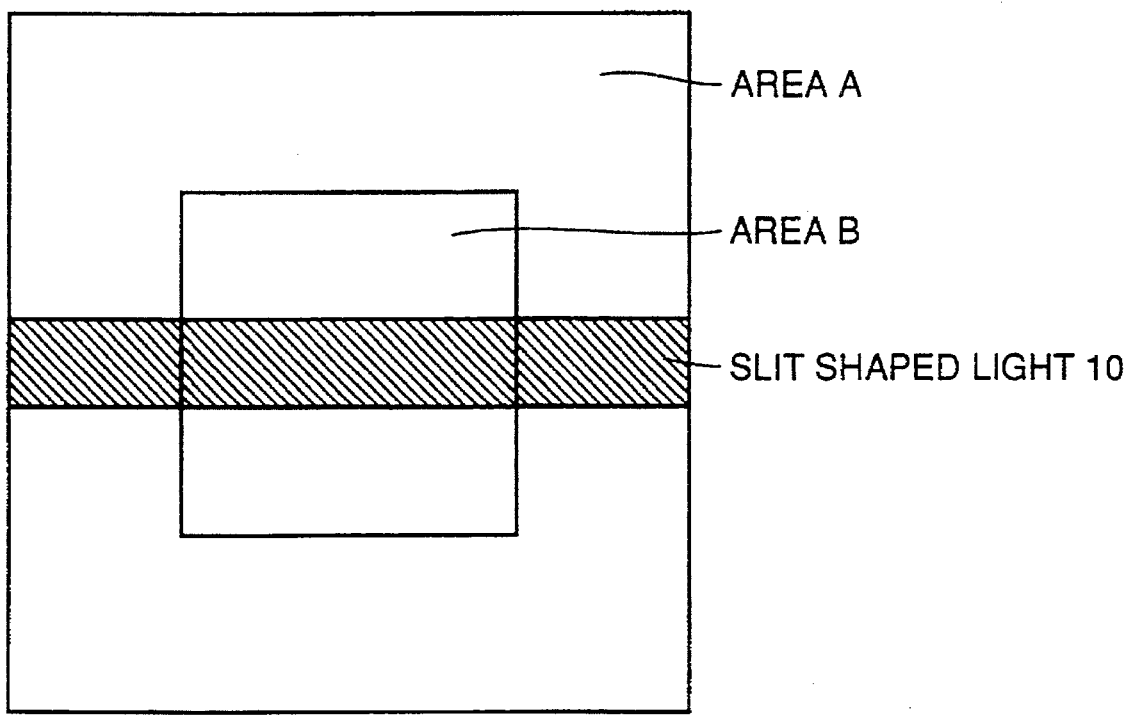
FIG.73
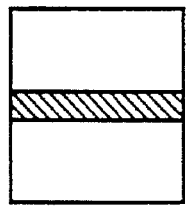
(a)
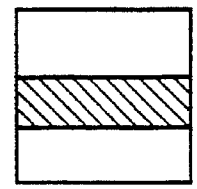
(b)

COLLIMATOR LENS    CYLINDRICAL LENS (A)

AREA A

AREA B

5,668,631

MEASURING SYSTEM WITH IMPROVED METHOD OF READING IMAGE DATA OF AN OBJECT

BACKGROUND OF THE INVENTION

1. Field of the Invention

The present invention relates to a measuring system and, more specifically, to a measuring system for measuring a three-dimensional shape of an object.

2. Description of the Related Art

Use of light-section method for measuring a three-dimensional shape of an object has been proposed. Light-section method is based on projection of slit shaped light on a surface of an object, and photographing the light reflected therefrom by using an area sensor, as shown in FIG. 56 (details will be described later). A spatial coordinate of a point p of the object corresponding to one point q of the photographed image is calculated as the coordinate of an intersection point of a plane S formed by the slit shaped light and a line connecting the point q and the center O of the taking lens. Since the spatial coordinate of each point of the object surface irradiated by the slit shaped light can be calculated by using one slit shaped light, information of three-dimensional shape of the object as a whole can be obtained by repeating image input while scanning the object with the slit shaped light moved in a direction vertical to the longitudinal direction of the slit.

However, in the above described apparatus, control of the slit shaped light, relation between arrangement of the area sensor and the slit shaped light, measurement output, patch up of a plurality of input images and so on are not sufficiently considered.

SUMMARY OF THE INVENTION

An object of the present invention is to provide a measuring system in which specific considerations of control of the slit shaped light, relation between the arrangement of the area sensor and the slit shaped light, measurement output, patch up of a plurality of input images and so on are sufficiently made.

One of the above described object is attained by the measuring system of the present invention including a light projector which projects a slit shaped light toward an object, and an area sensor which receives light including the slit shaped light reflected on the object, the area sensor outputting signals from only a particular area including the reflected slit shaped light.

In the measuring system structured as described above, signals are output only from a particular area, and therefore compared with a system in which entire area of the area sensor is read, image can be read in a considerably short period of time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 26(a–b) are a flow chart showing the operation of a camera mode shown in FIG. 25.

FIGS. 32(a–b) are an illustration of image patch up function in accordance with the first embodiment of the present invention.

FIG. 38 is an illustration of the overlapping portions for patching up two-dimensional images in accordance with the second embodiment of the present invention.

FIGS. 39(a–b) are an illustration of a reference window for patching two-dimensional images in accordance with the second embodiment of the present invention.

FIG. 72 shows a object caused when the width of the slit shaped light is not changed in the seventh embodiment of the present invention.

FIGS. 73(a–b) show a object caused when the width of the slit shaped light is not changed in the seventh embodiment of the present invention.

DESCRIPTION OF THE PREFERRED EMBODIMENTS

Figure 2:
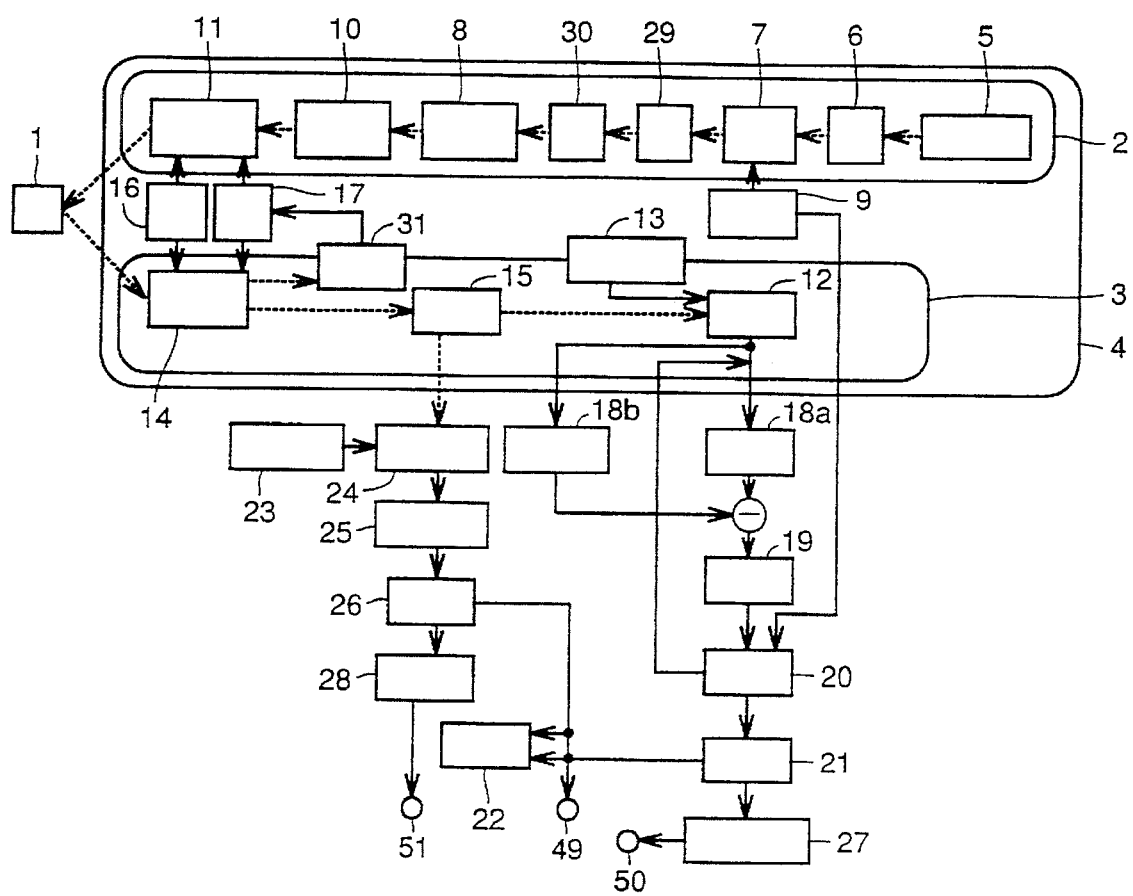
FIG. 2 is a schematic block diagram of the whole apparatus in accordance with the first embodiment of the present invention.

A first embodiment of the present invention will be described with reference to the figures. FIG. 2 is a schematical block diagram of the entire apparatus in accordance with the present invention. Briefly stated, the apparatus of the present invention includes a light projecting optical system 2 for irradiating an object 1 with laser beam, which is output from a semiconductor laser 5 and turned into a slit shaped light, and a light receiving optical system 3 for guiding the projected laser beam to imaging sensors 24 and 12. These optical systems 2 and 3 are arranged on a same rotary frame 4. In addition to the optical systems, the apparatus includes a signal processing system for processing a signal output from a sensor for generating pitch-shifted images (details will be described later) and color images, and a recording device for recording the generated images. In FIG. 2, solid arrows denote flow of electric signals such as image signals, control signals and so on, while dotted arrows denote the flow of projected light. Details of these optical systems will be given later.

An outline of the signal processing system will be described. With respect to an image obtained by distance image sensor 12, subtraction between image 18a when slit shaped light is projected and image 18b when slit shaped light is not projected is performed, and calculation of the position of centroid of the incident light 19, calculation of pitch-shift information 20 and pitch-shift image generating process 21 are performed on the image. The obtained pitch-shifted image is utilized as an output to an output terminal 50 after NTSC conversion 27, or as digital information to be transferred to an SCSI terminal 49 or an internal recording device 22. The image obtained by a color image sensor 24 is subjected to analog processing 25 and then to color image generating process 26. The resulting color image is utilized as an output to an output terminal 51 after NTSC conversion 28, or as digital information to be transferred to SCSI terminal 49 or recording device 22.

Figure 3:
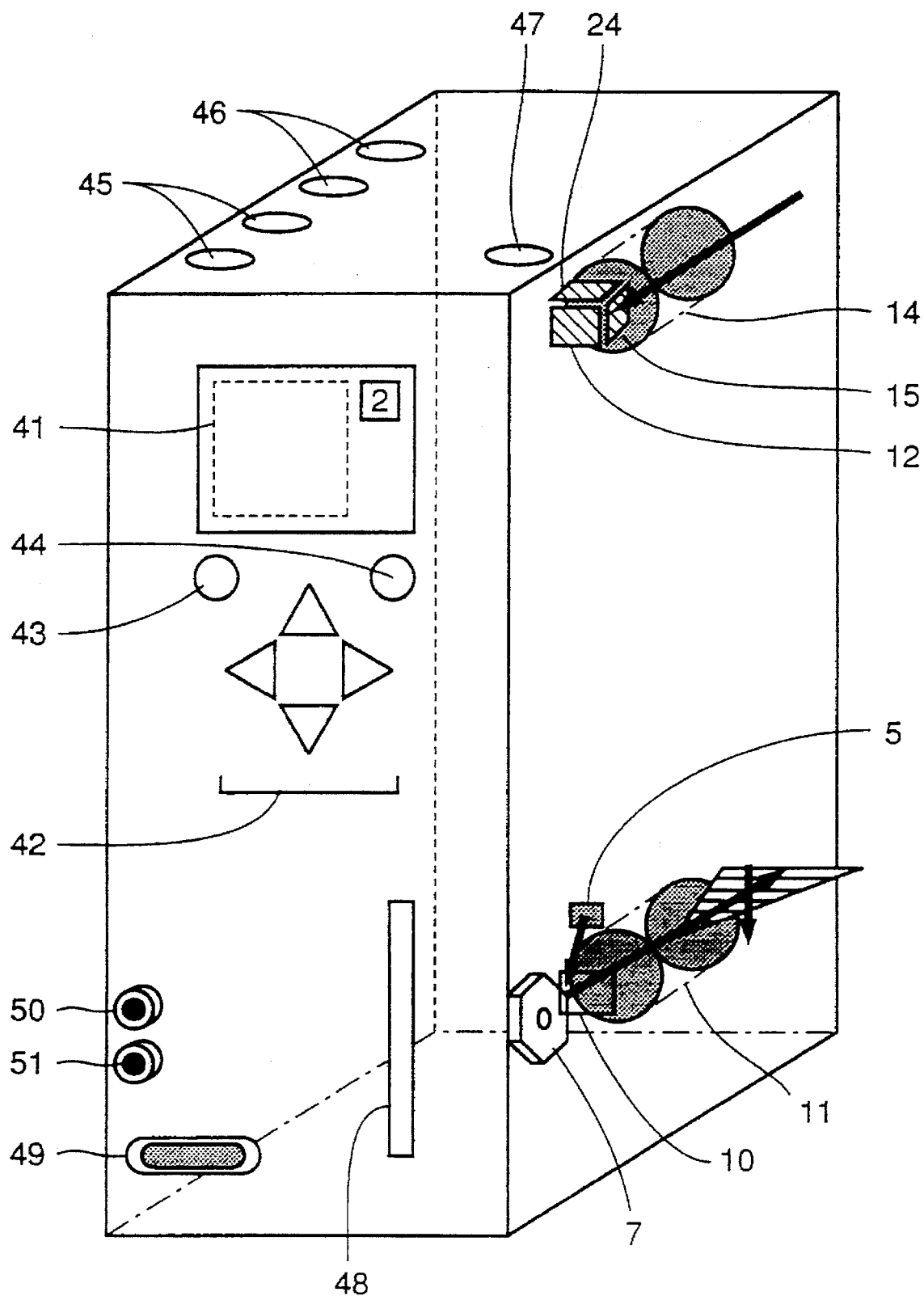
FIG. 3 is a perspective view showing a schematic structure of the whole apparatus in accordance with the first embodiment of the present invention.

FIG. 3 is a perspective view showing the schematic structure of the whole apparatus.

In this embodiment, a generating system for distance image having 256 points of distance information in the lengthwise direction of the slit shaped light and 324 points of distance information in the scanning direction of the slit will be described as an example. An LCD monitor 41 provides display of a color image formed by color image sensor 24, pitch-shifted image stored in an internal or external recording device, various other information, menu for selection, and so on. A cursor key 42, a select key 43 and a cancel key 44 are operating members for setting, for example, various modes from the menu, or for selecting images. A zoom button 45 is provided for changing focal length of the light projecting/light receiving optical systems. An MF button 46 is for manual focusing. A shutter button 47 is for taking a distance image when turned ON in a shutter mode, which will be described later. A drive 48 such as an internal magnet-optic disc (hereinafter referred to as MO), a mini disc (hereinafter referred to as MD) is provided as the storage apparatus for the picked up image. A terminal 49 is, for example, an SCSI terminal for digital input/output of signals of images and the like. A pitched-shifted image output terminal 50 and a color image output terminal 51 are provided for outputting images in the form of analog signals, and the images are provided as NTSC video signals, for example.

The light projecting optical system scans the object by moving a horizontally elongate slit shaped light in upward and downward directions, and the light beam from semiconductor laser 5 is directed to the object through a rotating polygon mirror 7, a condenser lens 10, a light directing zoom lens 11 and so on. The light receiving optical system picks up an image by means of a light receiving zoom lens 14, a beam splitter 15 and so on, and further by a distance image sensor 12 and a color image sensor 24 arranged on a light receiving image pickup plane. Details of the optical systems and the imaging system will be given later.

The slit shaped light from the light projecting system is moved downward one pixel pitch by one pixel pitch of the distance image sensor 12, by means of constantly rotating polygon mirror 7, while distance image sensor 12 accumulates one image. The distance image sensor scans the accumulated image information, provides an output, and performs accumulation of the next image. From the image provided at one input, distance information of 256 points in the lengthwise direction of the slit shaped light can be calculated. Further, by repeating the mirror scanning and taking of images 324 times, a distance image consisting of 256×324 points is generated.

Figure 17:
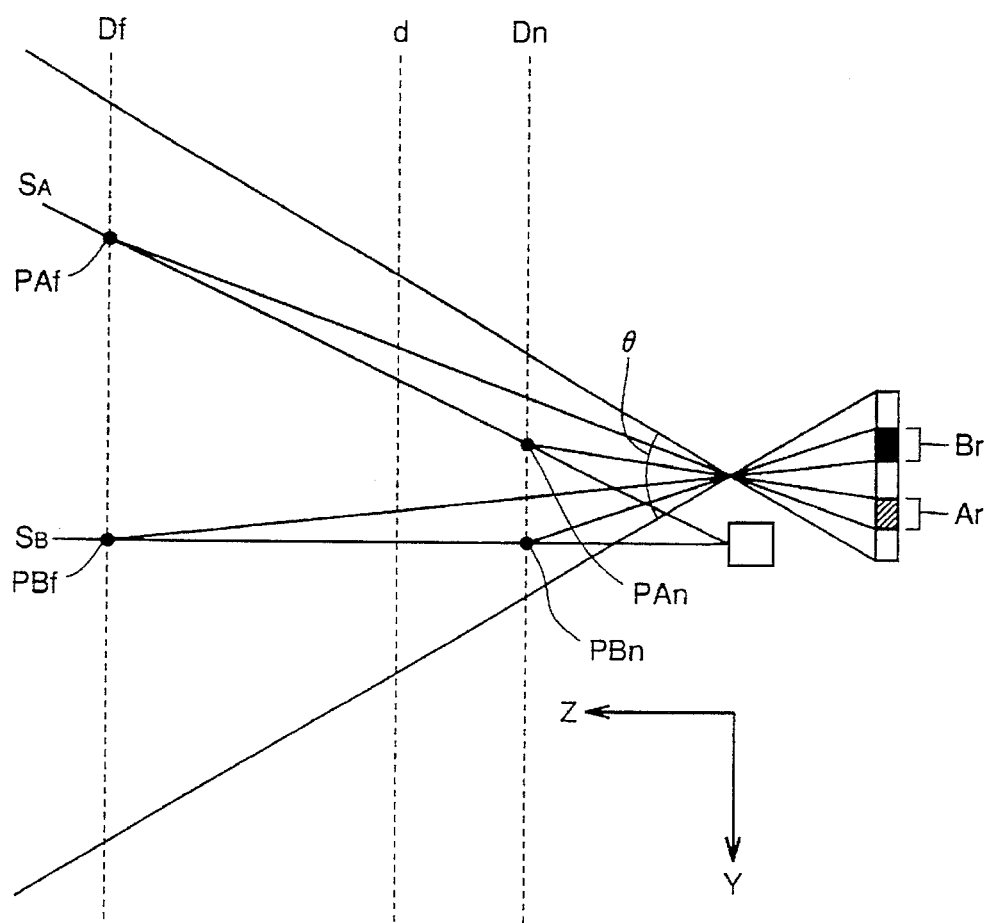
FIG. 17 shows scope of reflected light incident on the photographing device and the scope of scanning, in accordance with the first embodiment of the present invention.

As for the distance range to the object measured by one slit shaped light, the minimum and maximum measurement distances are limited, and therefore the range of incident light which is the slit shaped light reflected by the object and entering the image pickup device is limited within a certain range. This is because the light projecting system and the light receiving system are arranged apart from each other by a base length (length:1). This is illustrated in FIG. 17 in which Z axis represents a direction verticle to the image pickup plane for the distance image. The position of the dotted line d is a reference plane for measurement, and the distance from the plane of the device corresponds to d.

Figure 4:
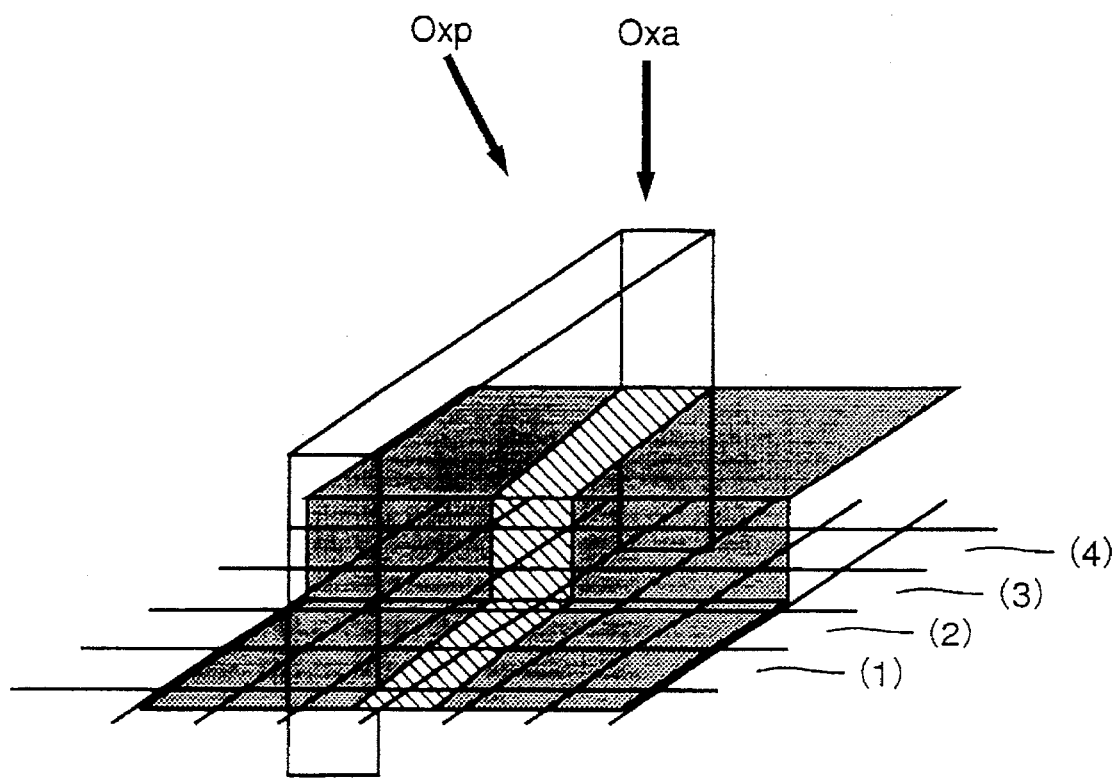
FIG. 4 is an illustration of light intensity distribution generated at the plane of the object in the first embodiment of the present invention.

Therefore, in the measuring apparatus, the position of the centroid of the laser beam received at 256 lines is calculated based on the input image. More specifically, the position of the centroid is calculated as the amount of deviation from the reference plane for measurement, that is determined based on an object distance output from an auto focus unit and direction of the projected slit shaped light, that is, the time from the start of scanning. The calculation of the amount of pitch shift will be described with reference to FIG. 4. FIG. 4 shows light intensity distribution generated by the slit shaped light directed to the object. The sections at the lower portion of the figure represent areas monitored by each of the elements of the distance image sensor. These sections have numbers 1, 2, 3, 4, . . . allotted thereto, starting from the front side. A slit shaped light having very narrow slit width is moved for scanning only by 1 pitch of the distance image sensor by the rotation of polygon mirror 7 while one image is accumulated. Therefore, the light intensity distribution when one image is input corresponds to a rectangular light intensity distribution of which width corresponds to 1 pitch of the distance image sensor.

In order to calculate distance information in the direction of the Z axis for each pixel of the distance image sensor, such a rectangular light intensity distribution having the width of 1 pitch is desirable. When the width of the light intensity distribution becomes wider than 1 pitch, the distance information measured would be calculated as weighted mean of the intensity of light received at adjacent areas, and hence correct distance information would not be obtained.

Figure 5:
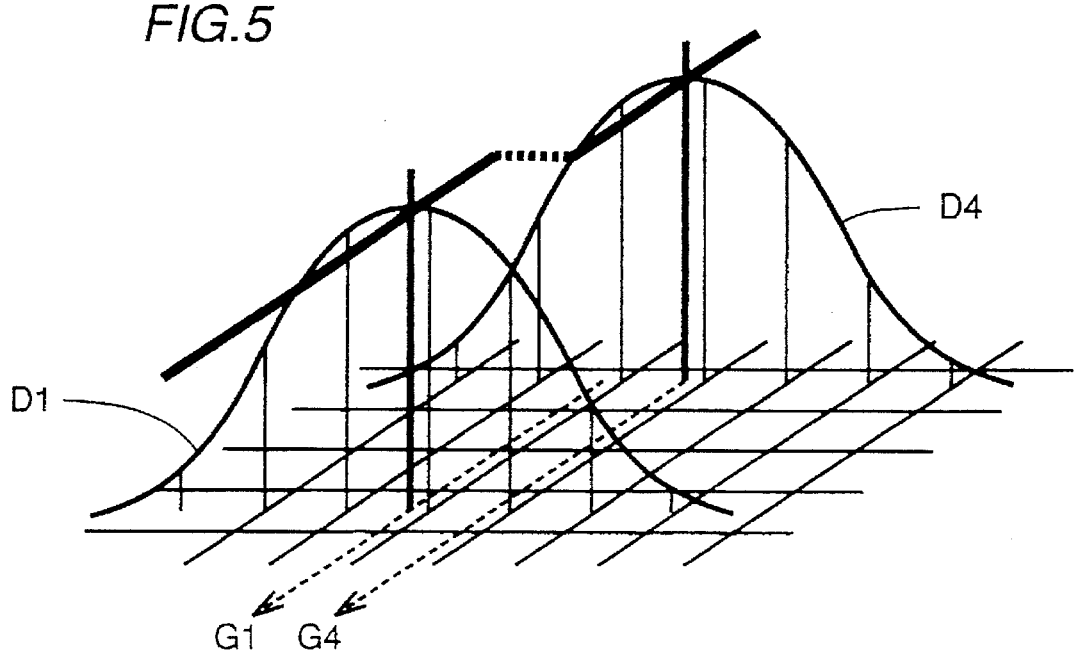
FIG. 5 is an illustration of the light intensity distribution generated at the light receiving plane of the photographing device in accordance with the first embodiment of the present invention.

Assume that there is a step-shaped object surface such as represented by the dot in FIG. 4, and a slit shaped light is directed from a direction vertical to the plane of the object. The thin rectangular parallelepiped represents the light intensity distribution of the slit shaped light and the hatched area represents the slit-shaped image irradiated by the light beam. When we assume a positional relation in which an optical axis Oxp of the light receiving optical system is provided inclined to the left from an optical axis Oxa of the light projecting system, the light intensity distribution of the received slit shaped light at the light receiving plane would be as shown in FIG. 5, because of a filter, which will be described later. It is desirable to remove fixed light component other than the laser beam component so that the fixed light component is not included in the receive light intensity. For this purpose, an image irradiated with the laser beam and an image not irradiated with the laser beam are both input, and the difference therebetween is used. The sections at the lower portion represent respective element regions of the distance image sensor. In front of the distance image sensor, there is provided an anisotropic optical filter which does not degrade resolution in the lengthwise direction of the received slit shaped light but degrades the resolution in the widthwise direction of the slit shaped light, and by means of this filter, the light intensity having such a Gaussian distribution as shown in FIG. 5 results. With respect to this light intensity distribution, by calculating the centroid of the light intensity distribution from respective sensors for columns 1, 2, 3, 4, . . . , the position at which the light is received can be calculated with higher resolution than the pixel pitch. The reason why the width of the slit shaped light incident on the sensor is not narrowed but selected to have the width of about 5 to 6 pixels by using a filter for detecting the position at which the slit shaped light is received is that when the width of the incident slit shaped light becomes narrower than the width of one pixel, the resolution for detecting the position could be at most the same as the pixel pitch.

Figure 6:
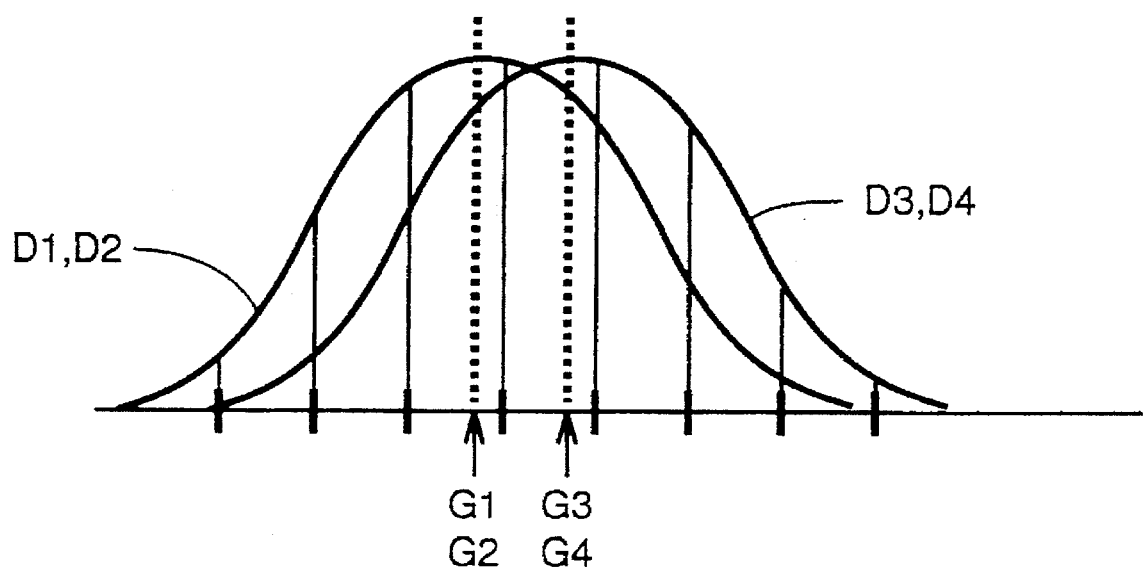
FIG. 6 is an illustration of the light intensity distribution generated at the light receiving plane of the photographing device in accordance with the first embodiment of the present invention.

Based on the light intensity distribution D1 received by the first column, the position G1 of the centroid of the first column is calculated. In the similar manner, the positions G2, G3, G4, . . . of centroid of the second, third, fourth and the following columns are calculated, and thus the centroid of each column is calculated. As shown in the figure, the optical axis of the light projecting system is vertical to the plane of the object. However, the optical axis of the light receiving system is inclined to the left. Therefore, when the object has a step as shown in FIG. 4, the centroid of the higher portion (third and fourth columns) is positioned shifted to the right, with respect to the centroid of the lower portion (first and second columns). Though the distribution D1 of the first column and distribution D4 of the fourth column only are shown in FIG. 5, the distribution D2 of the second column is the same as the distribution D1 of the first column, and the distribution D3 of the third column is the same as the distribution D4 of the fourth column. The relation between the light intensity distribution and the positions of the centroid is represented two dimensionally in FIG. 6. Since the distributions of the first and second columns are the same, the calculated center of gravities G1 and G2 are detected as the same position and since the distributions of the third and fourth columns are the same, the calculated center of gravities G3 and G4 are detected as the same position.

In this manner, from a slit-shaped image corresponding to one slit, positions of the incident light at 256 points are calculated. By performing similar calculation for the slits directed to 324 directions, 324 images are obtained, and a pitch-shifted image consisting of 256×324 points is obtained. The obtained pitch-shifted image consists of only the positional information of the slit shaped light. Therefore, in order to obtain an accurate distance image, calibration (correction) based on a table of detailed data such as lens aberration correction is necessary. Therefore, lens aberration estimated from the focal length f and in-focus position d of the taking lens is calculated, corrected, and distortion in the longitudinal and lateral directions with respect to the camera is corrected. Similar operation is performed with respect to the color image. The data necessary at that time includes information of various measurement lenses, that is, focal length f and in-focus position d. In the system of the present embodiment, calibration is performed on a computer system, and connection to the measurement apparatus of the present invention (shown in FIG. 3) is provided by SCSI terminal, for example. Alternatively, the data may be shared by using a recording medium such as MO.

In this manner, from the body of the measuring apparatus, color images and pitch-shifted images are provided as digital signals from a terminal such as SCSI terminal, or provided as analog video signals from an output terminal such as BTSC terminal. Data necessary for calibration are provided to the computer as digital signals from SCSI, for example. When a drive 48 such as internal MO or MD is to be used, images and various data are recorded on the recording medium. The taken pitch-shifted images and color images are transferred to a computer connected to the measuring apparatus, together with various taking lens information. In the computer, based on the transferred pitch-shifted images and the taking lens information, the data are calibrated and converted to a distance image having information with respect to the distance to the object. As for the pitch-shifted image, after calibration, a conversion curve with respect to the stored amount of shifting and measured distance is extracted for every XY position, longitudinal and lateral positions on the image plane, focal length f and in-focus position d, and based on the conversion curve, the pitch-shifted image is converted to a distance image.

Conversion to the distance image is well known and the detailed are described, for example, in *Institute of Electronics, Information and Communication Engineers, Workshop Material* PRU 91-113, Onodera et al., "Geometrical Correction of Image Without Necessitating Camera Positioning", *Journal of Institute Electronics Information and Communication Engineers* D-II vol. J74-D-II, No. 0, pp. 1227–1235, '91/9 Ueshiba et al, "Highly Precise Calibration of a Range Finder Based on Three-Dimensional Model of Optical System."

The measuring apparatus in accordance with the present invention will be described in greater detail.

Figure 1:
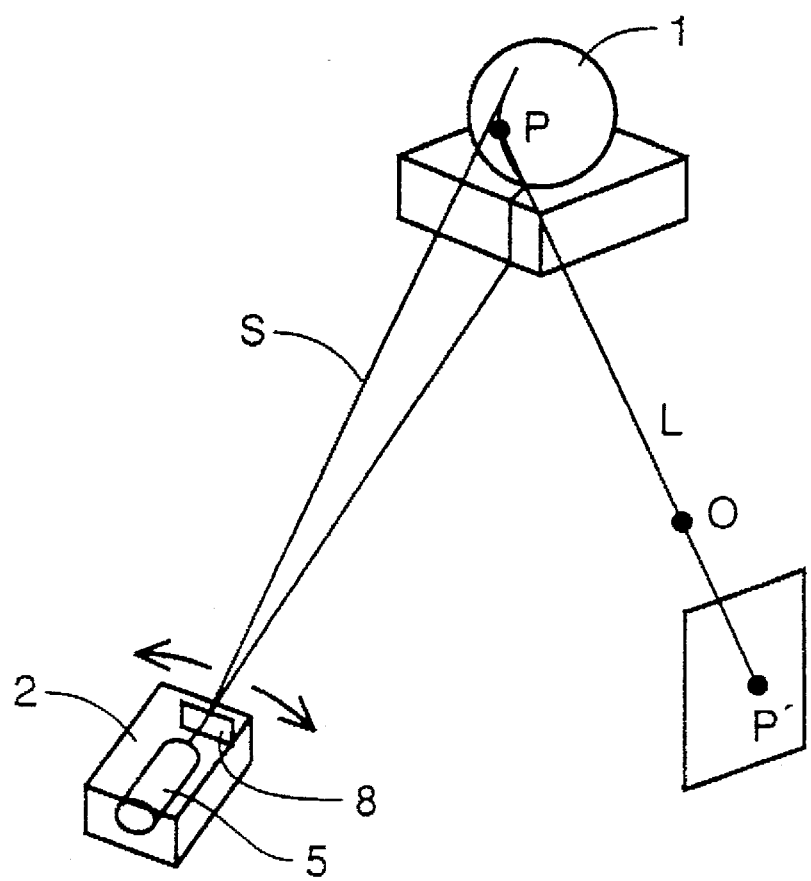
FIG. 1 is an illustration showing the principle of light-section method in accordance with the first embodiment of the present invention.

First, the optical system will be described. Referring to FIGS. 1 and 2, when a distance image is photographed, a slit shaped light S is directed to an object 1, from a slit shaped light projecting apparatus (light projecting optical system) 2. Slit shaped light projecting apparatus 2 includes a light source, for example a semiconductor laser 5, a collective lens 6, a polygon mirror 7, a cylindrical lens 8, a condenser lens 10 and a light projecting zoom lens 11. In stead of a polygon mirror 7, a rotary mirror such as a resonance mirror, galvano mirror or the like may be used.

Cylindrical lens 8 has not spherical but columnar convex surface. Therefore, it does not provide a point of focus but a line of focus which is parallel to the axis of the column. Polygon mirror 7 has a number of mirrors provided around an axis of rotation, and by rotation, light beams incident on respective mirror surfaces are moved in one direction successively for scanning.

The structure of the light projecting optical system will be described with reference to FIG. 7. FIG. 7(a) is a side view of the light projecting system, and FIG. 7(b) is a top view thereof. In FIG. 7(b), such portions that overlap when plotted two dimensionally are partially omitted. Referring to FIG. 7(a), the slit shaped light has its length in a direction vertical to the sheet. The solid line from semiconductor laser 5 to condenser lens 10 represents the optical path. After condenser lens 10, dotted lines are phantom lines representing position of re-imaging of the slit shaped light. In FIG. 7(b), the slit shaped light has its length in the upper and lower directions of the figure. The solid line from semiconductor laser 5 to cylindrical lens 8 represents the optical path. Dotted lines after condenser lens 10 are phantom lines indicating the position of re-imaging. Chain dotted line between cylindrical lens 8 and condenser lens 10 schematically shows the manner how the laser beam which has progressed as points is converted to a slit shaped light having a certain width by means of cylindrical lens 8. The slit shaped light is re-imaged at a position represented by a line (two-dotted chain) at the left end of FIGS. 7(a) and 7(b).

Collimator lens 6 (corresponding to collective lens 6 of FIG. 2) has a lens power sufficient to collect light beam (having the emission wavelength of 670 nm, for example) output from semiconductor laser 5 onto the condenser lens. The laser beam which has passed through collimator lens 6 is reflected to a direction vertical to the lens of the slit shaped light, by means of polygon mirror 7. This deflection enables scanning of the object plane with the slit shaped light. The laser beam deflected by polygon mirror 7 first enters the fθ lens 29. The fθ lens 29 is arranged for correcting non-linear component, since the speed of movement of the slit shaped light on the object surface is non-linear with respect to the constant speed of rotation of polygon mirror 7.

The subsequent collimator lens 30 directs the luminous flux entering condenser lens 10 from the direction of scanning by the polygon mirror 7 to a direction vertical to the condenser lens, so as to improve efficiency of projection. The laser beam is converted to a slit shaped light having its length extending in the horizontal direction (vertical to the sheet of FIG. 7(a)) by means of cylindrical lens 8, collected onto a pupil plane of condenser 10 and forms an image there, so that it is directed to the object as a very narrow slit shaped light.

The slit shaped light once imaged by condenser lens 10 arranged on image plane (imaging surface) 10p of light projecting zoom lens 10 passes through light projecting zoom lens 11 and directed to the object. The size of the image plane is selected to match the size of the image pickup device, for example ½ inch, ⅓ inch or the like. In the embodiment, it is selected to be ½ inch. The slit shaped light has its length in the horizontal direction, generated by cylindrical lens 8, and it is moved for scanning at high speed in accordance with the rotation of the polygon mirror, in a direction vertical to the length of the directed slit shaped light. At this time, the in-focus position of the light projecting zoom lens is controlled by an AF driving system 17 based on a signal from an auto focus sensor 31 provided in the photographing system, simultaneously with and to have the same value as the photographing system in accordance with the distance to the plane of the object. Auto focus sensor 37 is one commonly used for a still camera. The focal length is also controlled based on the operation by a user or from the system, simultaneously with and to have the same value as the photographing system.

Polygon mirror 7 is connected to projecting scanning driving system 9 including a polygon mirror driving motor and a polygon mirror driver, and its rotation is controlled by this system. A scanning start sensor 33 is a sensor employing a photodiode arranged aside condenser lens 10, and it monitors whether laser scanning has reached a stable state, that is, the timing for starting scanning.

Figure 8:
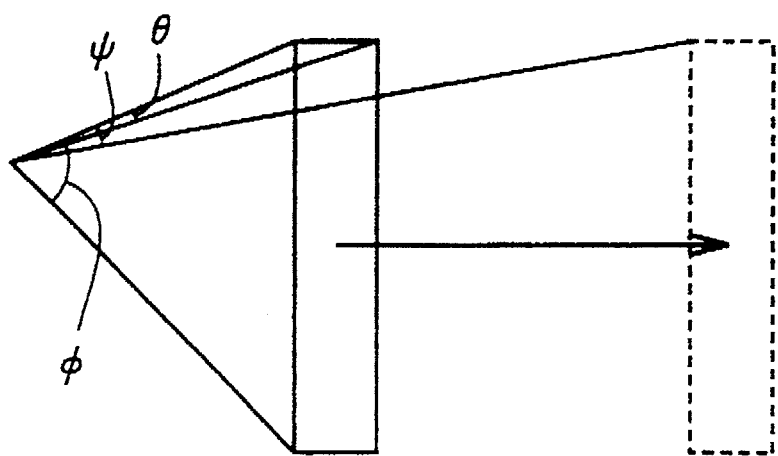
FIG. 8 is an illustration of the projected slit shaped light in accordance with the first embodiment of the present invention.

The light projecting system has a zooming function which allows adjustment of necessary magnification with respect to the object 1. The zooming function includes power zooming (PZ) in which user can arbitrarily select the angle of view, and automatic zooming (AZ) in which pre-selected field of view is automatically attained. With respect to the zooming of light receiving optical system 3, light projecting optical system 2 is controlled by an AZ driving system 16 so that the angle of view is constantly matching, and zooming is performed so as to provide equal optical magnification constantly. The relation between zooming and projection of slit shaped light is represented by the equations (1) to (3) below, with reference to the schematic diagram of FIG. 8.

$$\theta = \alpha 1 \times 1/f \quad (1)$$

$$\phi = \alpha 2 \times 1/f \quad (2)$$

$$\psi = \alpha 3 \times 1/f \quad (3)$$

Using a point in the light projecting system as a reference, θ represents an angle of movement of the very narrow slit shaped light while one image is integrated, in order to obtain a column of 256 points of pitch-shifted image; φ represents an angle indicating length of the slit shaped light on the object; and ψ represents total scanning angle of 324 times of the slit shaped light on the object. The slit shaped light scans, starting from the position denoted by the solid line to the direction of the arrow until it reaches the position denoted by the dotted line. The reference character f represents focal length of the light projecting lens. The width of the slit shaped light itself is set as narrow as possible. Reference characters α1, α2 and α3 represent proportional coefficients and these angles θ, φ and ψ, are proportional to the reciprocal number of focal length f.

Figure 9:
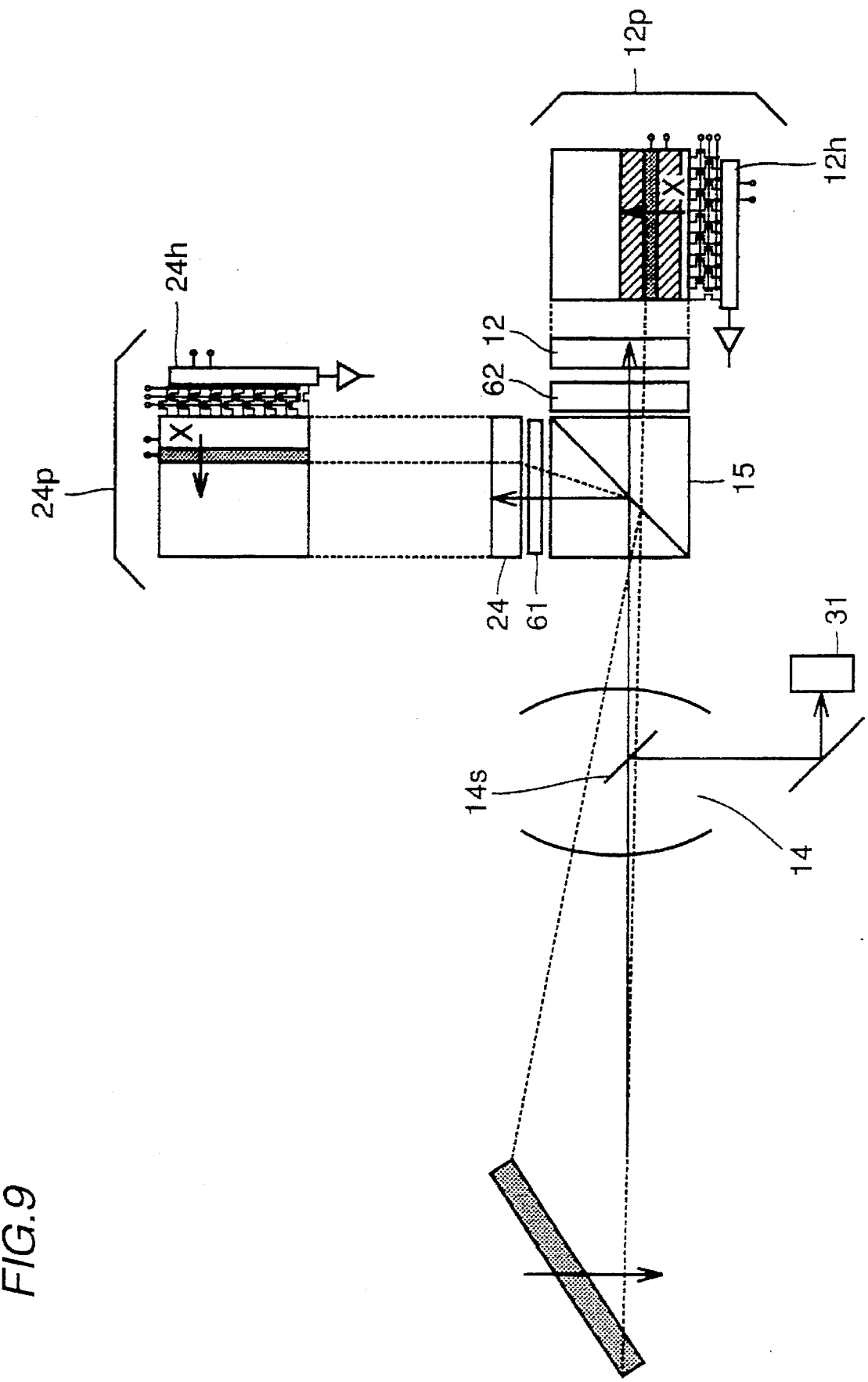
FIG. 9 is a cross section showing a structure of a light receiving optical system in accordance with the first embodiment of the present invention.

In a vertical direction of slit shaped light projecting apparatus (light projecting optical system) 2, and apart from slit shaped light projecting apparatus 2 by base length 1, a photographing apparatus (light receiving optical system) is provided arranged on one rotary frame 4, which apparatus includes a color image photographing system and a distance image photographing system. The structure of the light receiving optical system is shown in FIG. 9. Light receiving optical system 3 includes a photographing zoom lens 14, an auto focusing unit 31, a beam splitter 15, various filters 61 and 62, a color CCD image pickup device 24, and a distance image sensor 12. The received light is splitted by beam splitter 14s arranged in photographing zoom lens 14, and one part of the light is directed to auto focus unit 31. The AF unit 31 measures approximate distance to the object plane and adjusts the point of focus of the light projecting system and light receiving system lenses. In this embodiment, a common unit used in a video camera, a single lens reflex camera or the like is used.

The other luminous flux splitted by beam splitter 14s arranged in photographing zoom lens 14 is further splitted into transmitting and reflecting two luminous fluxes by a beam splitter 15 arranged behind the photographing zoom lens, and guided to distance image sensor 12 and color image sensor 24, respectively. Beam splitter 15 has such an optical characteristic that transmits long wavelength component of luminous flux entering the distance image sensor 12, in this embodiment wavelength component longer than about 650 nm including laser wavelength component (679 nm), and that reflects other wavelength components.

Figure 10:
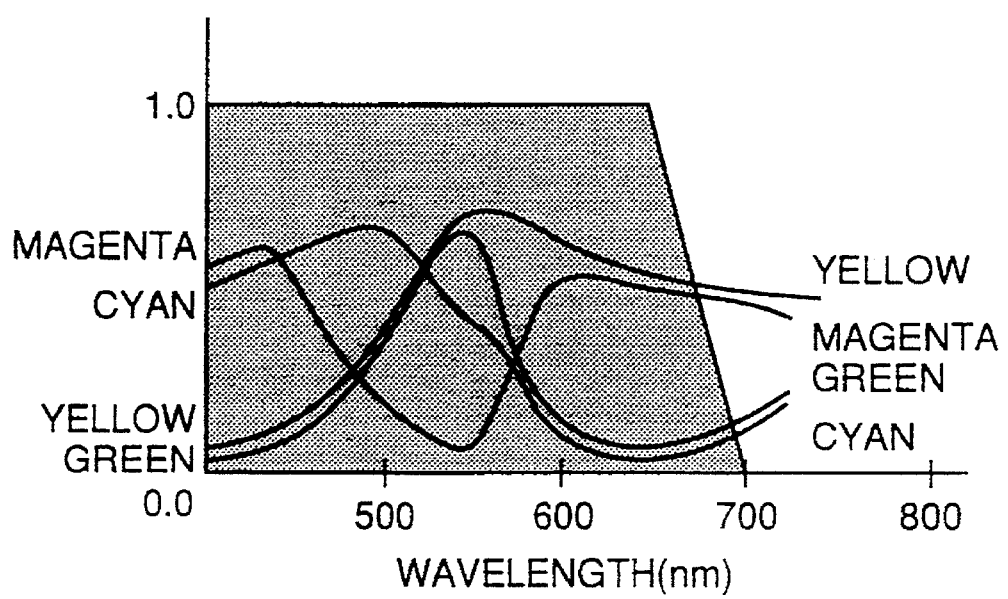
FIG. 10 is an illustration showing characteristics of the incident wavelength of the color image sensor in accordance with the first embodiment of the present invention.

The reflected short wavelength component includes most of the wavelength components of visible light. Therefore, generally, it does not affect color information. The reflected luminous flux passes through a lowpass filter 61 such as a crystal filter for preventing sprious resolution, and imaged on a single plate color image sensor 24. The single plate color image sensor 24 is a CCD image pickup device used in a video camera or the like, on which RGB or yellow Ye, cyan Cy, magenta Mg and green G of complementary color system are arranged as a mosaic, for extracting color information. Green may be used as a luminance signal. FIG. 10 shows wavelength band of the light received by color image sensor of the complementary color system. The color image sensor receives the light in the wavelength range reflected by a beam splitter having the reflectance of h. The curves are spectral sensitivity of the pixels with color filters of yellow Ye, cyan Cy, magenta Mg and green G.

Figure 11:
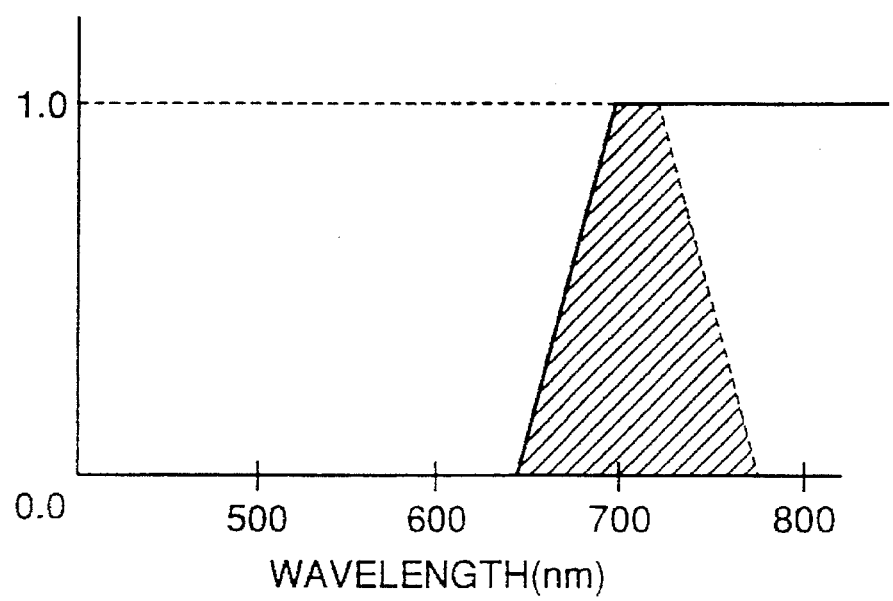
FIG. 11 is an illustration showing wavelength of the received light at the distance image sensor in accordance with the first embodiment of the present invention.

The luminous flux having long wavelength component transmitted through beam splitter 15 further passes through a filter for cutting infrared ray (hereinafter referred to as IR) for extracting only the laser beam component (having the wavelength of 670 nm), and further passes through a lowpass filter such as a crystal filter, and is imaged on distance image sensor 12. In FIG. 9 showing the structure of light receiving optical system, the IR cutting filter and the lowpass filter are represented by one filter 62. FIG. 11 shows the wavelength band (hatched portion) of the light beam received by distance image sensor 12. The shorter wavelength region than the laser beam wavelength is cut by the beam splitter 15 (having such transmission factor as represented by the solid line) and the longer wavelength region is cut by IR cut filter 62 (having such transmission factor as represented by the dotted line).

Lowpass filter 62 used here is not for preventing sprious resolution of color images mentioned above, but for providing interpolating function for detecting positions of the received laser beam with a resolution finer than the pitch of the imaging devices, for calculating the distance data. For this purpose, it should preferably have anisotropic optical characteristic which does not degrade resolution in the lengthwise direction of the received slit shaped light but degrades the resolution in the widthwise direction of the slit shaped light, different from the isotropic optical characteristic of the lowpass filter 61 for the color image. As means for realizing such optical characteristic, a single layer crystal filter or a lowpass filter utilizing diffraction such as grating may be used. However, the lowpass filter is not essential in the system structure and the function can be provided by an analog filter for subsequent sensor output, or by a digital filter after digital conversion of the sensor output.

Scanning of image pickup devices 12 and 24 will be described. 12p and 24b shown adjacent to image pickup devices 12 and 24 of FIG. 9 are plan views of the image pickup devices 12 and 24 for easier understanding. Generally, speed of scanning the CCD image pickup device in the vertical direction is lower than the scanning in the lengthwise direction (horizontal direction) along horizontal registers 12h and 24h. Therefore, color image obtained by image pickup device 24 (24p) is subjected to analog signal processing in accordance with an output from horizontal transfer line of the CCD scanning at high speed, and converted to NTSC signal successively so that image output can be provided to the monitor. When the pitch-shifted image is to be output to the same monitor, it is preferable to generate distance image data in the same direction and same positional order as the horizontal scanning direction of the color image, since in that case it becomes unnecessary to store positional information, and hence the necessary memory capacity can be reduced and function required of the memory can be simplified.

Accordingly, it is preferred that the direction of the length of the slit projected for measuring distance data is the same as the direction of high speed scanning of the image sensor for color images. In other words, generally it should be in the horizontal scanning direction. Further, the scanning direction of the slit should be vertical scanning direction of the color image. Namely, the projected slit shaped light should preferably be moved upward and downward for scanning.

Therefore, in such a three-dimensional shape measuring apparatus or a three-dimensional input camera as that of the present invention utilizing light section method in which the object captured by two different image input sensors, that is, color image sensor and distant image sensor, a slit-shaped beam of which length extends in the horizontal scanning direction of the color image pickup device should be projected and slit should be moved in the same direction as the vertical scanning direction of the color image pickup device for scanning, whereby the memory can be reduced and the requirements for the memory can be released. Further, in order to read slit-shaped images at high speed from the distance image sensor with respect to such a slit-shaped beam, the direction is limited. Therefore, the horizontal direction allowing high speed scanning by the distance image sensor must be parallel to the horizontal scanning direction of the color image sensor. Therefore, the relation between positions of these image sensors and the incident slit shaped light and the relation between the scanning directions are as shown in FIG. 9.

It is effective for the optical system having such photographing system structured as described above to equip the following two structures.

Namely, the color image and the image for generating distance image are input through the same lens. However, the light intensity obtained from the wavelength for the color image is not related to the light intensity obtained from the wavelength of the distance image. Therefore, exposure light intensity is desirable to independently controlled. When a close object is to be measured in the dark, brightness for distance is high while brightness for color image is low. When an object at a distance is to be measured with sufficient illumination, the brightness for the distance is low, while brightness for the color image is high. Therefore, in the light receiving zoom lens, control of the exposure is not effected by the diaphragm which is a common exposure adjusting means for general lens, and the diaphragm is fixed at the open state.

Exposure control of the color image is effected by an electronic shutter function of a generally used FIT-CCD or the like, in which exposure is adjusted in accordance with the time of accumulation. Generally, electronic shutter function of the FIT-CCD or the like used as the color image sensor allows accumulation time control of 1/60 to 1/10000 sec. In order to ensure wider dynamic range, an ND filter for reducing the amount of transmitted light while not changing components of the incident light may be inserted immediately before the color image sensor when it is used outdoor with sufficient light. By doing so, the amount of light incident on the sensor can be reduced so that it can be used at higher brightness without decreasing the amount of light entering the distance image sensor.

Figure 12:
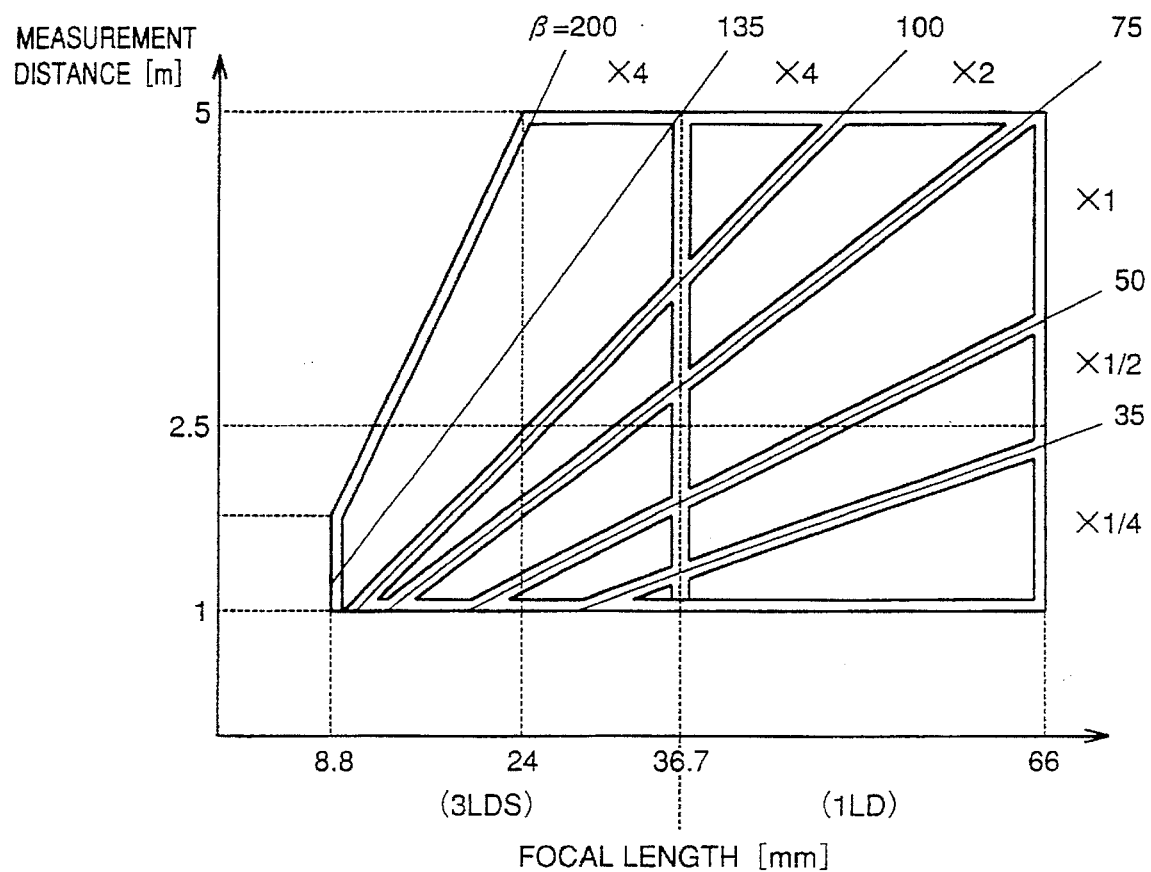
FIG. 12 is an illustration showing an example of output control for the distance sensor in accordance with the first embodiment of the present invention.

As for the exposure control for the distance image, laser intensity is adjusted by controlling the number of used lasers for projecting light, controlling current supply to the laser, and controlling insertion of the ND filter at an arbitrary optical position from the laser to the output lens, or the output level is adjusted by the amplifier gain supplied to the output signal. In this control, the value for controlling laser intensity is determined based on the distance information Daf to the object obtained from the AF control portion, and focal length f of the lens under the measuring conditions. FIG. 12 shows an example of the control map.

Generally, the output of the distance image sensor is in reverse proportion to the square of distance information Daf to the object. When the focal length f becomes shorter, the area which needs illumination becomes larger, and therefore the output signal of the distance image sensor becomes smaller. Therefore, in the apparatus of the present embodiment, the output level of the data for calculating distance image is controlled with the number of lasers changed in accordance with the focal length. In the example of FIG. 12, three lasers are used for the focal length f of up to 36.7 mm, and one laser is used for longer focal length. It is further controlled by changing amplifier gain provided by an analog pre-processing circuit to the output of the distance image sensor, in accordance with image magnification $\beta(=daf/f)$ calculated based on the focal length f and the distance information Daf to the object determined by the output from the AF sensor. In the example shown, the amplifier gain is set to be ½ when $\beta$-35 to 50, 1 when $\beta$=50 to 75, 2 when $\beta$=75 to 100 and 4 when $\beta$-100 to 200. Further, when higher laser beam is used for measuring in a telephoto region having long focal length for a close object, the laser intensity can be effectively controlled by inserting an ND filter at an arbitrary optical position from the laser to the output lens.

However, when satisfactory result of measurement cannot be obtained by using the values controlled in the above described manner, it is possible to provide a laser intensity adjusting key for adjusting the laser intensity by key operation, or to change sensor accumulation time. Alternatively, laser prescanning may be performed based on an estimated laser intensity control value obtained based on the distance information and the estimated reflective index of the object. More specifically, the maximum output value of the distance image sensor at the time of prescanning is calculated. The laser intensity and image sensor accumulating time which are within the dynamic range of the A/D conversion and sufficient for calculating distance information in the succeeding stage are calculated. Thus the distance image is taken based on the calculated control values. If an auxiliary illumination is available for auto focusing, it is possible to detect by the AF sensor, the amount of reflected light derived from the auxiliary illumination with respect to the center of the field of view at which the object is considered to be existing, and to calculate laser intensity and image sensor accumulation time based on the detected reflected amount of light for taking the distance image.

Figure 13:
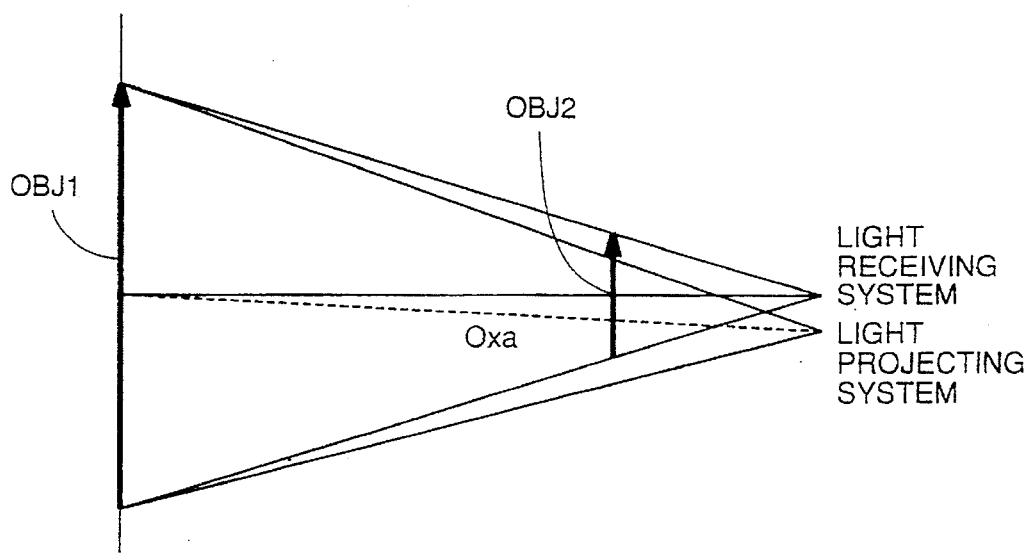
FIG. 13 is an illustration of the parallax between the light emitting system and the light receiving system in accordance with the first embodiment of the present invention.

Additionally, there is inevitably generated a parallax because light is projected and received at different points of view (positions) (see FIG. 13). Therefore, it is effective to equip means for solving this parallax. When light is projected and received by the same lens system having same image plane size and the same focal length, the field of view matches only at a specific distance (as denoted by a larger arrow OBJ1). When there is not an object at the distance where the field of view matches, three-dimensional shape of a region to which light is not projected would be measured, and therefore measurement becomes impossible. For example, when an object at a position where the fields of view do not match as represented by a small arrow OBJ2 of FIG. 13 is to be measured, the scope of light projection is different from the scope of light reception, and therefore the light receiving system scans the region denoted by the upper end of the arrow, to which light is not projected.

The above-described problem can be solved by the following structure.

Figure 14:
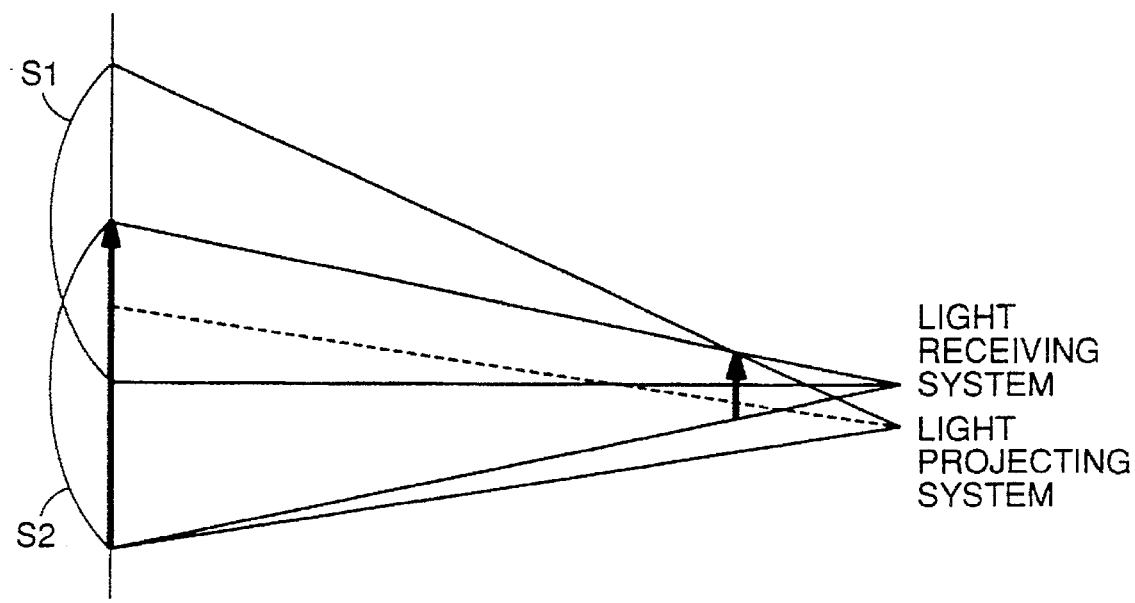
FIG. 14 is an illustration of stepless control of angle of elevation in accordance with the first embodiment of the present invention.

(1) The angle of elevation of the optical axis of the light projecting system is changed in stepless manner in accordance with the distance to the object (see FIG. 14). The light projecting system and the light receiving system are set to have the same focal length. The angle of elevation of the optical axis (denoted by the dotted line) of the light projecting system is changed in accordance with the distance to the object based on auto focus measurement, so as to meet the scope of scanning of the light receiving system, which is fixed. More specifically, since the influence of parallax becomes serious as the distance is smaller, the angle of elevation is enlarged to set the scanning scope at S1, and the angle of elevation is made smaller for greater distance and the scanning range is set at S2. The optical axis of the light projecting system is changed mechanically.

(2) The angle of elevation of the optical axis of the light projecting system is changed continuously in accordance with the distance to the object, by some optical means such as a prism having variable refractive index immediately after emission of light from the light projecting lens unit. Here, the light projecting and light receiving systems are set to have the same focal length f. By inserting and ejecting a prism having a curvature in accordance with the distance based on auto focus measurement, the refractive index is changed and hence the angle of elevation of the optical axis of the light projecting system is changed.

(3) The focal length fa of the light projecting system is controlled so that it becomes smaller than the focal length fp of the light receiving system, by using an optical system having the same image plane size. Alternatively, an optical system having larger image plane size is used for the light projecting system so that the light projecting and receiving systems have the same focal length fa and fp. By using such means, there is provided a margin for the scanning scope of the light transmitting system with respect to the scanning scope of the light receiving system (about 1.5 times that of the light receiving system), and at the same time, the distance to the object is divided into a plurality of zones, and the angle of elevation of the optical axis of the light projecting system is changed stepwise, corresponding to respective zones. In the example shown in FIG. 15, the distance to the object is divided into two zones, and the farther zone is denoted by zone Z1 and the closer zone is denoted by Z2. For the farther zone Z1, the angle of elevation of the optical axis of the light projecting system is changed by a prescribed angle, and for the closer zone Z2, the angle of elevation of is changed by a larger angle than in zone Z1.

(4) Similar to the option (3) above, there is provided a margin in the scanning scope of the light projecting system (of about 1.5 times that of the light receiving system), the angle of elevation of the optical axis of the light projecting system is fixed, and there is provided a limit in the closest measurable distance, in accordance with the focal length. In the example shown in FIG. 16, at a position nearer than the position of the arrow OBJ2, the light receiving area does not coincide the light projecting area, and therefore the distance corresponding to this position denoted by the arrow is set as the closest distance.

Figure 15:
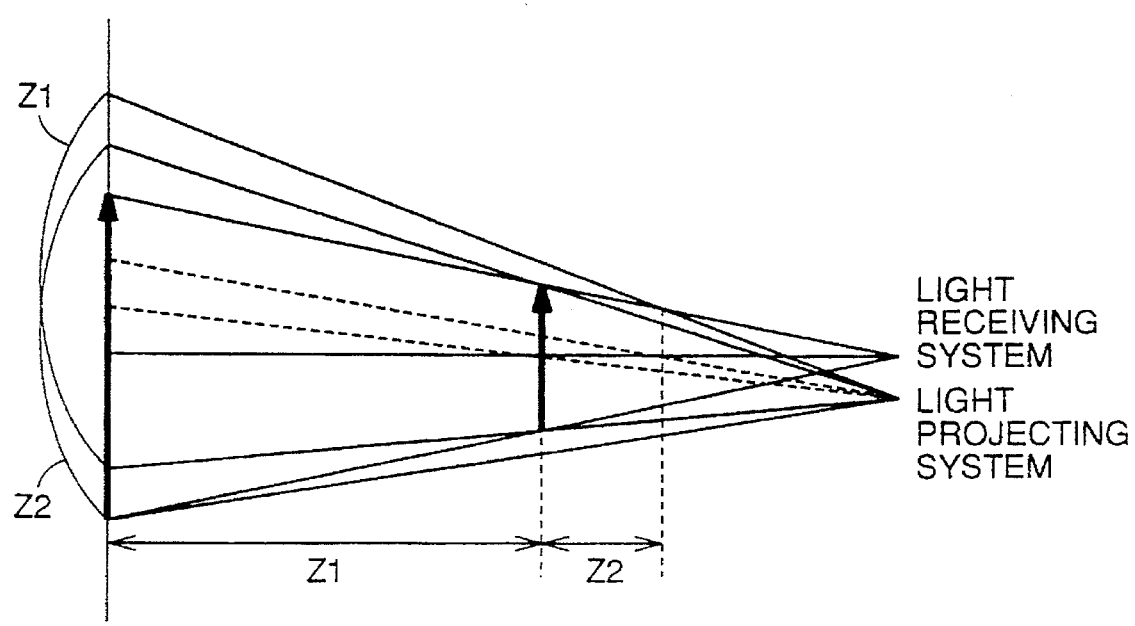
FIG. 15 is an illustration of stepwise control of angle of elevation in accordance with the first embodiment of the present invention.
Figure 16:
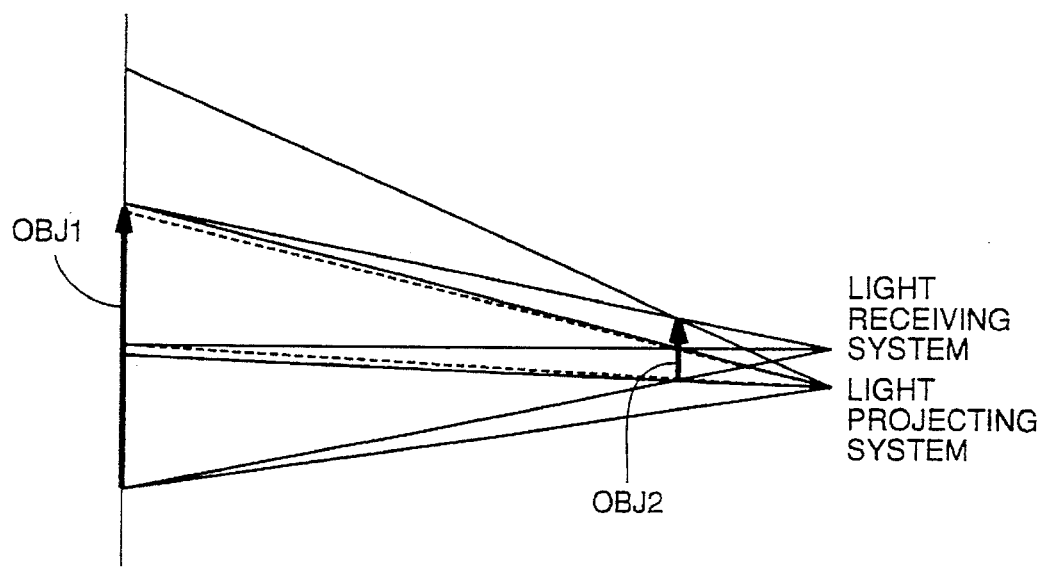
FIG. 16 is an illustration of minimum distance control with the angle of elevation fixed, in accordance with the first embodiment of the present invention.

In options (1) and (2) above (FIG. 14), it is assumed that the fields of view completely coincide with each other. Therefore, it is possible to drive the distance image sensor simultaneously with the start of laser scanning and to start taking the image. Meanwhile, in the options (3) and (4), the fields of view are not coincident as shown in FIGS. 15 and 16 and the laser scanning area by the light projecting system is wide, resulting in unnecessary region. Therefore, the time required for scanning this unnecessary region is calculated based on the auto focus calculation reference distance. Since scanning precedes from an upper side to the lower side, there is an unnecessary region at the start of scanning. Therefore, microcomputer is set to start taking of data from distance image sensor after the lapse of the aforementioned calculated time. In that case, since the scanning range is wider, the time necessary for laser scanning is about 1.5 times that of the options (1) and (2), and therefore time for the input of the three-dimensional shape becomes longer by that time.

Since the angles of elevation of the light projecting system and the light receiving system differ from each other, laser is moved not strictly at the same speed on the surface of the object which is vertical to the optical axis of the light receiving system. More specifically, the laser scanning is dense at the lower side of the object and sparse at the upper side of the object. However, since the angle of elevation itself is very small, it does not present serious problem. By providing a conversion table from positional information in the vertical direction scanned by the sensor and the amount of pitch shift to the distance information, an approximately isotopical three-dimensional measurement is possible.

The sensingsystem will be described in greater detail.

When there is a limit in the distance range to the object to be measured with respect to the direction of one projected slit shaped light, the position on the sensor receiving the light reflected by the object is also limited within a certain range. This is illustrated in FIG. 17.

In the figure, Df represents maximum distance for measurement and Dn represents minimum distance for measurement. Now, if the plane cut by the slit shaped light projected from the light projecting system is slit A, the scope on the plane of the image pickup device receiving the slit shaped light reflected by the surface of the object is limited to a closed area Ar, in which a position of projection on the image pickup device of the three-dimensional position of an intersection PAn between the minimum distance Dn for measurement and the slit A is the lowermost point in the figure, and the projected point on the image pickup device of the three-dimensional position of the intersection Baf between the maximum distance Df for measurement and slit A, projected on the image pickup device with the position of the main point of the image pickup system being the center, is the uppermost point in the figure. Assuming that the light projecting system and the light receiving system have the same positional relation, in case of slit B, the scope on the plane of the image pickup device is limited to a closed area Br on the image pickup device, in which the point of projection of the intersection PBn of the minimum distance for measurement Dn and slit B is the lowermost position in the figure, and the point of projection of intersection PDf of the maximum distance for measurement Df and the slit B is the uppermost point in the figure.

In this manner, in order to generate a column for distance data consisting of 256 points by projecting one slit shaped light, not the entire area of the image pickup devices but only the necessary area corresponding to the slit shaped light is scanned, and therefore the speed of processing can be increased.

Figure 18:
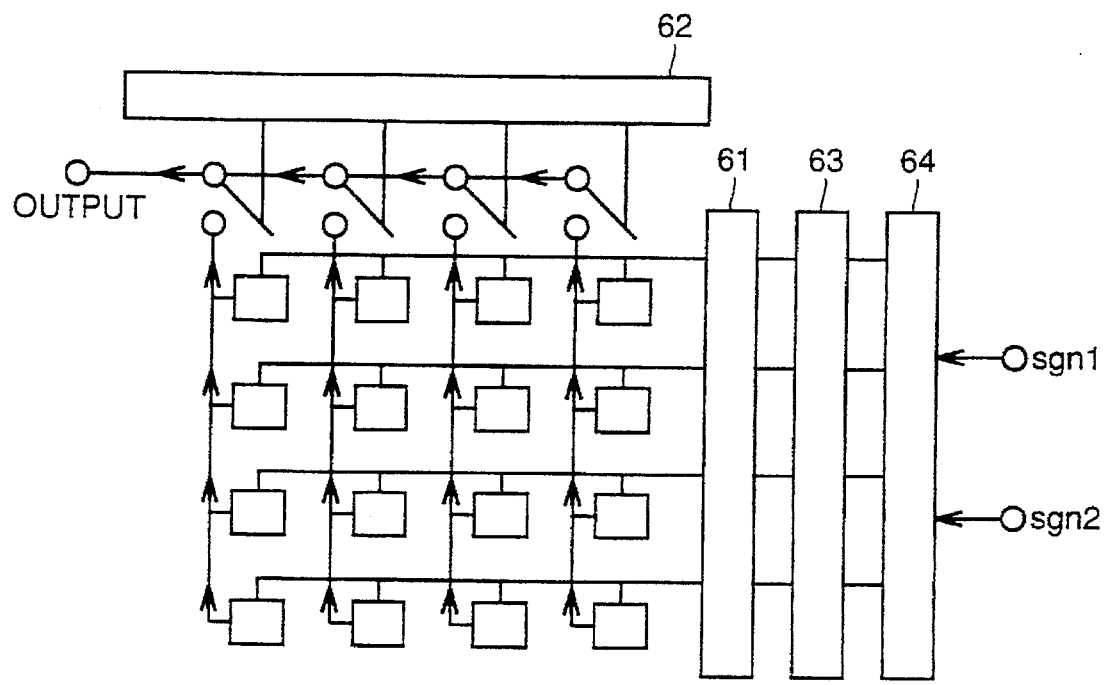
FIG. 18 shows a sensor in accordance with X-Y address scanning method in accordance with the first embodiment of the present invention.
Figure 19:
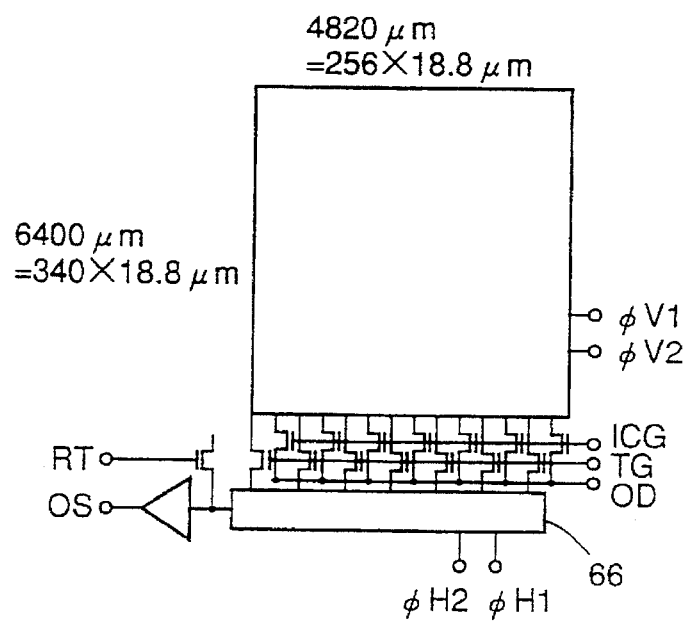
FIG. 19 shows a sensor in accordance with analog transfer method (at the time of interline transfer) in accordance with the first embodiment of the present invention.
Figure 20:
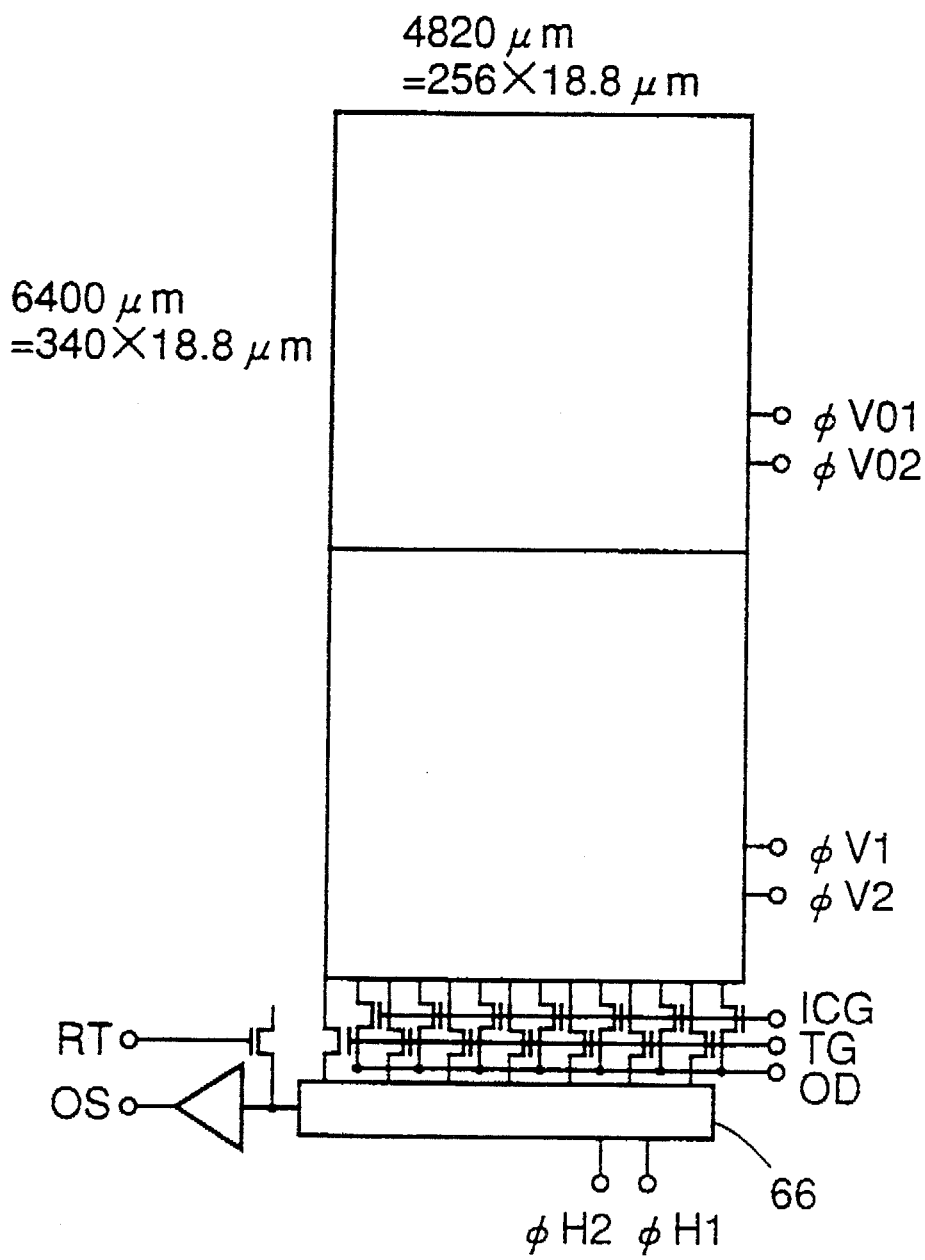
FIG. 20 shows a sensor in accordance with analog transfer method (at the time of frame transfer) in accordance with the first embodiment of the present invention.
Figure 21:
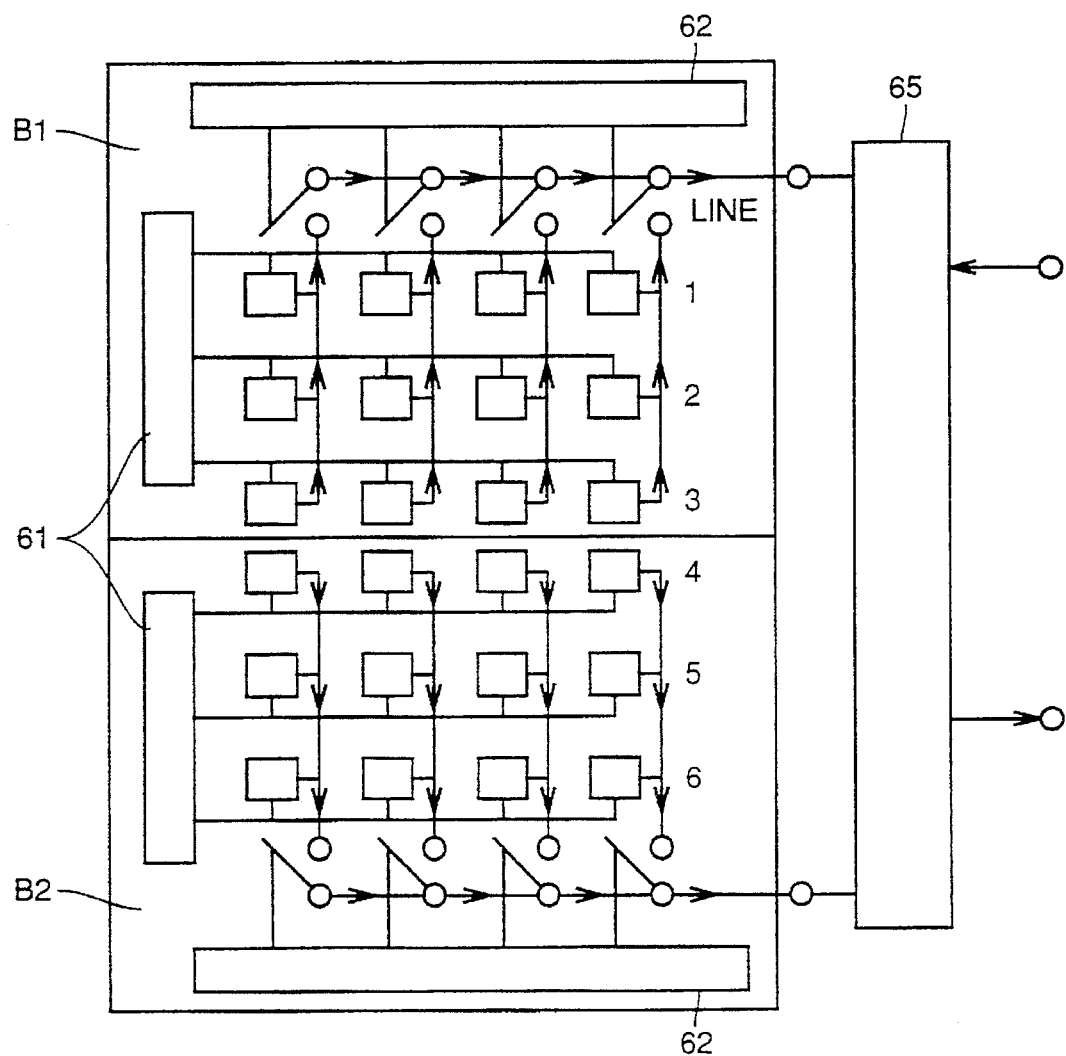
FIG. 21 is an illustration of a sensor divided into blocks in accordance with the first embodiment of the present invention.

In order to increase the speed of operation of the apparatus for generating data of a three-dimensional shape, a function of outputting at high speed a strip shaped image of the corresponding area only, for example only the image of 256×16 pixels is desired. An high speed driven solid state image pickup device allowing selective reading of such strip shaped region includes the following three types of solid state image pickup devices. The first option is addition of a read start address setting function to an image pickup device having X-Y address scanning system such as a MOS and CMD (FIG. 18). The second option is addition of a function of discharging in parallel with charge transfer to a read-out transfer path (generally, a horizontal register), in an analog transfer system such as a CCD image pickup device (FIGS. 19, 20). The third option is setting beforehand blocks divided into strips regardless of the scanning method, providing an output function for each block, and utilizing parallel outputs thereof (FIG. 21).

A structure of a sensor employing the X-Y address scanning method as the first option is shown in FIG. 18. Generally, scanning of pixels is performed by switches arranged in a matrix of a vertical scanning circuit 61 and a horizontal scanning circuit 62. The vertical and horizontal scanning circuits 61 and 62 are formed of digital shift registers. By inputting 256 horizontal shift signals for one shift signal input of vertical scanning, one row (256 pixels) can be scanned. In this embodiment, by providing a scan start set register 63 for supplying a scan start set signal, that is the register initial value, to vertical scanning circuit 61, strip-shaped random access reading is realized. To the scan start set register 63, signals sgn1 and sgn2 indicative of the scanning start position are input, as an instruction of the position at which strip shaped image is to be read out.

Now, if the number of pixels is increased, the number of bits of the scan start set signal is also increased, resulting in larger number of input pins. Therefore, it is preferable to provide a decoder 64 for the scan start set signal. By parallel transfer of the content in scan start set register 63 to vertical scanning circuit 61 at the start of reading, the position for starting scanning (row) is set. By repeating 256 horizontal scanning, signals from the desired row can be obtained. Then, 1 shift signal input for the vertical scanning and 256 shift signal inputs for the horizontal direction are performed to read the signals of the next row. By repeating this operation, the image of the desired strip shaped region is read. By the above described operation, scanning of the desired strip shaped area only can be realized. Thus necessary scanning can be completed in far shorter time period (number of rows read out/number of rows of the entire area) than the time necessary for scanning the entire region.

The region which is once readout is reset and the next accumulation is started. However, in a region which has not yet been read out, charges are continuously accumulated. At this time, the next reading is from the same region, there is no problem. However, when the next reading is from a different region, there would be image information having different accumulation times. In three-dimensional measuring apparatus using light-section, it is necessary to read while shifting the strip-shaped region which needs reading, together with the scanning of the laser slit. In a region which is read out repeatedly, the image corresponding to the time of integration from the last reading to the present reading is read out. However, as the read region is shifted, in the region which is newly read out, an image would be provided which corresponds to thoroughly continued integration. Therefore, in the present invention, the strip-shaped region for reading is set such that it includes both the region necessary at this time and the region necessary for the next time. By doing so, the region which is necessary for the next input has its integration cleared without fail at the last reading. Therefore, taking of an image consisting of pixels having different integration times can be avoided.

A structure for interline transfer of the CCD image pickup device and a structure for frame transfer are shown in FIGS. 19 and 20, respectively, as the second option. In the CCD image pickup device in accordance with the present embodiment, an integration clear gate ICG for discharging the charges to an overflow drain OD is provided parallel to a transfer gate TG for parallel charge transfer to a horizontal register 63, thus realizing strip-shaped random access reading.

In case of interline transfer, generally, the charges accumulated in every pixel are transferred in parallel from the light receiving portion to the transfer region, at the time of completion of image accumulation for the entire area. As for the scanning of the charges generated in each of the pixels, one shift signal is input to the vertical register and the transfer gate TG, charges in the vertical register are shifted downward one stage by one stage, and the charges in the lowermost vertical register are read to the horizontal register 66. Thereafter, by supplying 256 shift signal inputs of the horizontal shift signal, charges of one row can be scanned. By repeating this operation for the number of rows (340 rows), reading of the entire region is performed.

In the present embodiment, charges generated at an unnecessary row in the step of scanning charges generated at respective pixels are discharged to the overflow drain OD in parallel, by supplying a 1 shift signal input to the vertical register and to the integration clear gate IC1. For the row which needs reading, a 1 shift signal input is provided for the vertical register and the transfer gate TG so as to shift charges of the vertical register downward one stage by one stage in parallel and the charges in the lowermost vertical register is read to the horizontal register 66. Thereafter, by supplying 256 shift signal inputs of the horizontal shift signal, charges of one row are scanned. In this manner, random access function on row by row basis is realized, and necessary scanning can be completed in far shorter time period than the time necessary for scanning entire region by the image pickup device (number of rows to be read out/number of rows of the entire region).

In the case of frame transfer shown in FIG. 20, the structure is larger than that of interline transfer. The upper portion is a photoelectric conversion region and the lower side is accumulation region. Generally, the accumulation region has the same number of pixels as the photoelectric converting portion. In normal operation, the accumulated charges of all pixels are transferred in parallel from the photoelectric converting region to the accumulating region by vertical transfer pulses of which number corresponds to the number of rows, at the time when image accumulation of the entire region is completed. After the transfer, the scanning of charges generated at respective pixel is performed in the same manner as in the interline transfer. More specifically, charges are read to the horizontal register 66 by the control of the vertical register and the transfer gate TG, and thereafter 256 shift signals for horizontal shifting are input, so that charges of one row can be scanned.

In this embodiment, the accumulated charges of the pixels of the entire region are transferred in parallel by vertical transfer pulses the number of which corresponds to the number of rows, from the photoelectric converting region to the accumulating region. Thereafter, at the time of transfer to the horizontal register 66, charges of unnecessary rows are discharged to the overflow drain 0D in parallel, simply by inputting one shift signal to the vertical register and the integration clear gate ICG, in the step of scanning charges generated at respective pixels. Meanwhile, as for the accumulation region, only the necessary number of rows (for example 16 rows) may be prepared for every reading, and as for the signal for the unnecessary rows of pixels of the first reading, it may be synchronized with the vertical transfer pulse for vertical transfer from the photoelectric converting region to the accumulating region so as to open the integration clear gate ICG to discharge the charges, and only the charges of the rows of pixels which need reading are transferred to the accumulating region and read from the horizontal register 66. By doing so, random access function on row by row basis is realized and necessary scanning is completed in far shorter time period than the time necessary for scanning the entire region (the number of rows to be read out/the number of rows of the entire region).

Figure 22:
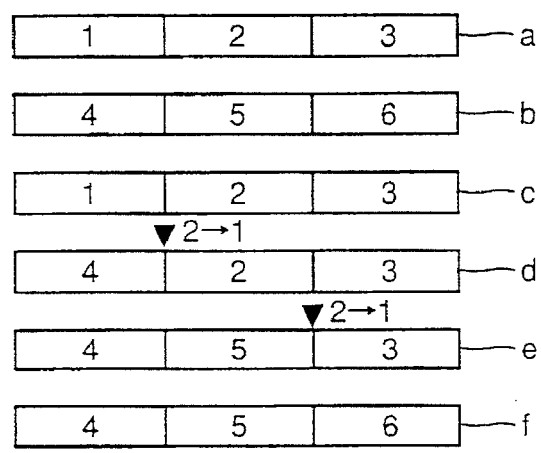
FIG. 22 shows the manner of random access to the rows of the block-divided sensor in accordance with the first embodiment of the present invention.

A structure of a sensor in which a plurality of blocks are prepared by division and the output is given block by block is shown in FIG. 21 as the third option. Here a sensor using X-Y address scanning method will be described as an example. However, the same structure can be also employed in an analog transfer method such as in the CCD image pickup device. In the present embodiment, a number of blocks of which number corresponds to the preset number of rows necessary for reading are prepared, and the signals of respective blocks are scanned in parallel and output. With respect to the parallel readout output, output is selected by operating a multiplier 65 in accordance with the region to be read out, and thus final output is obtained. By such reading, random access on row by row basis is realized, though the order of outputs is different. The time for reading can be compressed by the number of block division. The relation between the manner of output of the strip-shaped image read at random by the block-divided structure and the signals for switching blocks of the multiplier is shown in FIG. 22. In the figure, the reference numerals 1 to 16 correspond to line numbers of FIG. 21.

FIG. 21 shows a very simple example in which there are two blocks (B1 and B2) and arbitrary three rows are read. Description will be given with reference to FIG. 21 and FIG. 22 showing the relation of the output signals. The sensor includes two different outputs therein, namely, a block B1 output (FIG. 22.*a*) providing lines 1 to 3, and a block B2 output (FIG. 22.*b*) outputting lines 4 to 6. These are transmitted as analog signals to the multiplier, selected in accordance with a selection signal Sel and output. By the operation of multiplier 65, when block B1 output is selected as the sensor output Out, the output from block B1 is used as the sensor output as it is, and outputs of strip-shaped images of lines 1, 2 and 3 are output successively (FIG. 22.*c*). When block B2 output is selected as the sensor output, strip-shaped images of lines 4, 5 and 6 are read (FIG. 22.*f*).

Meanwhile, when the first and fourth lines are being output as block outputs, the block B2 is selected to output line 4, and by switching the multiplier 65 to select block B1, the output of lines 4, 2 and 3 are successively provided as sensor outputs, and strip-images of lines 2, 3 and 4 are read (FIG. 22.*d*). When block B2 is selected for first two lines as the sensor output, lines 4 and 5 are output and then block B1 is selected and line 3 is output, then strip-shaped images of lines 3, 4 and 5 are read out (FIG. 22.*e*). In the figure, the reference character ▼ represent a position of switching of the output from block B2 to block B1. By switching the block selection signal during scanning, strip-shaped images at an arbitrary position having the same size as divided block can be selectively read, though the order of output is different.

The above described three different types of distance image sensors allowing random access on row by row basis can be applied to reduce necessary input time to the three-dimensional shape measuring apparatus of the present embodiment.

Figure 23:
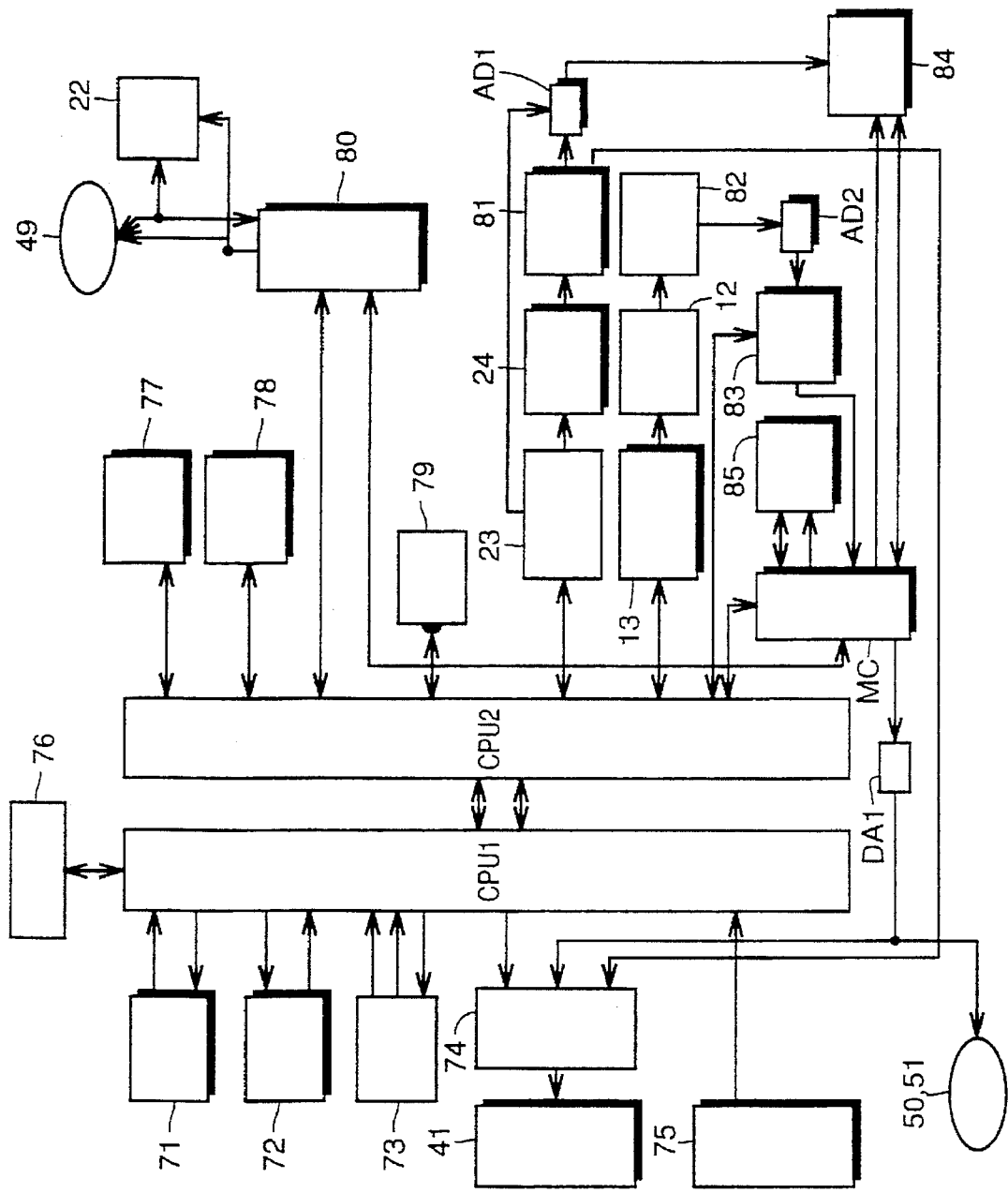
FIG. 23 is a block diagram showing a circuit structure of the whole apparatus in accordance with the first embodiment of the present invention.

The electronic circuit will be described. FIG. 23 is a block diagram showing the whole structure of the electronic circuit. The body of the measuring apparatus of the present embodiment is controlled by two microcomputers, that is, a microcomputer CPU1 controlling light transmitting and receiving systems lens driving circuits 71, 72, an AF circuit 73, an electric universal head circuit 76 and input/output 75, 74 and so on, and a microcomputer CPU2 controlling image sensor driving circuits 13 and 23, laser.polygon driving circuits 77 and 78, a timer 79, an SCSI controller 80, a memory controller MC, a pitch-shifted image processing circuit 83 and so on. Under the control of microcomputer CPU1 controlling the lens, input/output and so on, the power is turned, signals corresponding to key operation for sensingmode and so on are received from a control panel 75, and control signals are transmitted to microcomputer CPU2, light receiving system lens driving portion 71, light projecting system lens driving portion 72, AF driving portion 73, display image generating portion 74 and so on, so as to control zooming, focusing, sensingoperation and so on.

For color images, there are blocks of color image sensor 24, sensor driving circuit 23, analog pre-processing circuit 81 and image memory 84. For distance images, there are blocks of distance image sensor 12, sensor driving circuit 13, analog pre-processing circuit 82, pitch-shifted image processing circuit 83, and a pitch-shifted image memory 85.

When the power is turned on, color image sensingsystem including color image sensor 24, color image sensor driving circuit 23 and color image analog pre-processing circuit 81 are driven, and the photographed color images are displayed to the display image generating portion 74 and displayed on a display 41 for the function of a monitor. These circuits for color image sensingsystem are similar to the circuit systems known in the conventional video camera or the like. Meanwhile, the sensors, lasers and so on for the distance image sensing are initialized when the power is turned on, but they are not driven except a polygon mirror driving circuit 78, which is driven at the time of power on since the time necessary for attaining normal speed of rotation of the mirror is relatively long. In this state, the user prepares for releasing for image input, by setting the field of view by power zoom operation, referring to the color image on the monitor display 41. When release operation is performed, a release signal is generated and transmitted, so that the distance image sensingsystem including distance image sensor 12, distance image sensor driving circuit 13 and distance image analog pre-processing circuit 82 and laser driving circuit 77 are driven, and image information is taken in pitch-shifted image memory 85 and color image memory 84, respectively.

As for the color image, the information is supplied as analog signals to the monitor apparatus. However, to color image frame memory 85, the image input is provided as digital information, by A/D conversion at an A/D converter AD1. These processes are similar to the known technique in the field of digital video, digital steel video and so on.

Figure 7:
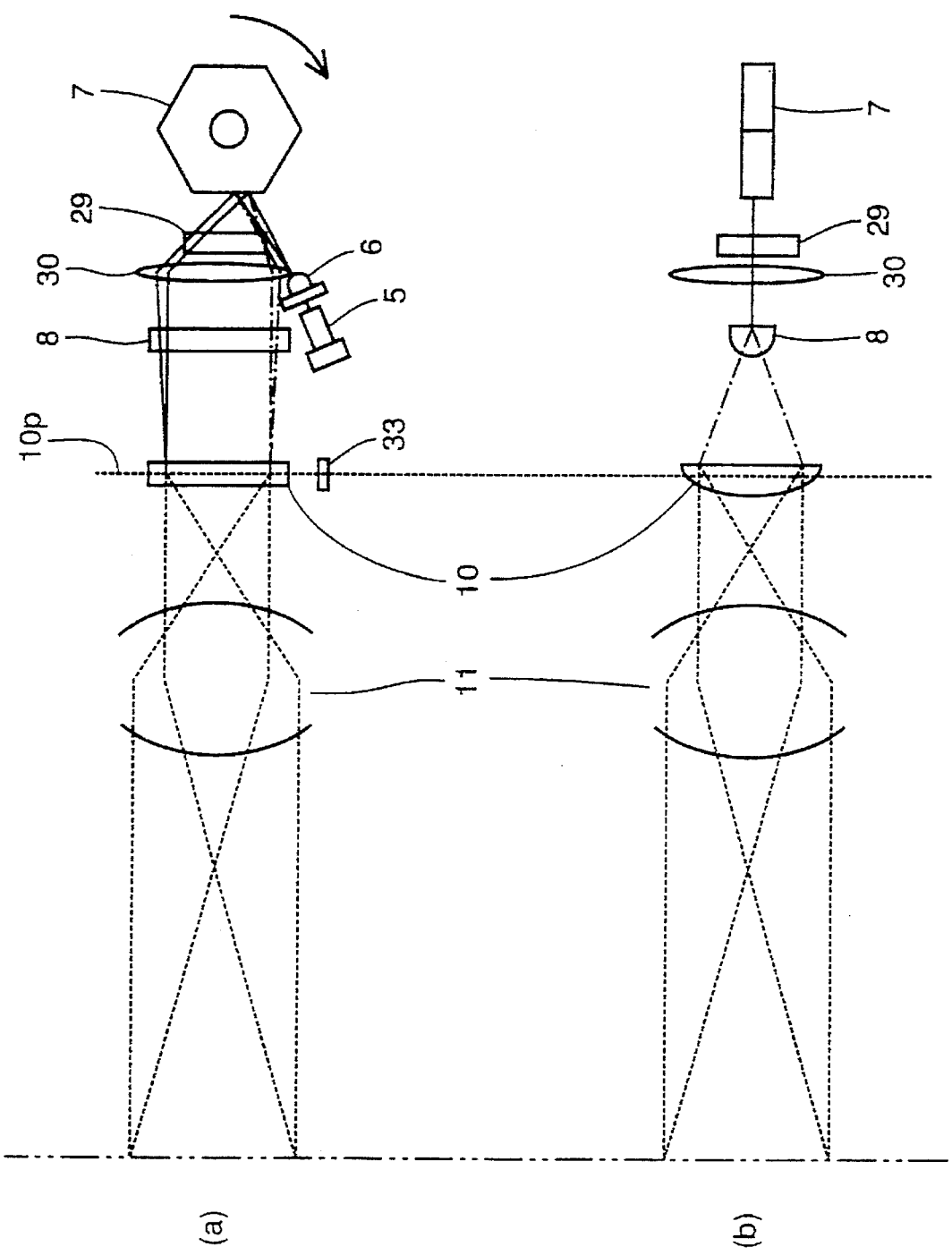
FIGS. 7(a–b) are a cross section showing a structure of light emitting optical system in accordance with the first embodiment of the present invention.

As for the distance image, the microcomputer CPU2 waits for a scan start signal of the slit-shaped laser beam, transmitted from the scan start sensor 33 shown in FIG. 7. Thereafter, it waits for the dead time Td for the unnecessary scanning derived from the distance d for the measurement reference plane, base length 1 described above. After the dead time Td is counted from the scan start signal, distance image sensor 12 and driving circuit 13 therefor are driven, and taking of data starts. The timing operation is performed by timer 79.

When the driving of the sensor starts, a slit-shaped laser beam having its length in the horizontal direction starts scanning downward from the uppermost portion of the light receiving system scanning scope. At the same time, image integration in the distance image sensor starts. When the slit shaped light scans with the amount of change of the angle corresponding to one pixel of the distance image sensor by the movement of polygon mirror 7, then high speed vertical transfer from the image integrating portion to the accumulating portion takes place. Thereafter, distance image sensor driving portion 13 is controlled such that the image of the uppermost row is taken at the center of the strip-shaped region, and the image is read. Simultaneously with the completion of the vertical transfer from the image integrating portion to the accumulating portion, successively reading process of the image from the accumulating portion as the output of the distance image sensor, and charge accumulating process corresponding to the input light amount at the integrating portion for the image reading of the next time, are carried out.

When reading of one strip-shaped image is completed in this manner, the slit-shaped laser beam again scan with the amount of change of the angle corresponding to one pixel of the distance image sensor, and high speed vertical transfer from the image integrating portion to the accumulating portion takes place. The strip-shaped region of the distance image sensor is shifted downward by 1 pitch with respect to the region which has been just read out, and image is read out.

By continuously repeating the series of operations, input of strip-shaped images is repeated successively, and 324 images are obtained. Since polygon mirror is kept rotating at a constant speed during these operations, strip-shaped images corresponding to slit shaped lights having different light-section are input. The output from the distance image sensor is processed by distance image analog pre-processing circuit 82. More specifically, the output is subjected to correlative double sampling offset, processing of the output, and so on. Thereafter, the resulting output is converted to a digital signal by A/D converter AD2, and transmitted as digital data to pitch-shifted image processing circuit 83.

In pitch-shifted image processing circuit 83, calculation of the centroid, that is, conversion from data of one strip-shaped image (including 256×16 pixels) to the position of centroid of the received laser beam at 256 points is performed, using the received light beam centroid calculating circuit (described later) shown in FIG. 24. The calculated amount of pitch-shift is stored in pitch-shifted image memory 85. By repeating this operation for 324 times, 256×324 pitch-shift images can be obtained.

By the above described processing, images are stored in pitch-shifted image memory 85 and color image memory 84, respectively. These two images can be output as digital data to SCSI terminal 49 or to internal MO 22 and so on, through memory controller MC under the control of microcomputer CPU2 in charge of memory control, or output to LCD monitor 41 and NTSC output terminals 50, 51 as NTSC signals by the conversion through D/A converter DA1.

When the output is to be provided from SCSI terminal 49, several seconds are necessary to complete transmission of 1 set of output images of the color-pitch-shifted images when the output is in accordance with SCSI standard. Therefore, generally, the color images are recorded by a video equipment as color NTSC signals generally used in a video equipment, the pitch-shifted images are treated as luminance signals of the NTSC signals, and the monochrome image is output as a pitch-shifted image NTSC signal, whereby the color/pitch-shifted image as motion picture can be output. When a high speed image processing apparatus is used, input of real time video image to a computer is possible. Alternatively, the NTSC signal may be connected to a common video equipment and recorded, and thereafter the density images (pitch-shifted images) may be processed frame by frame during reproduction to be input to the computer. By utilizing the color and pitch-shifted images of a moving object input to the computer, the present invention can also be applied to the field of motion analysis of a moving object, for example.

Further, a rotary frame control portion 76 controlling panning and tilting operations of the electric universal head 4 on which the measuring apparatus of the present invention is mounted may be provided as an external equipment of the system. The control operation using such system will be described later.

Figure 24:
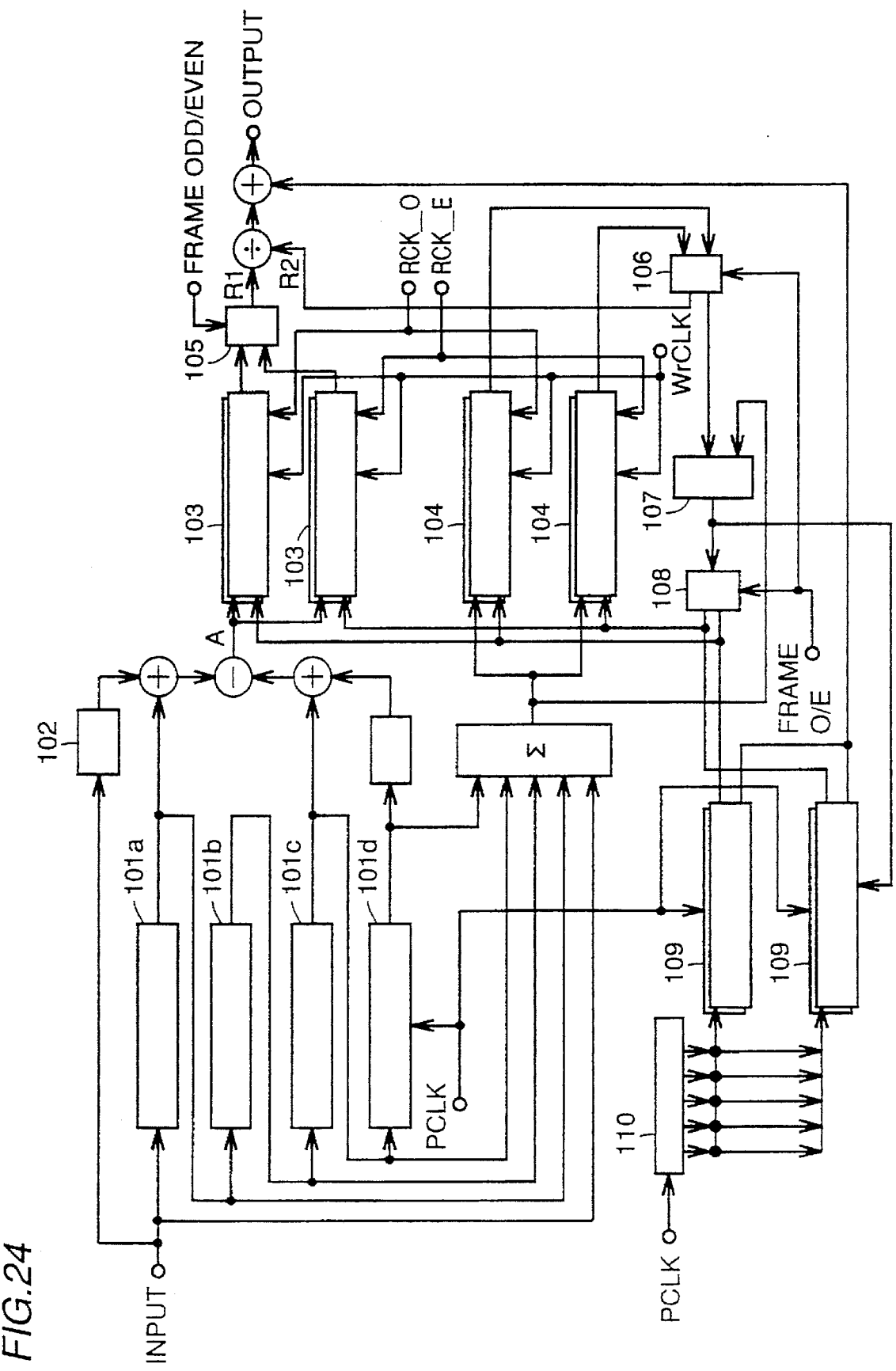
FIG. 24 shows a circuit for calculating position of centroid of the received light in accordance with the first embodiment of the present invention.

FIG. 24 shows a detailed structure of the received light centroid calculating circuit in the pitch-shifted image processing image 83. This circuit has such a hardware structure that calculates the centroid based on information at 5 points out of 16 points of data of a strip-shaped image. Only effective pixels are extracted from signals from distance image sensor 12 by analog pre-processing circuit 82 and A/D converted by an A/D converter AD1, and the resulting signal is input through an input terminal input at the left end of FIG. 14 to the circuit. The input signal is stored for 256×4 lines by 256×8 bits of FIFO (First In First Out) by using four registers 101a to 101d, and with the addition of 1 line input directly, a total of 5 lines are used for calculation. Registers 103a and 104 are the same as register 101, which is 256×8 bits register. Register 109 is an FIFO register of 256×5 bits. Registers 103, 104 and 109 are each provided in duplicate for the same application, since larger memory capacity is preferred as time of several pulses of the clock are necessary for the processings in selecting circuits 106, 108 and comparing circuit 107 and so on. More specifically, these two registers are alternately used, one for the odd-numbered data (O) and one for the even-numbered data (E), and which of these should be used is controlled by clock pulses RCLK__0, RCLK__E. The centroid of the received laser beam is calculated based on data of five points of five lines, in accordance with the following equation. Since the intensity of received light become highest near the position of the centroid, the point of the centroid at Ith row (I=1–256) is calculated by obtaining n=N(I) where $$\Sigma(I,n)=D(I,n+2)+D(I,n+1)+D(I,n)+D(I,n-1)+D(I,n-2) \quad (4)$$

becomes the maximum for each I. Assuming that there is the centroid near N(I)th column, the amount of interpolation corresponding to the weighted mean Δ(I,N(I)) is calculated in accordance with the following equation:

$$\Delta(I,N(I))=\{2*D(I,N(I)+2)+D(I,N(I)+1)-D(I,N(I)-1)-2*D(I,N(I)-2)\}/\Sigma(I,N(I)). \quad (5)$$

Finally, the position of the centroid to be obtained is defined as $$W(I)=N(I)+\Delta(I,N(I)) \quad (6)$$

where D (I,n) represents data at Ith row and nth column. Here, 1 column includes 256 data, in register 101a, data of D(I,n−1) is held, in register 101b, data D(I,n) is held, in register 101c, data D(I,n+1) is held, and in 101d, data of D(I,n+2) is held, and these data are used for calculation. The calculation of Σ(I,n) (equation (4)) is performed by an adding circuit Σ, and the result is stored in register 104. The result of the next calculation is compared with the value MAX (Σ(I,n)) which was calculated last time and stored in register 104 of each row (comparing circuit 107). If the present result is larger, the content of register 104 is updated, and the value of {2*D(I,n+2)+D(I,n+1)−D(I,n−1)−2*D(I,n−2)} calculated at the same time (=numerator of the equation (5)=R1) is updated and stored in register 103, and the column number n is updated and stored in register 109. As for the calculation of R1, data D(I,n+2) and D(I,n−2) are shifted by 1 bit to the left by a shift circuit 102, so as to realize the processing of (×2). Thereafter, calculation is performed by an adding circuit (+) and a subtracting circuit (−), and hence R1 is calculated at the point A, which value is stored in register 103.

As for the column number n, the clock pulse PCLK is counted by a 5 bit binary counter 110, and when the maximum value is updated as a result of comparison at comparing circuit 107, the counter value at that time is taken and stored in register 109. In this embodiment, the number n is in the range of from 1 to 16. Therefore, 5 bits are sufficient for the register 109 and binary counter 110.

By repeating this operation for one strip-shaped image, the values N(I), Σ(I,n(I)) and Y1 which provides MAX(Σ(I, n)) necessary for calculation of the above equations are stored in registers 109, 104 and 103, respectively. When Σ(I,N(I))=R2, then R1/R2 is calculated by a dividing circuit (÷) and calculation of R1/R2+N(I)=Δ(I,N(I))+N(I)=W(I) is calculated by an adding circuit (+). Finally, the value of W(I) for 256 columns is output from an output terminal output at the right end of the figure.

By storing 256 values of W(I) in pitch-shifted image memory 85 and by repeating this processing for 324 strip-shaped images, pitch-shifted image consisting of pitch-shift information W(I) of 256×324 points is formed on pitch-shifted image memory 85.

Figure 25:
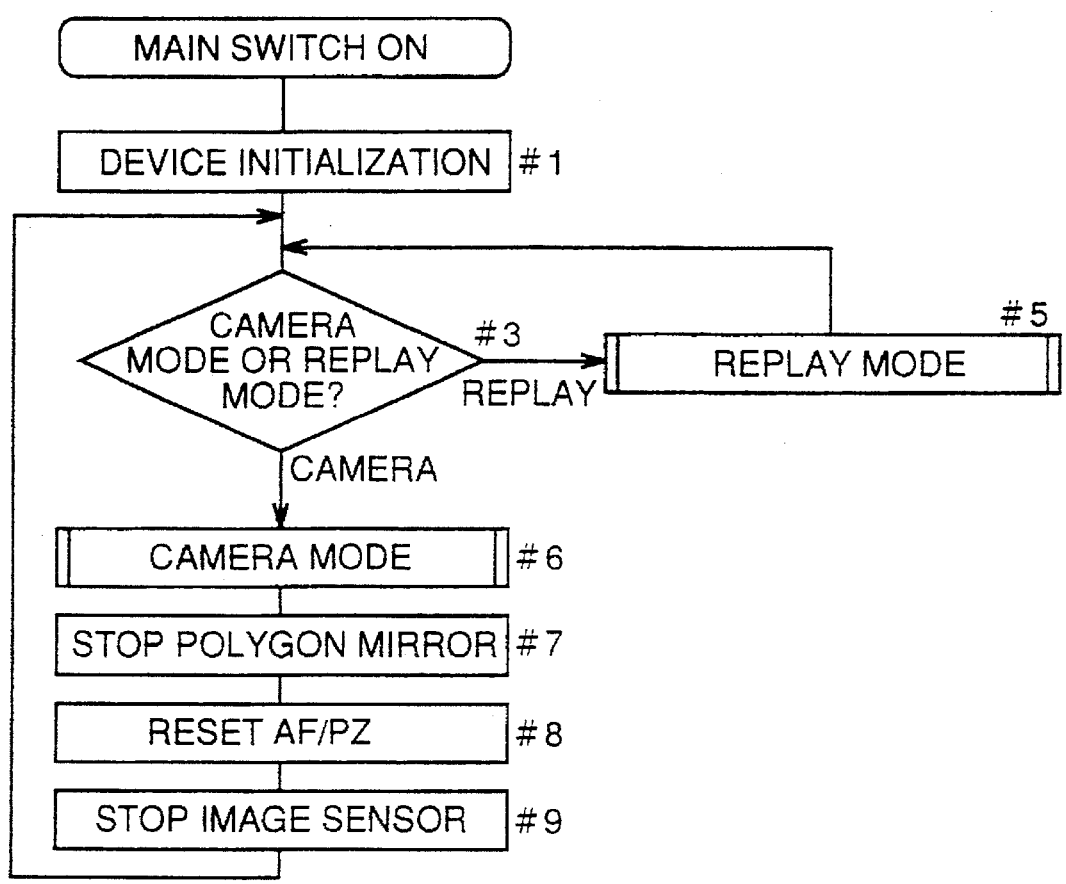
FIG. 25 is a flow chart showing an operation of a main routine of the apparatus shown in FIG. 23.

The operation of the apparatus will be described in detail with reference to flow charts. FIG. 25 is a flow chart of a main routine executed when the main switch is turned on. First, in step #1, devices such as CPUs, memories, SCSI, MO, display, control panel and so on are initialized, in step #3, operation mode is determined. The operation mode includes a camera mode in which three-dimensional measurement is carried out, and a replay mode in which the three-dimensional data is read from a storage device 22 such as MO and displayed in an internal display, which modes can be selected by switch operation. Alternatively, either of the modes can be set as a default mode. In the replay mode, the flow proceeds to step #5 and processes for the replay mode, which will be described later, are executed. In the camera mode, the flow proceeds to step #6, and the processes for the camera mode, which will be described later, are executed. When camera mode terminates, the polygon mirror is stopped in step #7, and in step #8, AF/PZ is reset and the lens is returned to the initial position. In step #9, the image sensor and the sensor driving circuit are stopped, then the flow returns to the step #3 for determining the operation mode.

The operation in the camera mode will be described with reference to the flow chart of FIG. 26(a). When the camera mode is selected, in step #11, various devices are initialized, in step #13, the color image sensor is activated, and the color image is supplied to a monitor display 41. As for the image, an auto focus sensor 31 arranged in the light receiving zoom lens is driven so that the light is always received with optimal state of focusing and optimal color image is obtained. Next, in step #15, driving of the polygon mirror which requires long time to reach the stable state is started earlier so as to be ready for sensing of the distance image. In step #17, AF/PZ subroutine is executed. In step #19, the flow waits until the operation of the polygon mirror becomes stable. When it becomes stable, the flow enters the shutter mode at step #21, and the shutter mode subroutine is executed. In step #23, data transfer mode starts and the data transfer mode subroutine is executed. In step #25, whether the camera mode is completed or not is determined, and if it is completed, the flow proceeds to step #27 and returns to the main flow. If not completed, the flow returns to step #21.

The AF/PZ subroutine will be described with reference to FIG. 26(b). In step (#31) the lens position of the light projecting and receiving systems are reset, in step #33, the range of laser scanning is reset, and in step #35, the flow returns to the main flow.

Figure 27:
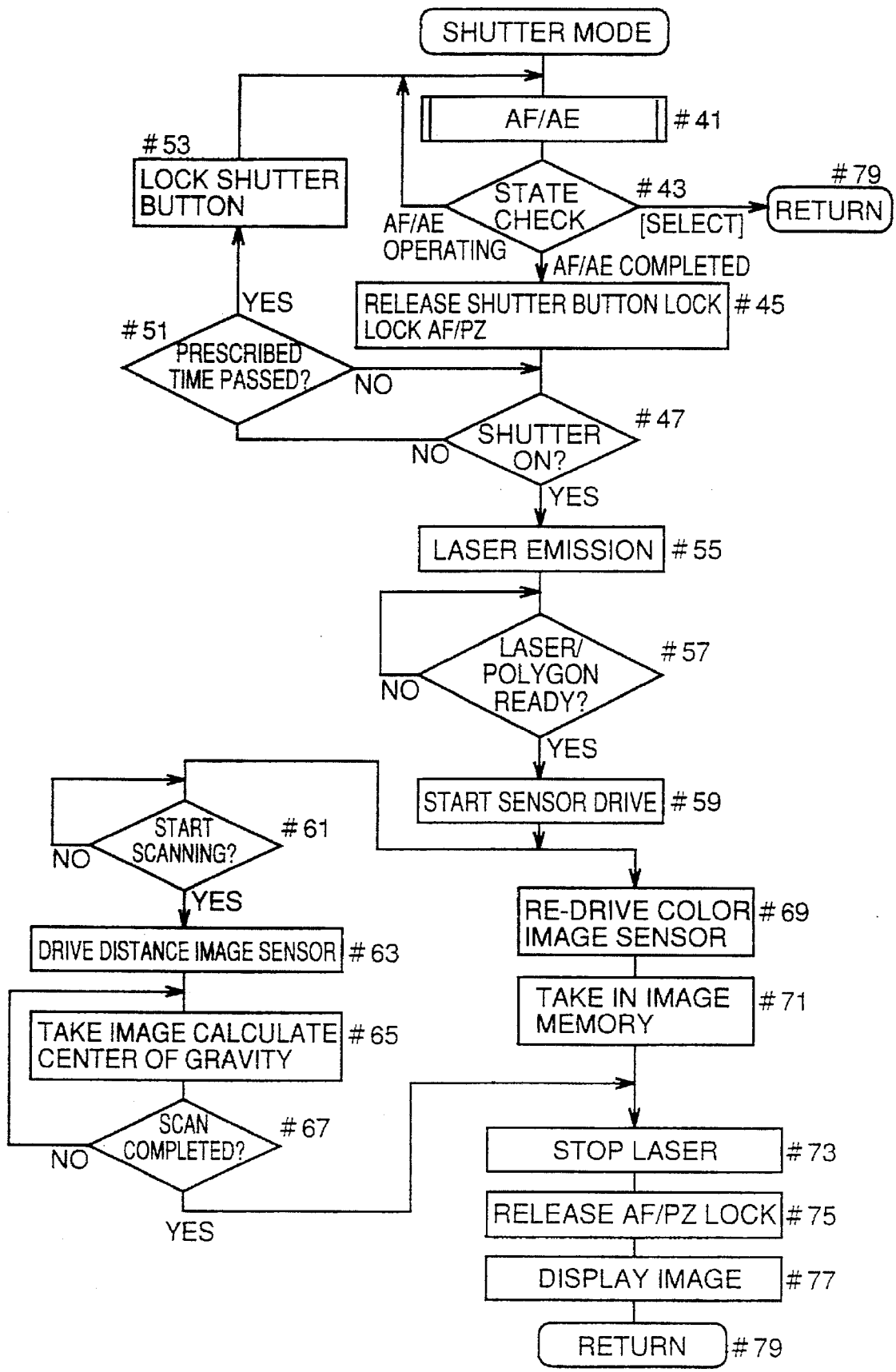
FIG. 27 is a flow chart showing an operation in a shutter mode shown in FIG. 26.

The shutter mode operation will be described with reference to the flow chart of FIG. 27. In this state, the user switches the trimming by changing the position of the measuring apparatus, attitude and the zooming magnification. Meanwhile, the apparatus waits for an output of a release signal by the pressing of shutter release button 47. In step #41, an AF/AE subroutine is executed in which the apparatus is set to in-focus state, and the brightness is measured. This subroutine will be described later. In step #43, the states of select key 43 and AF/AE are checked. First, whether the select key has been pressed or not is determined. If it has been pressed ([Select]), the flow returns to the main flow in step #79 so as to go out of the shutter mode. This corresponds to release of the first stroke of the shutter release button in a general single lens reflex camera. If the select key has not yet been depressed, the state of AF/AE processing is checked and if the AF/AE processing is being carried out, the flow returns to #41, and AF/AE processing is repeated. If AF/AE processing has been completed, the flow proceeds to the next step (#45). More specifically, in the processing period described above, focusing and measurement of brightness for the light receiving system and light projecting system zoom lenses are repeated continuously, so that the in-focus state is always maintained.

After the completion of AF/AE, lock of the shutter button 47 is released to be ready for sensing in step #47, and driving of focusing or zooming is inhibited (AF/PZ lock). In step #47, whether the shutter button 47 is pressed or not is determined. If the shutter button is depressed, the flow proceeds to step #55. If not, the flow proceeds to step #51 in which whether a prescribed time period has passed or not is determined. If the prescribed time period has not yet lapsed, the flow returns to step #47 and determines whether or not the shutter button is pressed. If the prescribed time period has passed, the flow proceeds to step #53 in which operation of the shutter button is locked and then the flow returns to step #41.

In step #55, laser beam is projected, and in step #57, the flow waits for the rise of the laser beam until it reaches the normal oscillation and also waits for the completion of the preparation of polygon mirror operation. When the preparation is completed, driving of the sensor is started in step #59. In step #61, the flow waits until an output from scanning start sensor is received, which sensor is attached aside the condenser lens. When the scanning start signal is received, in step #63, the flow waits for the dead time Td, and then starts driving of the distance image sensor. The dead time Td is calculated based on the focal length f, the base length 1 and the distance d to the reference plane for measurement. In step #65, the position of the input strip-shaped image of the distance image sensor is set to the initial position, and operation for taking the pitch-shifted image and color image is started. At the same time, the position of the centroid of the input light is calculated. In step #67, whether the scanning has been completed or not is determined. If not, the flow returns to step #65 and repeats taking of images. With the position of the input strip-shaped image shifted pitch by pitch from the initial position in accordance with the scanning by the slit-shaped laser beam, 324 strip-shaped images are taken.

When driving of the sensor is started, subsequent to the start of driving the distance image sensor, the color image sensor is driven again in step #69, and in step #71, the read color image is taken in color image memory. Driving of both image sensors and taking of the images to the memories are adapted to be performed simultaneously and automatically by hardware structure. Then the flow proceeds to step #73. After the completion of taking of the pitch-shifted images and the color images, emission of the laser beam is stopped in step #73, inhibition of zoom driving and focus driving is canceled in step #75, the taken image is displayed in accordance with the selected mode in step #77, and the flow returns to the main flow in step #79.

Figure 28:
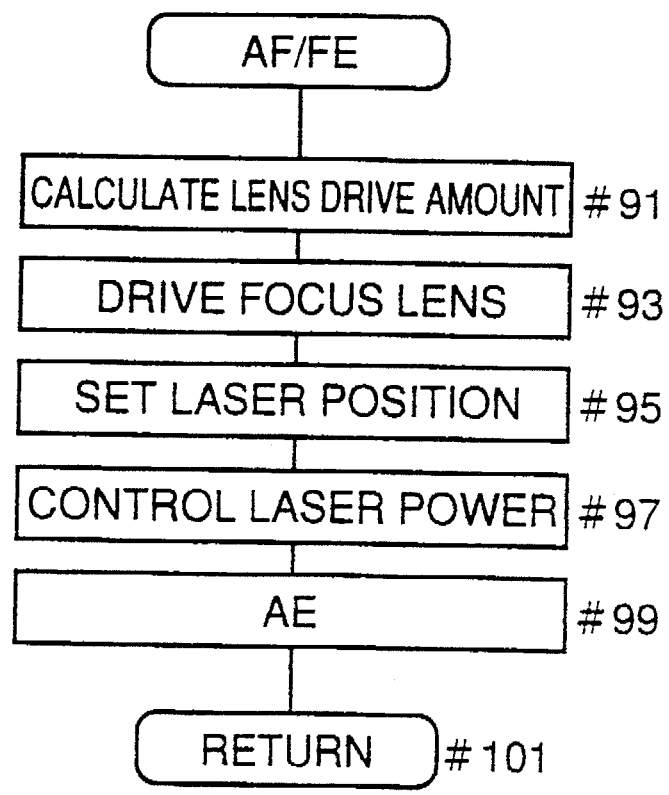
FIG. 28 is a flow chart of an AF/AE subroutine shown in FIG. 27.

The flow chart of the AF/AE subroutine of step #41 will be described with reference to FIG. 28. First, in step #91, the amount of driving the lens is calculated based on the information from AF sensor 31, and based on the result of calculation, the focusing lens is driven (step #93). In step #95, the scan start laser position is set, and laser power is controlled in step #97. In step #99, brightness is measured (AE), and the flow returns to the main flow in step #101.

Figure 29:
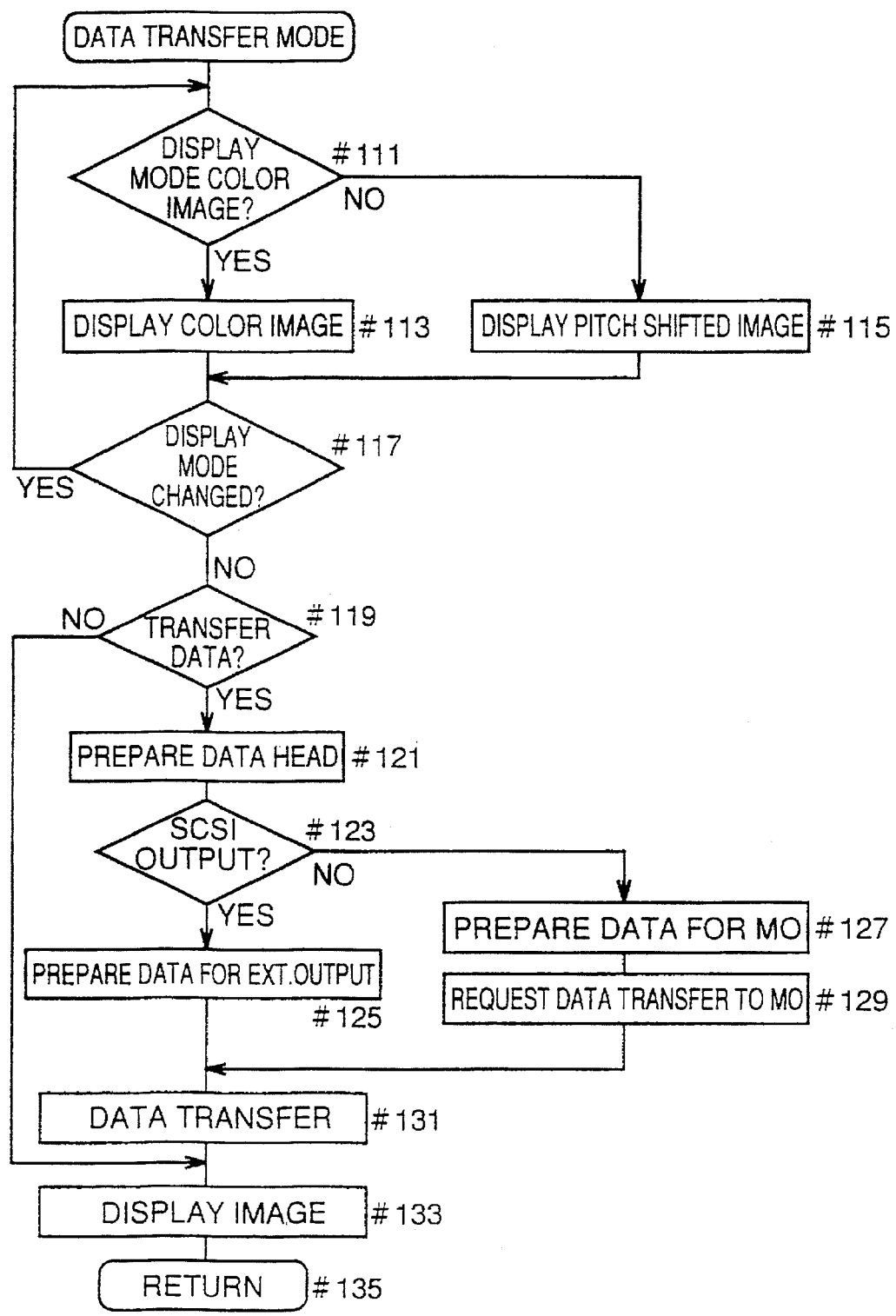
FIG. 29 is a flow chart showing an operation in data transfer mode shown in FIG. 26.

The data transfer mode will be described with reference to the flow chart of FIG. 29. First, in step #111, display mode is determined. More specifically, the flag is checked so as to determine whether the pitch-shifted image in which the image is displayed in light and shade or a color image, is selected. The display mode can be selected by key operation and color image display is set in the default state, for example. When there is no key operation or when color image is selected by the key operation, a color image is displayed in step #113. When the display of the pitch-shifted image is selected, the pitch-shifted image is displayed in step #115. After the image display, in step #117, whether the display mode is changed or not is determined. If it is changed, the flow returns to step #111 and provides image display in accordance with the selected mode. If the display mode is not changed, then the flow proceeds to step #119.

In step #119, whether data transfer is necessary or not is determined. If data transfer is not necessary, the flow proceeds to step #133, in which color image is displayed. When data transfer is necessary, then data header is provided in step #121. In step #123, whether it is an SCSI output mode is determined. If the SCSI output mode is selected, in step #125, data for external output is provided and in step #131, data transfer is carried out. If it is not the SCSI output mode, it means recording by an internal recording apparatus. Therefore, in step #127, data for internal MO drive is prepared, in step #129, data transfer instruction to the MO is transmitted from CPU2 to SCSI controller, and in step #131, data is transferred. Thereafter, in step #133, color image is displayed, and in step #135, the flow returns to the main flow. Selection of the data transfer destination can be selected by key operation.

The replay mode will be described. In step #3, a switch for switching to the replay mode is checked in step #3. If it is not switched, the flow enters a standby state (camera mode) for the next image input, and if it is switched, then the flow enters the replay mode.

Figure 30:
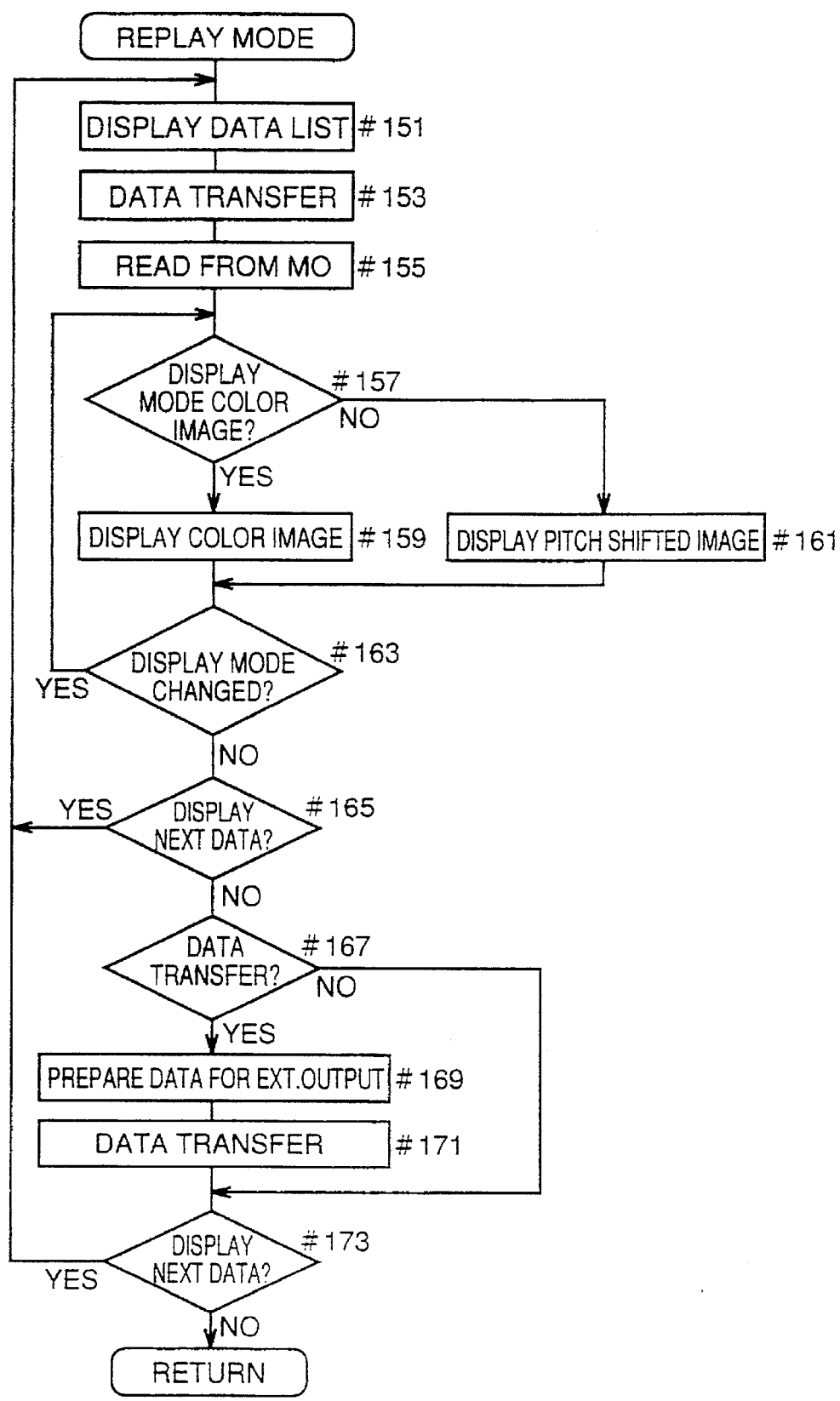
FIG. 30 is a flow chart showing an operation in a replay mode shown in FIG. 25.

The replay mode is different from the camera mode described above, and in this mode, image data which has been already recorded in the internal recording apparatus such as MO is replayed for re-confirmation, or the recorded image data is output to an external apparatus through SCSI terminal, for example. The operation in the replay mode will be described with reference to the flow chart of FIG. 30.

First, in step #151, a list of images stored in the MO is displayed. In step #153, the user selects a re-confirmation display or image data to be transferred to the external apparatus from the display of the list. In the next step #155, the color/pitch-shifted image as the selected image data are loaded from the internal MO to color image/pitch-shifted image memories 84, 85, respectively. In step #157, whether the image to be displayed is in the color image display mode or pitch-shifted image display mode is determined by checking the flag. In accordance with the selected display mode, in step #159, the color image is displayed, or in step #161, the pitch-shifted image is displayed. After the display of the image, in step #163, whether the display mode has been changed or not is determined. If it is changed, the flow returns to step #157 and again provides a display.

If it is not changed, whether the next image data is to be displayed is determined in step #165. If the display is desired, the flow returns to the first step #151 of the subroutine, and repeats selection and display of the images. When the next image is not to be displayed, then in step #167, whether the image data read from the MO to the memory is to be externally transferred is determined. If it is not to be transferred, the flow jumps to the step #173. If the data is to be transferred, in step #169, data for external output is provided, and in step #171, data transfer is performed. Then, in step #173 whether the next image data is to be displayed or not is determined. If display is desired, the flow returns to step #151, and if not, the flow returns to the main flow in step #175.

Figure 31:
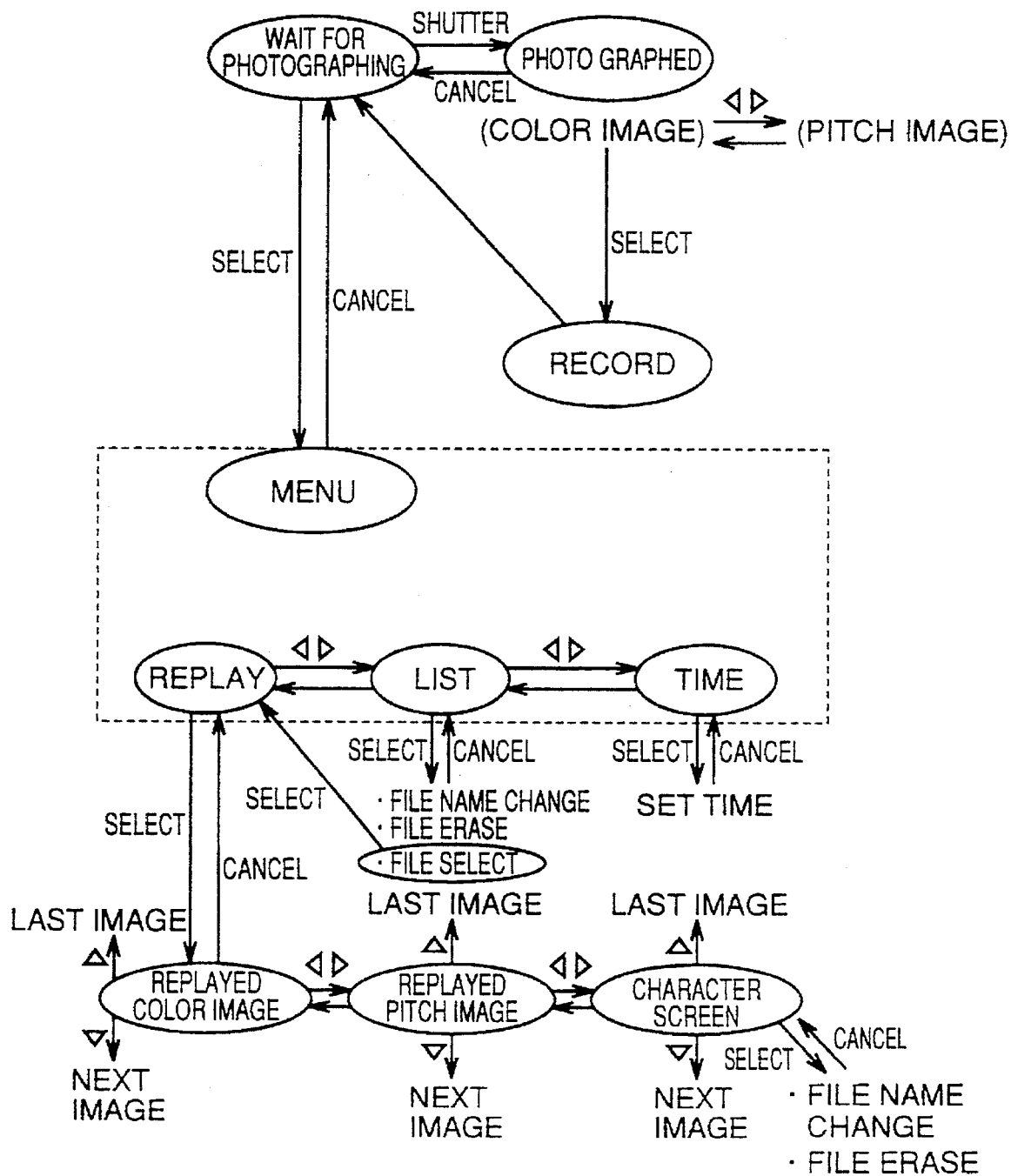
FIG. 31 shows operation state transitions in the measuring apparatus in accordance with the first embodiment of the present invention.

FIG. 31 shows state transitions by key operations between the above described series of operations. Referring to the figure, the sign $\Delta$ pointing upward, downward, left and right directions denotes the operation of a cursor key 42 of FIG. 3. The reference characters [Shutter], [Select] and [Cancel] denote operations of shutter button 47, select key 43 and cancel key 44, respectively. Though clock function is provided in the present embodiment, the time may be automatically allotted to the file name of the image file which is to be recorded.

Reproduction display, list display and clock function can be selected on the menu display, and any of these can be selected and executed by operating the cursor key in the left and right directions and the select key 43. After the selection and execution, the first state which allows selection of the menu display is restored by the operation of cancel key 44. By the clock function, the time can be set. List display function allows file operations such as change of file name, erasure, selection of the file to be displayed, and so on. As to the reproduction display function, color image display is set as the default state. By moving the cursor key in the left and right directions, the display can be switched to the pitch-shifted image display and character image display. In respective display modes, previous image and succeeding image can be displayed by operating the cursor key in upward and downward directions. In the character display, file operations such as change of the file name and erasure can be carried out by the select key.

When a cancel key is operated on the menu display, the operation enters the sensing stand-by mode (camera mode), and operation of the select key restores the menu. When the shutter button is pressed in the sensing stand-by state, sensing is possible and image is taken to the memory. After the sensing operation, by operating the cancel key, the operation can be returned to the sensing stand-by state. When the select key is operated immediately after the sensing operation, recording of the image can be done, and the image taken in the memory is transferred to the memory device. After recording, the operation returns to the sensing stand-by state. At this time, color image is set as the default state, and pitch-shifted image/color image can be selected by the operation of the cursor key in the left and right directions. It is possible to convert the pitch-shifted image to the range image in the measuring system without using the outside computer system, and to display the range image as the density image.

Next, highly precise input by divisional taking by the three-dimensional shape measuring apparatus will be described. When the distance between the light projecting system and the light receiving system, that is, base length 1, focal length f and distance d to the object to be measured are determined, three-dimensional resolution and precision are determined. Measurement with high precision is attained by measuring with the focal length f set at a large value. In other words, the precision in measurement increases in teleside. However, though a three-dimensional image with high precision for measurement can be obtained, the field of view becomes narrower as the focal length f become longer.

Therefore, the focal length f is set to a value corresponding to the desired resolution and precision for measurement and the range of the field of view is divided into a plurality of regions by operating a rotary frame 4 such as an electrical universal head. Measurement is performed for every divided region, and the resulting images are put together or patched up to re-construct one image. By providing such a function, a three-dimensional shape measuring-apparatus of which resolution can be varied is realized. By utilizing this function, environmental measurement becomes possible by performing three-dimensional measurement of the entire peripheral space. This operation will be described referring to a specific example. The example shown in FIG. 32 is a simplified illustration, in which the light projecting system 2 and light receiving system 3 are arranged at positions having horizontal relation, which is different from the example shown in FIG. 3. In this arrangement, the slit shaped light has its length extending in the longitudinal direction, and therefore scanning must be carried out in left and right directions.

Figure 33:
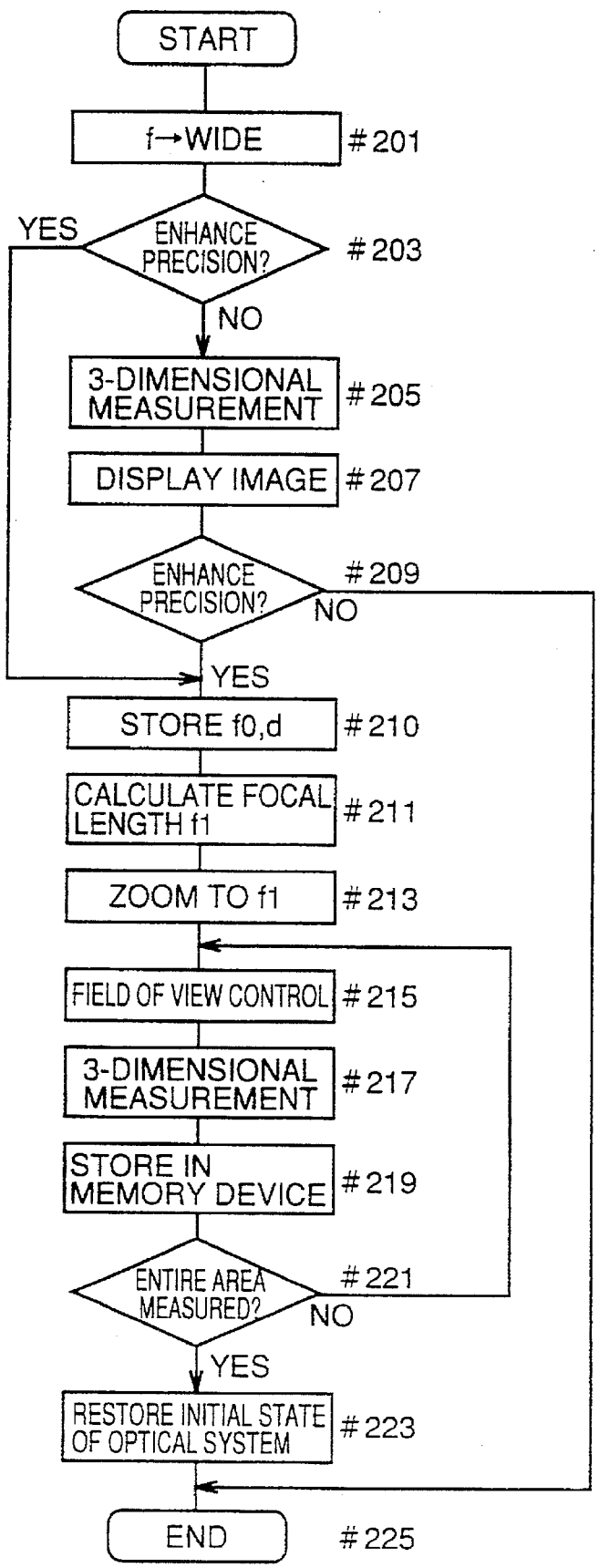
FIG. 33 is a flow chart showing an operation for the image patch up function in accordance with the first embodiment of the present invention.
Figure 34:
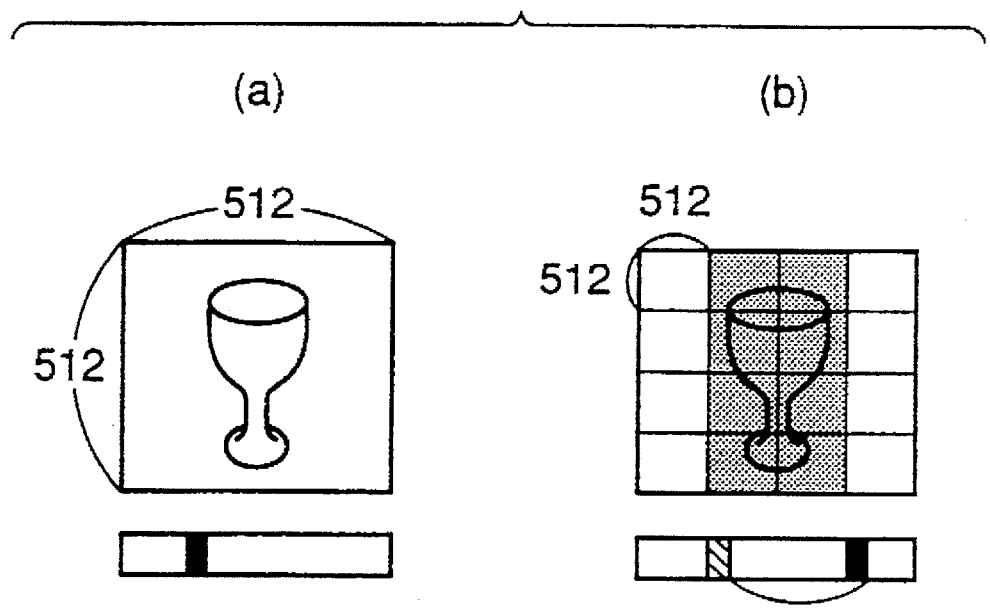
FIGS. 34(a–b) an illustration showing the display for the image patch up function in accordance with the first embodiment of the present invention.

The manner of operation utilizing the image patch up function is shown in FIG. 32. FIG. 33 is a flow chart of the operation utilizing the image patch up function. FIG. 34 shows the state of display when this function is used, in which there is provided a display portion indicating the precision in measurement below the image display portion.

First, referring to FIG. 32(a), the zoom drive system 16 is driven to set the range of the field of view (step #201) to a wide angle state (focal length f0), allowing sensing of the object 1 in the range of the field of view, by the operation of the user. The resolution in the Z axis direction (see FIG. 17: the direction of the ups and downs of the object) assumed at this time is represented by a bar indication below the image, as shown in FIG. 34(a). When the base length is fixed as in the present system, briefly, the resolution $\Delta Z$ in the direction of the Z axis satisfies the following relation between the distance d to the object to be measured and the focal length f at the time of measurement:

$$\Delta Z = K \times d(d-f)/f \qquad (7)$$

where K is a coefficient for estimating the resolution in the direction of the Z axis, which is determined by the sensor pitch and so on. The zooming operation described above is performed by transmitting a command from a system computer through SCSI terminal. Setting of operations such as zooming operation and releasing operation can be set by remote control.

When the user determines that the above described setting allows measurement with sufficient precision and sufficient resolution (NO in step #203), then measurement is started by the releasing operation by the user (step #205), and the result is given on the display (step #207). In this display, the input pitch-shifted image or color image is displayed, as well as the measurement resolution in the direction of the Z axis obtained at that time, displayed in the shape of a bar below the image, as shown in FIG. 34(a). As a result, if measurement with higher precision is not necessary (NO in step #209), measurement is completed, and whether or not the obtained result is to be written to a storage medium is determined, and the corresponding processing is performed. Thus the operation is completed.

When the user determines that measurement is not performed with sufficient precision (YES in step #203), the user can instruct re-measurement with the precision and resolution changed by key operation to the desired resolution in the direction of Z axis and desired precision, referring to the pitch-shifted image taken by the first releasing operation or referring to the display of the measured resolution in the direction of the Z axis (YES in step #209).

When the key input for setting the precision is entered, the system stores the state at that time. More specifically, the system stores the focal length f0 at which the complete view of the object is obtained, and approximate distance d to the object to be measured obtained from the AF sensor, and hence stores the scope of the field of view (step #210). Further, based on the input desired measurement resolution in the direction of the Z axis and the approximate distance d, the system calculates the focal length f1 to be set in accordance with the equation (7) above (step #211).

When the focal length f1 is calculated, automatic zooming is performed to the focal length f1; (step (213); the number of frames to be input in divided manner and the angles of panning and tilting are calculated based on the stored scope of the field of view to be measured, the approximate distance d, and the focal length f1; the position of the field of view is set by panning and tilting rotary frame (step #215); and measurement is performed for every divided input frame (step #217). The images input dividedly when the image patch up function is utilized are set to include overlapping portions which are used for patching up the divided images to re-construct the original one image.

The obtained pitch-shifted image, color image, information indicative of the directions of the field of view in the X and Y directions taken (for example, decoded angle values of panning and tilting, order of taking in the X and Y directions, and so on), the lens focal length, information of measurement distance are stored in an internal MO storage device (step #219). At this time, directory information such as file name, file size and so on may not be written to the memory but such directory information may be written after confirmation by the user at the last step of operation, so that the information is stored temporarily.

Thereafter, by controlling the field of view to a position of the field of view slightly overlapping the position of the field of view of the previous operation by panning and tilting in accordance with the calculated angles of panning and tilting, the image of the adjacent region is input. By repeating this operation, the images of the entire regions are input (NO in step #221, see FIG. 32(b)).

At the completion of the input of the entire region (YES in step #221), the initial camera attitude and initial focal length before enhancing the precision in measurement are resumed (step #223) and hence the operation is completed. The control waits for the determination of writing by the user. When there is a write instruction, directory information is written. If there is not a write instruction, the directory information is not written and the operation is completed. In that case, the information continuously stored in the memory is erased.

When a measurement is performed in advance and thereafter measurement is again performed as in the operation of the above example, the distance to the object and distribution of the distance in the view angle of measurement have been completed by the first measurement. Therefore, re-measurement for patching up is not performed for such a divisional input frame having large difference from the distance to the object, that is, the frame consisting only of the peripheral region (background) different from the object, and re-measurement may be performed only for the divided input frames including the object to be measured. In the example shown in FIG. 34(b), the dotted region including the object of measurement corresponds to the region for which re-measurement is performed. Other regions do not include the object for measurement and therefore re-measurement is not performed.

As described above, high speed three-dimensional measurement is possible, and by repeating partial inputs and patching up the resulting images based on the three-dimensional measurement, three-dimensional shape measurement can be performed of which resolution can be set freely.

In such a patch up measurement, the resolution of the whole image frames are uniform. However, there may be an object which require data with high resolution at some portion but low resolution for other portions. For example, eyes, mouth and nose of one's face are abound in complex shape and color information, while low resolution is sufficient for measuring cheeks, forehead and so on. For such an object, patch up of data may be utilized by partial zooming operation, which results in highly efficient data input. The partial zooming patch up function is realized by the following operations.

Figure 35:
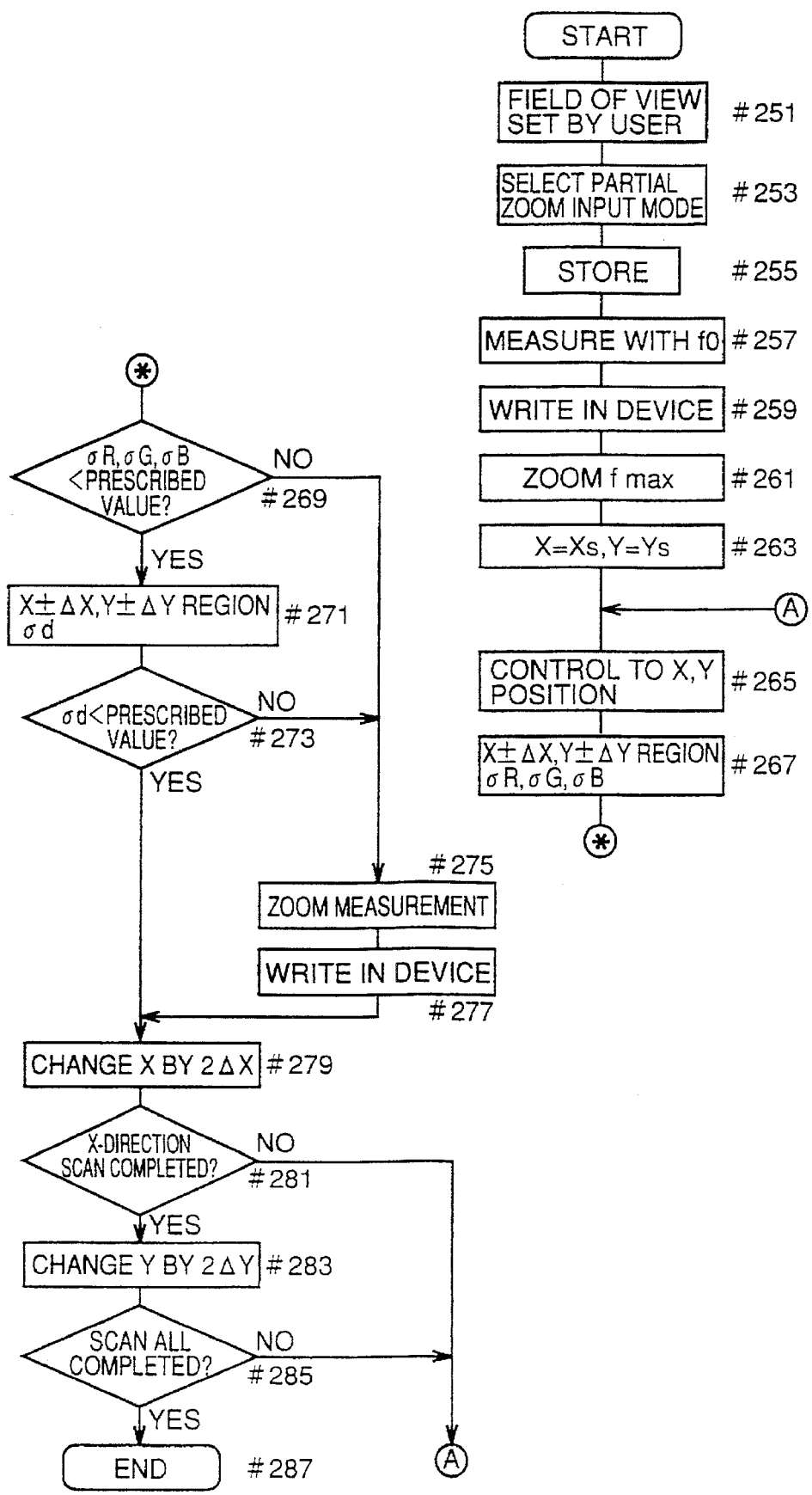
FIG. 35 is a flow showing the operation for the partial zooming patch up function in accordance with the first embodiment of the present invention.

FIG. 35 is a flow chart showing the partial zooming patch up function. First, in step #251, setting of the field of view providing the complete view of the object is performed, in the similar manner as the uniform resolution patch up described above. In step #253, partial zooming input mode is selected. When selection is done, presently set values of focal length f0 and values of decoded angles of panning and tilting are stored (step #255). Measurement is started with focal length f0, and image input is provided as rough image data (step #257). The pitch-shifted image, color image, information indicating the directions of the field of view in the X and Y directions at which the image is taken (for example, decoded angle values of panning and tilting), the lens focal length, and information of measurement distance are stored in an inner storage device (step #259). Thereafter, in step #261, zooming is performed to attain the maximum focal length fmax, the rough image data mentioned above is analyzed, and whether or not re-measurement is to be performed on every divided input frames input after zooming is determined.

When zooming is performed and measurement is done with the maximum focal length fmax, the approximate data is divided to the frame size which allows input. The positions X, Y for panning and tilting are set to the start initial positions Xs and Ys. In step #265, panning and tilting are controlled to the positions X and Y. Then, in step #267, color information, i.e., R, G and B values of the initial input color image of the region X±ΔX and Y±ΔY are subjected to statistical processing, and standard deviations σR, σG and σB of respective regions are calculated. In step #269, whether all the calculated values of the standard deviations σR, σG and σB are within the set previous values are determined. If these are within the prescribed values, it is determined that the small area has uniform brightness information, and therefore zooming measurement is not performed but the flow proceeds to step #271. When any of the standard deviations σR, σG and σB exceeds the prescribed value, it is determined that the small region has complicated color information, and therefore zooming measurement is performed (step #275).

In step #271, standard deviation σd is calculated based on the information of the initial input distance value d in the region of X±ΔX, Y±ΔY. In step #273, whether the calculated value of the standard deviation σd is within a set prescribed value is determined. If it is within the prescribed value, it is determined that the small region is a flat region having little variation in shape, and therefore zooming measurement is not performed but the flow proceeds to step #279. If it exceeds the prescribed value, it is determined that the small region has complicated shape (distance information), and zooming measurement is performed (step #275).

After the zooming measurement in step #275, the obtained pitch-shifted image, color image, information indicative of the direction of the field of view of Z and Y directions at which the image is taken (for example, decoded angle values of panning and tilting), lens focal length, information of distance for measurement and so on are stored in an internal storage device such as MO (step #277). Thereafter, the flow proceeds to step #279.

In step #279, the panning and tilting position X is changed by 2ΔX. In step #281, whether or not scanning in the X direction is completed is determined. If it is not completed, the flow returns to the step #265. If it is completed, the panning.tilting position Y is changed by 2ΔY in step #283. In step #285, whether scanning is completed or not is determined, and if it is not completed, the flow returns to step #265. If the scanning is completed, the flow proceeds to step #287, and this routine terminates.

In this manner, both the schematic image data and partial detailed image information allowing determination of the position can be input. By patching up the data of the schematic image and the partial detailed image data corresponding to the position, highly efficient three-dimensional input corresponding to how complicated the shape and color information can be realized.

The second embodiment of the present invention will be described. Patching up when sensingoperation is done with the camera mounted on an universal head will be described. The patched up image is obtained by taking a plurality of pictures of a fixed object by panning and tilting the camera mounted on the universal head which allows panning and tilting, and the data of the plurality of photographed images are converted to one coordinate system to obtain the patched up image.

When the camera is to be panned and tilted, highly precise patching up is possible without any problem if the angle of rotation can be controlled precisely. However, highly precise universal head is very expensive, and therefore sensing by using general, not so expensive universal head is desired, which universal head may have considerable error in controlling the angle of rotation.

Figure 36:
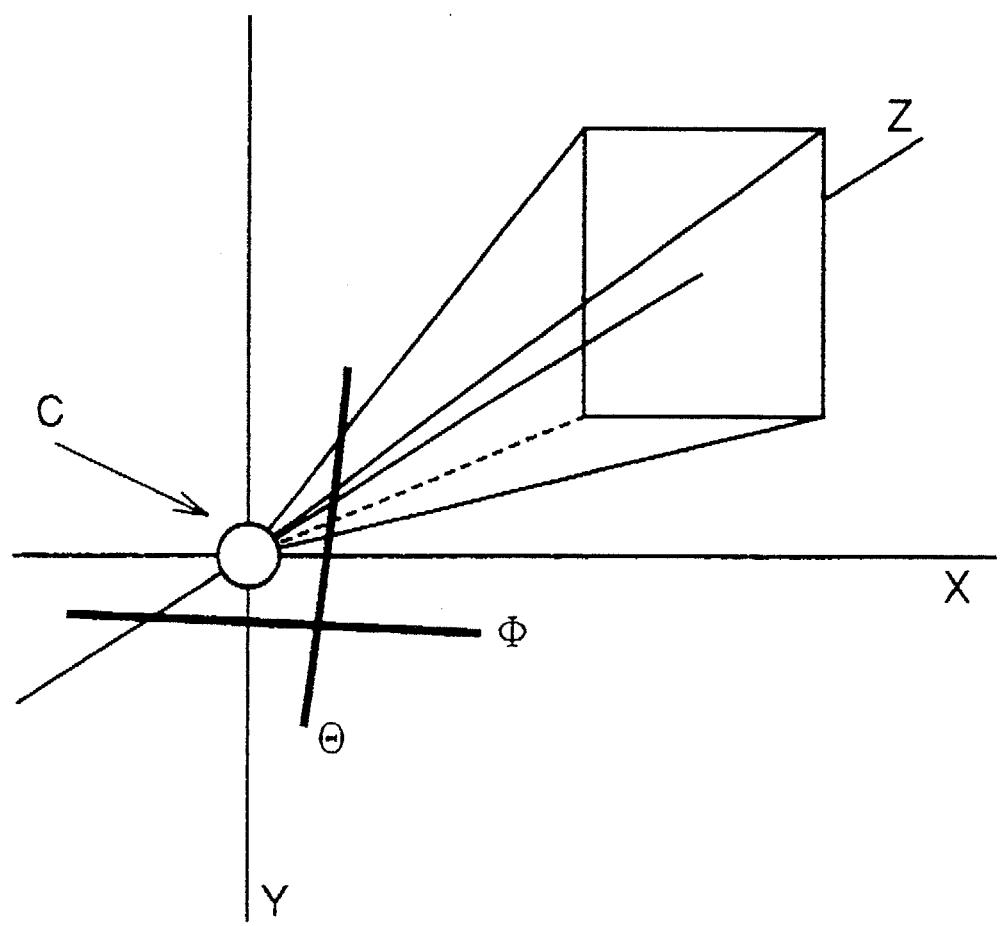
FIG. 36 is an illustration showing a camera model when photographing is performed by using a camera universal head in accordance with the second embodiment of the present invention.

In that case, a camera model such as shown in FIG. 36 is prepared. This is a camera which allows panning and tilting, represented in three-dimensional coordinate system. In FIG. 36, the reference character C denotes the camera, θ denotes the axis of rotation of the camera (panning), and Φ represents the axis of rotation of the camera (tilting).

Parameters of the model (position and direction of the axis of rotation for panning, position and direction of the axis of rotation for tilting) are calculated in advance by calibration. Searching of the junction point (at which two image data are jointed) carried out subsequently is performed by changing parameters θ (pan angle) and Φ (tilting angle) of the model.

Figure 37:
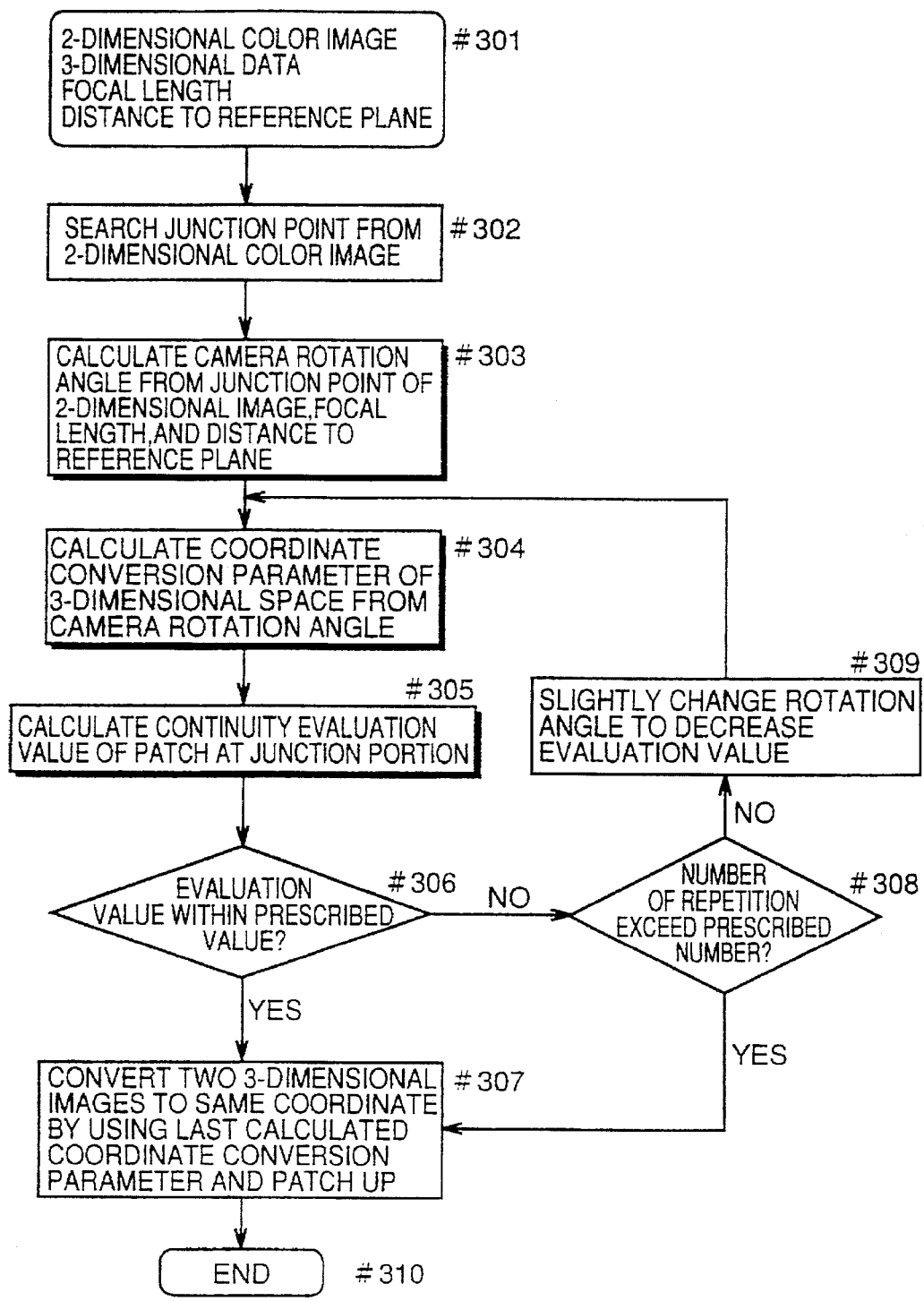
FIG. 37 is a flow chart showing an operation for patching up three-dimensional data photographed by using the camera universal head in accordance with the second embodiment of the present invention.

This operation will be described with reference to the flow chart of FIG. 37. First, two-dimensional color image, three-dimensional data, focal length and the distance to the reference plane are taken from the photographed data (stored in the storage device in the camera apparatus, as described above) (step #301). Then, the junction point is searched from the two-dimensional color image (step #302: details will be given later).

However, the points of measurement of the two images photographed by panning and tilting the camera do not always coincide with each other (even when the images are photographed with the same sensing distance and focal length, the images deviate from each other by half pixel, at most). Therefore, when the deviation is within 1 pixel, searching of the junction point is regarded successful, based on the color image (two-dimensional data), and searching hereafter is performed by using the three-dimensional data.

First, based on the junction point of the two-dimensional images, the focal length and the distance to the reference plane, the angles of camera rotation (pan angle θ and tilting angle Φ) are calculated (step #303, details will be given later). Thereafter, according to the calculated camera rotation angles, coordinate conversion parameters for the three-dimensional space are calculated (step #304, details will be given later).

Then, a square sum of an angle formed by normals of two planes passing through the junction portion is regarded as an evaluation value, and search for minimizing the evaluation value is performed (step #305). The method of calculating the evaluation value will be described in detail later.

Since rough search is performed using the two-dimensional images, search for a very narrow scope is enough for the three-dimensional data. Therefore, the amount of calculation in total can be reduced as compared with the search utilizing the three-dimensional data only, whereby patch up operation can be done at high speed.

Thereafter, whether the calculated evaluation value is within a prescribed value is determined (step #306). When it is not larger than the prescribed value, two three-dimensional images are converted to the same coordinate system by using the last calculated coordinate conversion parameter for patching up (step #307) and the operation is completed (step #310). The method of coordinate conversion will be described later.

When the evaluation value is larger than the prescribed value in step #306, then whether the number of repetition of continuity evaluation is not smaller than a prescribed number is determined (step #308). If it is not smaller than the number, the patch up operation in step #307 is performed. The reason is that when the number of repetition exceeds a prescribed number, the evaluation value converges, making further repetition unnecessary.

When the number of repetition is smaller than the prescribed number in step #308, then the angle of rotation of the camera is slightly changed so that the evaluation value calculated in step #305 becomes smaller (step #309).

Thereafter, the flow proceeds to step #304 and continuity evaluation of the patches at the junction portion is repeated.

In the following, each of the steps will be described in greater detail.

First, the method of searching the junction point from two-dimensional color images in step #302 will be described with reference to FIGS. 38 to 40. The description will be given on the premise that two images to be patched up have overlapping portions (having the width of T pixels) as shown in FIG. 38. Referring to FIG. 39 (a), a reference window is set at a central portion of the overlapping portion of one of the images (the dotted line in FIG. 39(a) denotes the center line of the overlapping portion). FIG. 39(b) is an enlarged view of the reference window portion of FIG. 39(a). This reference window is further divided into small windows each having the size of about 8×8 (pixels). Of the small windows, one having a complicated shape or complicated patterns (having large value of distribution) is used as a comparing window. The reason for this is that when a portion having clear edges or complicated patterns or shapes is used, reliability of evaluation can be improved.

Figure 40:
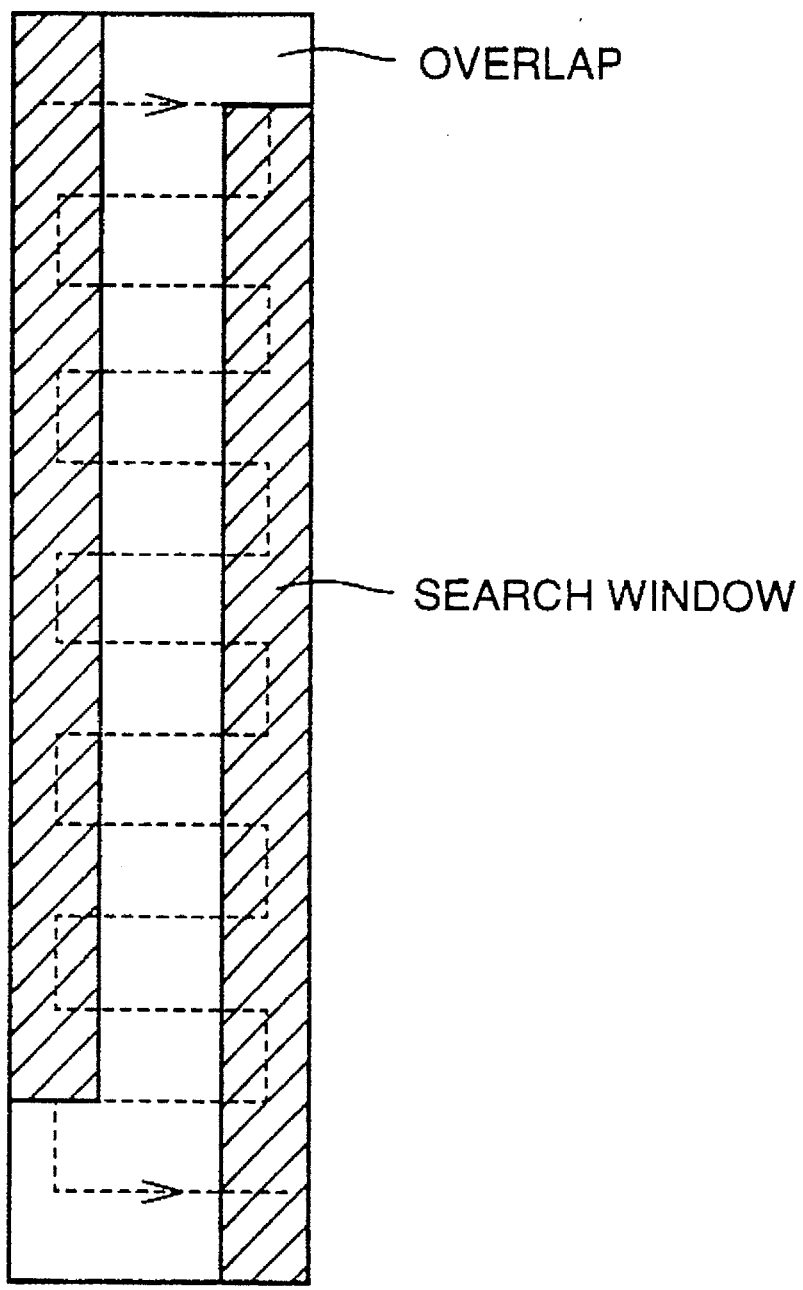
FIG. 40 is an illustration of a search window for patching up two-dimensional images in accordance with the second embodiment of the present invention.

On the other image, a searching window which has the same size as the reference window and which is movable to move on the entire overlapping portion is set (FIG. 40).

In this searching window, small windows are provided at relatively the same positions as the comparing windows in the reference window. The square sum of the difference in luminance between the small window and the comparing window is used as the evaluation value, and the junction point is searched.

Figure 41:
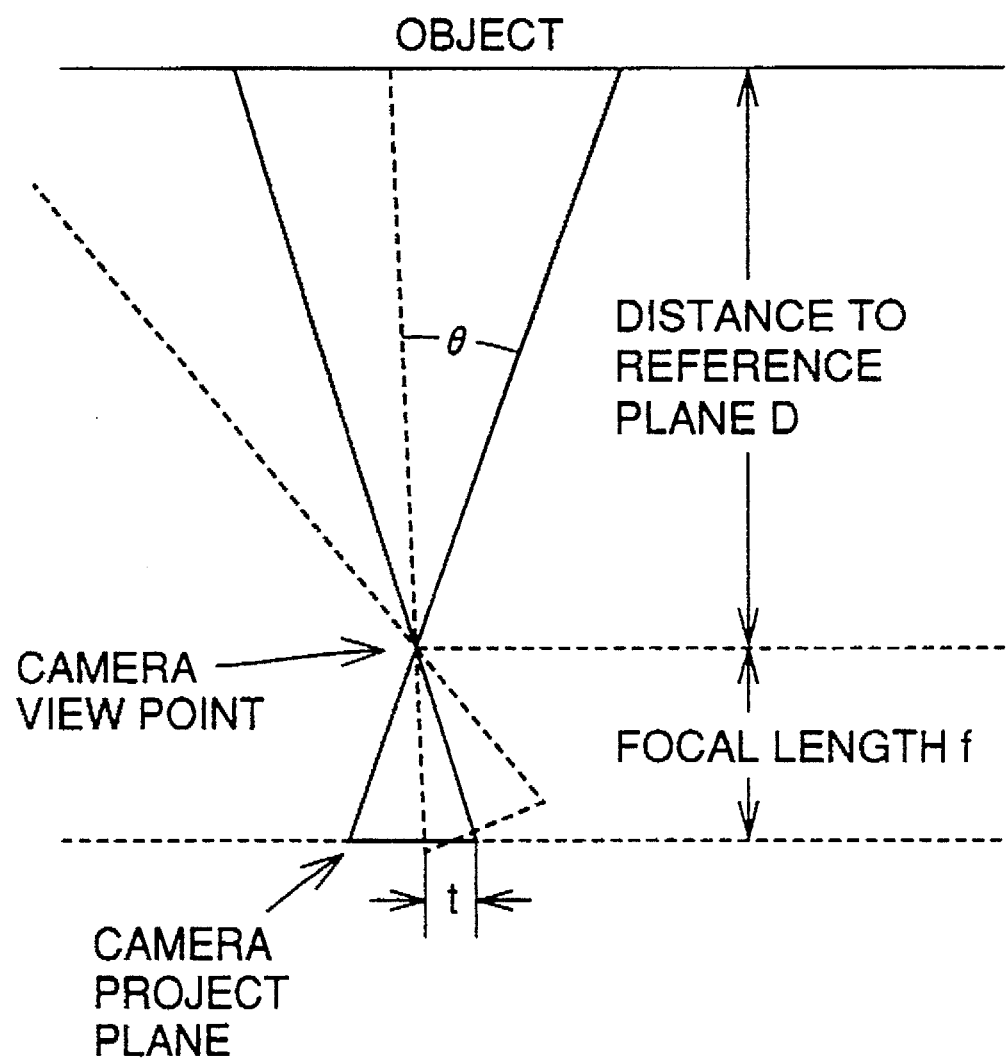
FIG. 41 shows a method of calculation of camera rotation angle in accordance with the second embodiment of the present invention.

Next, the method of calculating camera rotation angle based on the two-dimensional image junction point, the focal length and the distance to the reference plane of step #303 will be described. When we represent the pixel size as PS, camera plane size as 2×S, focal length f and the number of shifted pixels as T, the camera rotation angle θ can be obtained by the following equation if the axes of rotation and the camera position coincide with each other (that is, the rotation axis intersects the optical axis of the camera) (FIG. 41):

$$\theta = \pi - \arctan(S/f) - ((S - PS \times t)/f).$$

If the rotation axis does not coincide with the camera position (when the rotation axis and the camera axis are deviated from each other), the following relation holds, where r represents radius of rotation (distance between the rotation axis and the optical axis of the camera), and D represents the distance to the reference plane:

$$t \times PS \times D/f = 2S \times D/f - (D + r \times \sin\theta)/ \tan(\pi - \arctan(f/S) - \theta) - S \times D/f - r \times \cos\theta.$$

When the rotation axis and the camera position do not coincide with each other, the calculation becomes very complicated and the angle of rotation cannot be obtained easily. Therefore, it is preferable to provide a table showing number of pixels (t) and corresponding angles obtained by searching, so that the angle of rotation can be readily found.

The method of calculating the coordinate conversion parameter of the camera in step #304, and the method of coordinate conversion of step #307 will be described. When we represent the coordinate systems of two cameras as C1 (X1, Y1, Z1) and C2 (X2, Y2, Z2), the position of the camera rotation axis as T (t1, t2, t3) and the direction of rotation of the camera as (1, 0, 0) (rotation about the X axis in the coordinate system of C1), then C2 when rotated by θ about the axis of rotation is converted to the coordinate system of C1 in accordance with the following equation:

$$C2-T=R(\theta).(C1-T)$$

where R (θ) is obtained by the following equation, based on the angle θ of camera rotation:

$$R(\theta) = \begin{vmatrix} 1 & 0 & 0 \\ 0 & \cos\theta & -\sin\theta \\ 0 & \sin\theta & \cos\theta \end{vmatrix}$$

Therefore, conversion of C2 coordinate system to the C1 coordinate system can be represented by the following equation, using parameters R (θ) and T:

$$C1=R(\theta)^{-1}.(C2-T)+T$$

More specifically, the point C1 (of C1 coordinate system) is moved in parallel onto the rotation axis, the coordinate is converted to the C2 coordinate system on the rotation axis (rotated by θ), and the point is moved in parallel from the rotation axis to the point C2.

The above described operation is for the panning angle. Similar coordinate conversion can be performed by using the Y axis as the rotation axis for the tilting angle.

Figure 42:
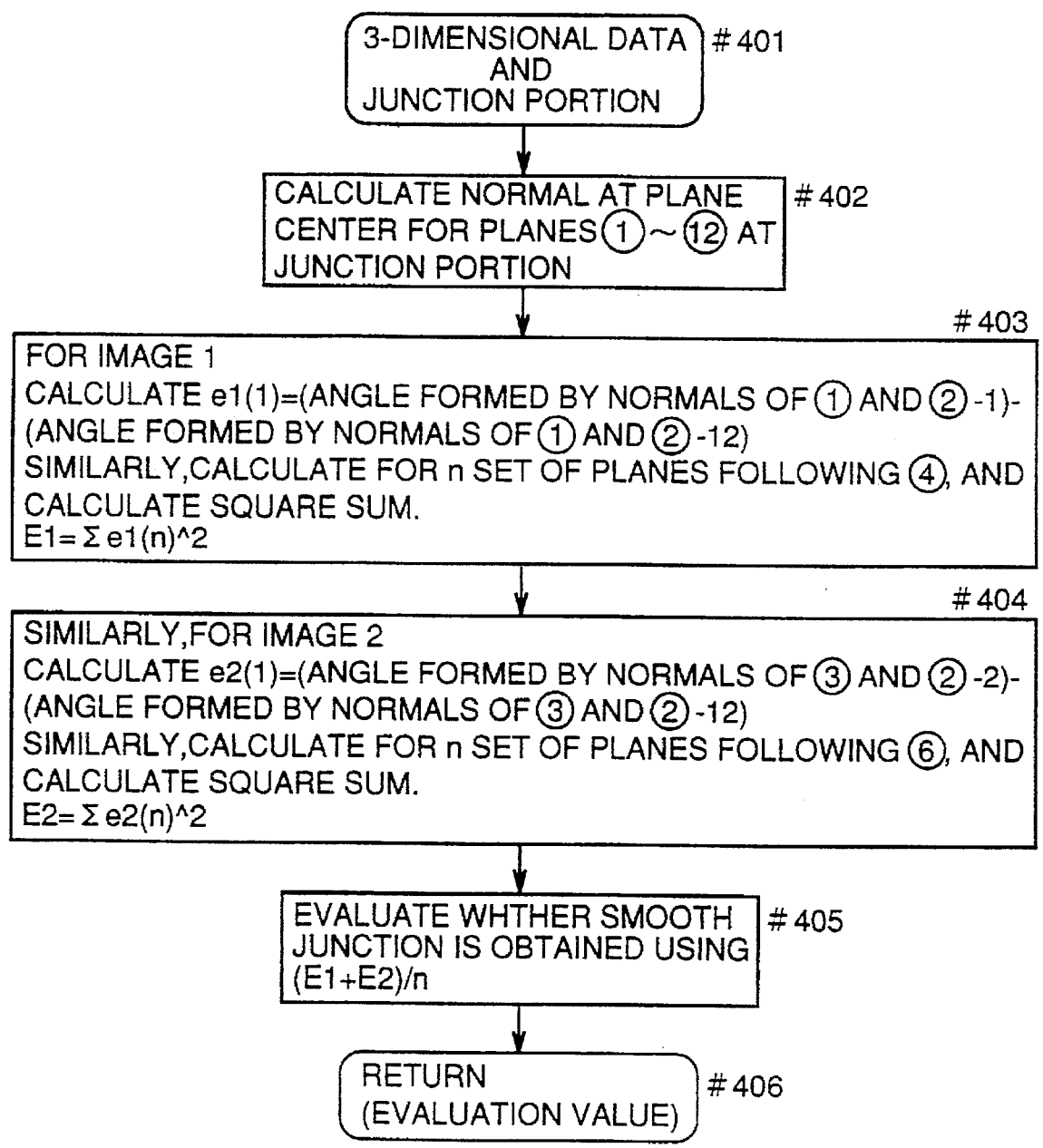
FIG. 42 is a flow chart showing an operation for continuity evaluation of patches at the junction portion in accordance with the second embodiment of the present invention.
Figure 43:
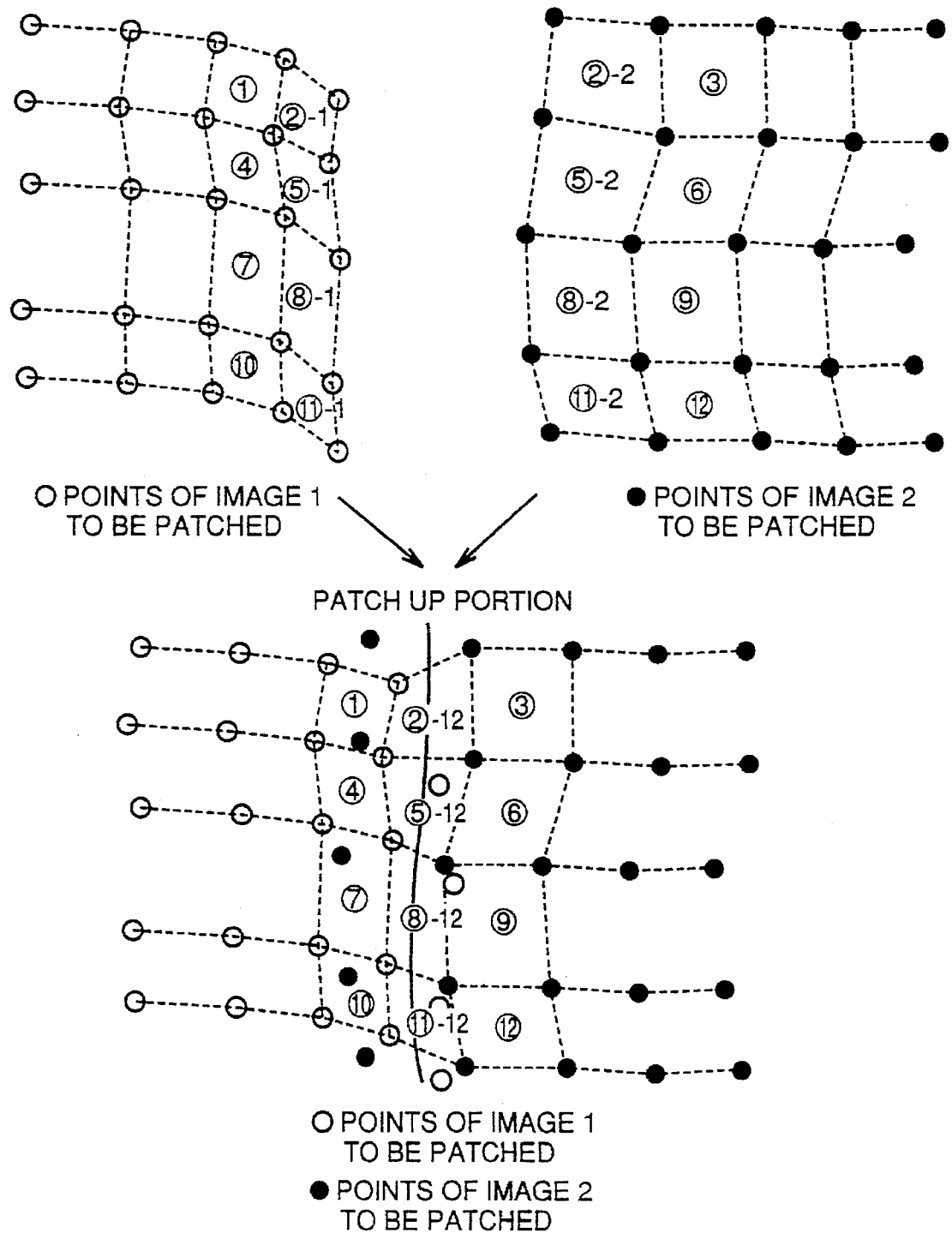
FIG. 43 is an illustration of patch up of photograph data using the camera universal head in accordance with the second embodiment of the present invention.

The method of calculating the continuity evaluation value of the patches at the junction portion in step #305 will be described in greater detail with reference to the flow chart of FIG. 42 and FIG. 43.

First, three-dimensional data of two images including the point of junction searched from the two-dimensional color images are taken (step #401). Thereafter, normals at the center of the planes 1 to 12 at the portion of junction between the first image (the image represented by the white circle in FIG. 43) and the second image (the image represented by the block circle in FIG. 43) are calculated (step #402).

Then, for the first image, e1(1)=(angle provided by the normals of ① and ② −1) - angle formed by the novels of ① and ②−12) is calculated. Similar calculation is performed for n sets of planes following the plane ④, and square sum (e1) of the result is obtained (step #403). For the second image, e2 (1)=(angle formed by normals of ③ and ②−2) - (angle formed by normals of ③ and ②−12) is calculated, similar calculation is performed for n sets of planes following the plane ⑥, and the square sum (e2) of the results is obtained (step #404).

Then, whether a smooth junction is obtained or not is evaluated by using $$(E1+E2)/n$$

in (step #405), and the evaluation value is returned to the main routine (step #406).

Patched up of the data photographed by a plurality of cameras will be described. When a plurality of cameras are used for photographing, the relative position and orientation can be measured by sensing cameras by each other. Therefore, based on the data, the position of the object (corresponding to the position of the rotation axis) and the angle between the cameras viewed from the object (corresponding to the angle of rotation) are calculated. Based on these calculated values, coordinate conversion parameters are calculated, and two three-dimensional images are converted to the same coordinate system and patched up. The details of the patching up operation is similar to that when the camera frame is used described above. Therefore, description is not repeated.

When the cameras are photographed by each other, the camera position can be calculated with higher precision if a lens having longer focal length than used for sensing the object is used. By doing so, undesirable influence on the object data at the time of patching can be avoided.

Figure 44:
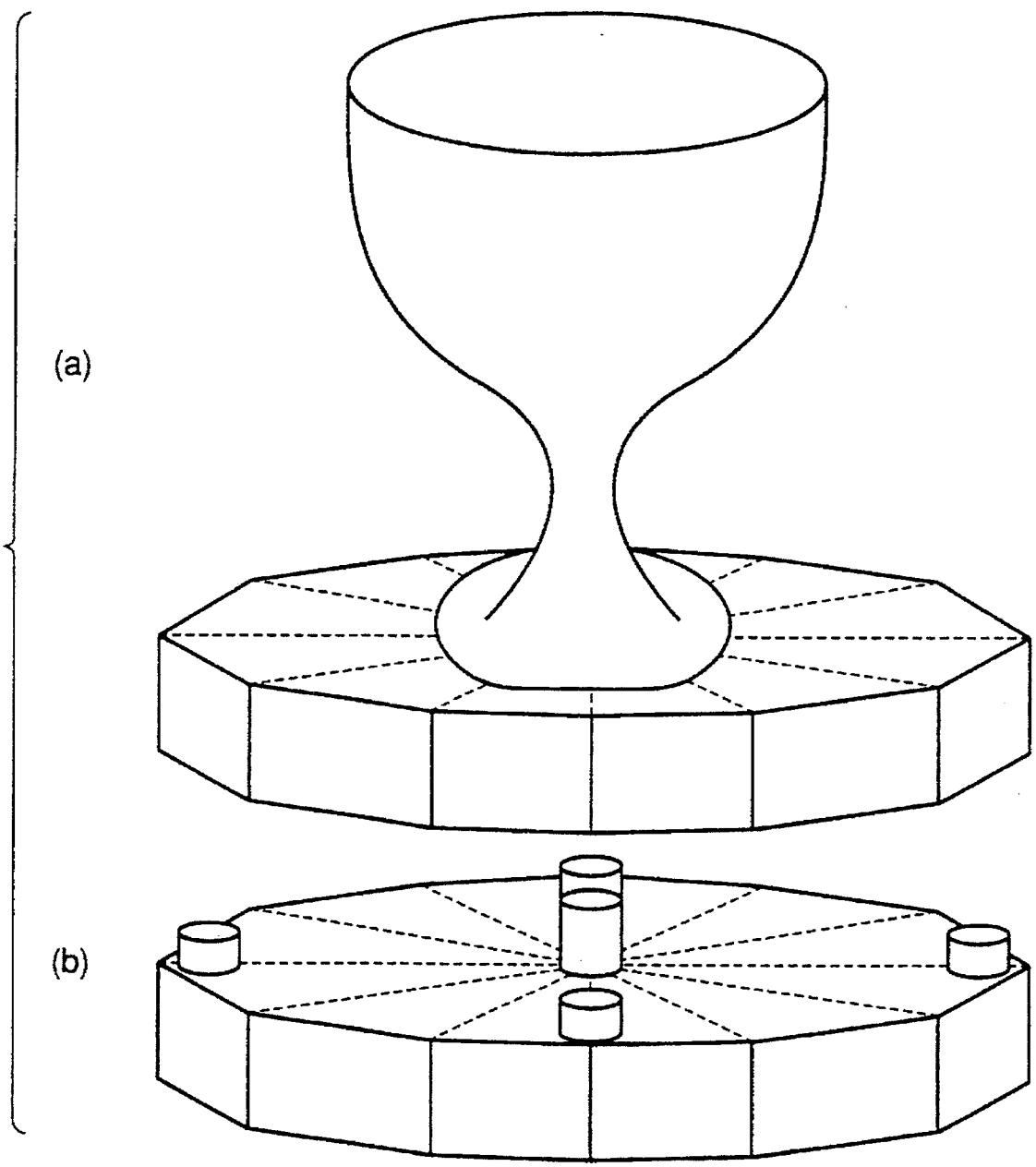
FIGS. 44(a–b) are a perspective view showing appearance of a rotary stage in accordance with the second embodiment of the present invention.
Figure 45:
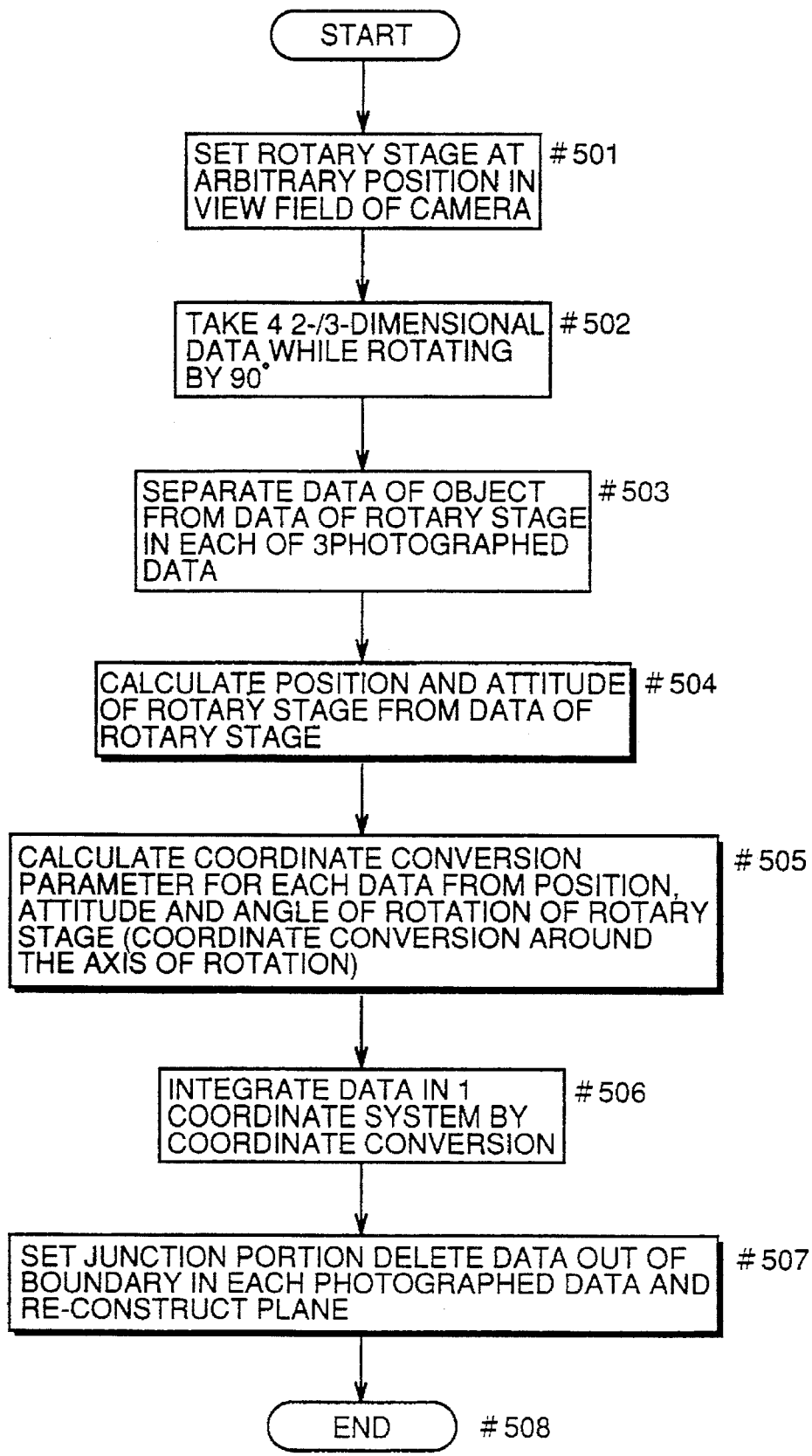
FIG. 45 is a flow chart showing an operation of patching up three-dimensional data photographed by using the rotary stage in accordance with the second embodiment of the present invention.

Next, patch up of data when the object is photographed placed on a rotary stage will be described with reference to FIG. 44 and the flow chart of FIG. 45. FIG. 44 shows a rotary stage on which the object is placed. The rotary stage has polygonal circumference. The normal of each plane is orthogonal to the rotation axis, and the planes are arranged at equal distance from the rotary axis. Therefore, when each plane is measured, the distance and position of the rotary axis of the rotary stage can be calculated.

Figure 46:
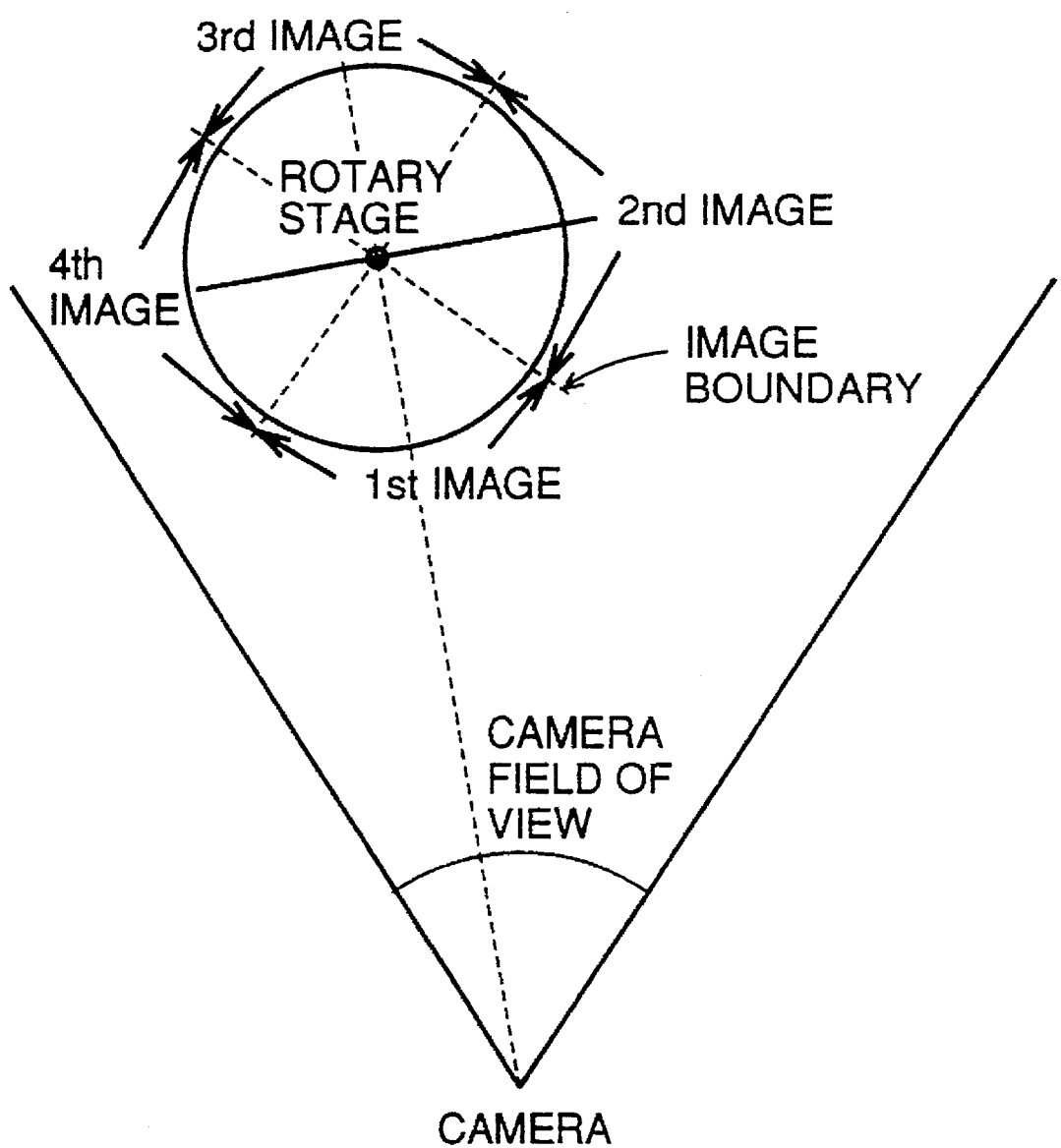
FIG. 46 is an illustration of photographing and image patch up operations using the rotary stage in accordance with the second embodiment of the present invention.
Figure 47:
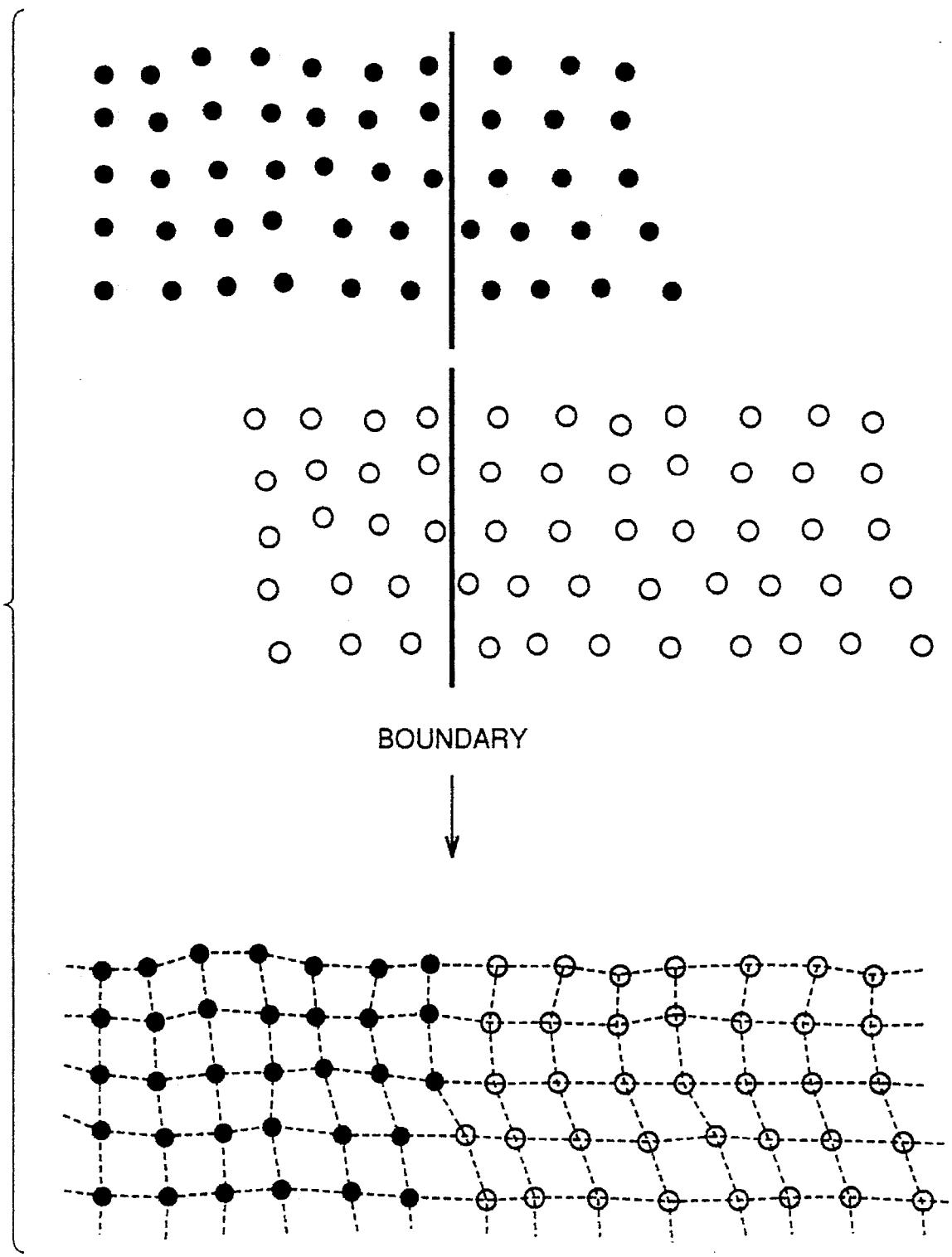
FIG. 47 is an illustration of patch up of the data photographed by using the rotary stage in accordance with the second embodiment of the present invention.

For example, four three-dimensional and two-dimensional data are photographed (step #502) by rotating the rotary stage by 90° for every sensingoperation, such that the rotary stage is within the measurement scope as shown in FIG. 46 (which is a model of sensingoperation using the rotary stage). Thereafter, with respect to the data of the photographed four images, the data of the object and the data of the rotary stage portion are separated from each other, and a group of planes which is lower part of the rotary stage is extracted (step #503). At this time, when the plane portion of the rotary stage may have a specific color, so as to facilitate extraction with reference to the color image.

Thereafter, of the data separated in step #503, using the data of the rotary stage portion the position and attitude of the rotary stage are calculated (step #504). This method will be described in greater detail later.

Based on the position and attitude of the rotary stage and the angle of rotation calculated in the subroutine of step #504, coordinate conversion parameter (about the rotation axis) for each photographed data is calculated (step #505). Based on the parameter, coordinate conversion is performed, whereby respective photographed data are integrated in one coordinate system (step #506). The method of calculating the parameter from the rotation angle and the method of coordinate conversion are the same as the method of calculating the parameter and method of coordinate conversion when the above-described camera universal head is used, except that the angle of rotation of the camera is replaced by the angle of rotation of the rotary stage.

Thereafter, the junction portion is set (the method will be described later), data out of the scope of each photographed data is deleted, a plane is re-constructed at the junction portion (step #507), and patching up of the three-dimensional data is completed (step #508).

As a result, the first image (represented by the black points) and the second image (white points) are patched up at the boundary, thus resulting in one image.

Figure 48:
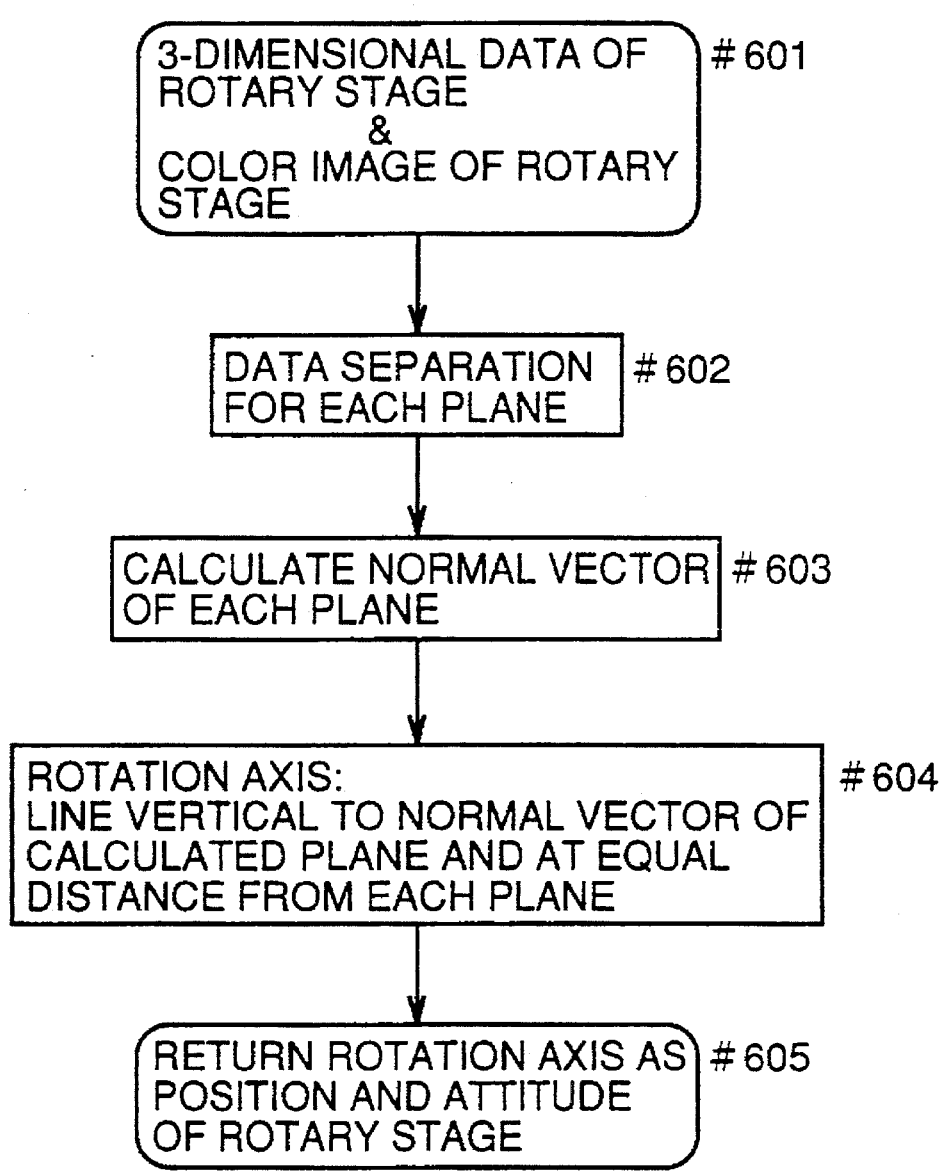
FIG. 48 is a flow chart showing the operation of calculating position and attitude of the rotary stage in accordance with the second embodiment of the present invention.

The method of calculating the position and the attitude of the rotary stage in step #504 will be described with reference to the flow chart of FIG. 48. First, three-dimensional data of the rotary stage and the color image of the rotary stage are taken (step #601). The data is divided for each plane (step #602). Thereafter, normal vector of the plane is calculated for every plane (step #603). A line which is orthogonal to the normal vector and at an equal distance from respective plane is defined as the rotation axis (step #604), and the rotation axis is returned to the main routine as the position and attitude of the rotary stage (step #605).

The method of setting the junction portion will be described in greater detail.

Figure 49:
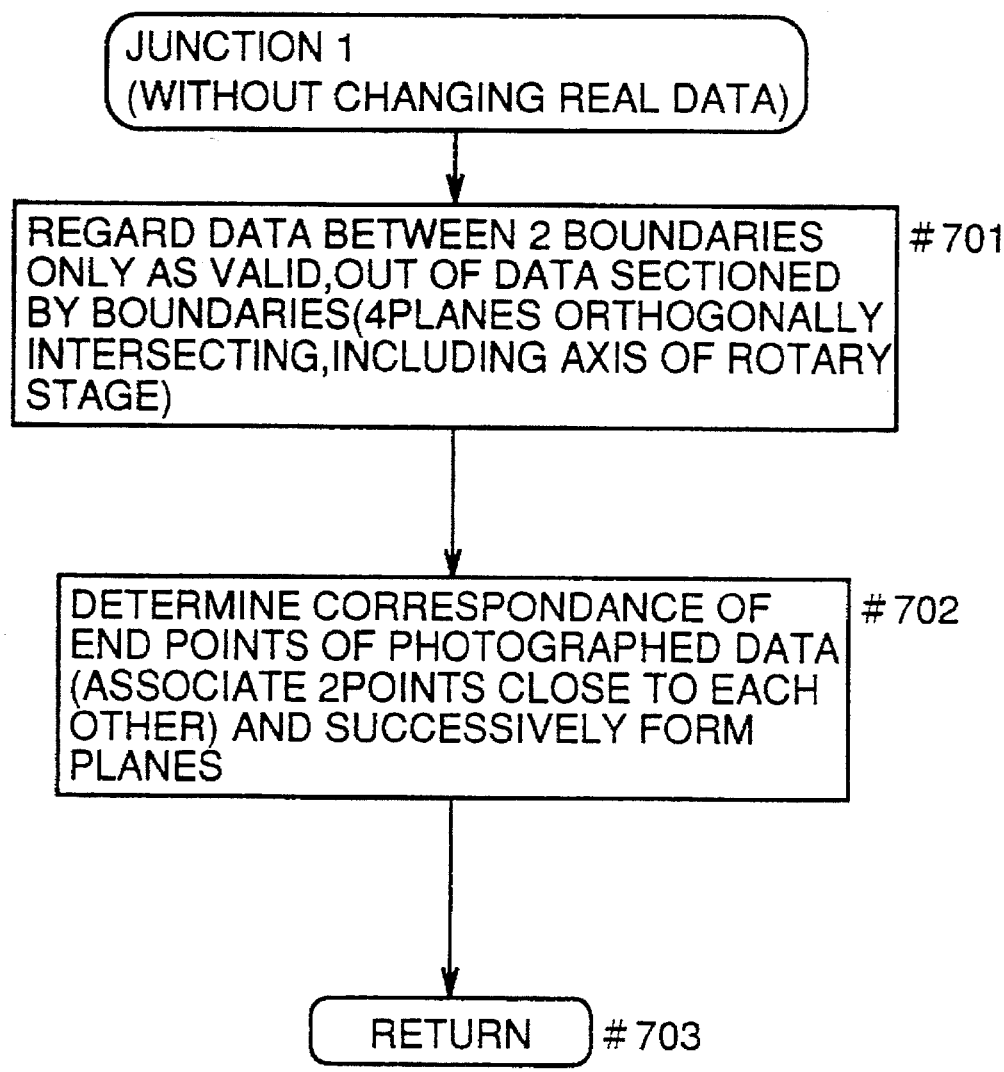
FIG. 49 is a flow chart showing an operation showing the method of setting the junction portion (without changing the real data) in accordance with the second embodiment of the present invention.

First, an example, in which the real data photographed is not changed, will be described with reference to the flow chart of FIG. 49. First, of the data cut at the boundary of the images (four planes including the axis of the rotary stage and orthogonal to each other), only that data which is sandwiched by two boundaries of images is regarded as effective data, and other data are canceled (step #701). Correspondence between end points of the photographed data is determined (two points which are close to each other are regarded as corresponding points), the images are patched up successively (step #702), and the flow returns to the main routine (step #703).

In this case, when the data are canceled, overlapping portions may be left for two images to be patched up. By doing so, patching up can be performed smooth by searching the junction point, as already described with reference to the patching up operation using a universal head for the camera.

Figure 50:
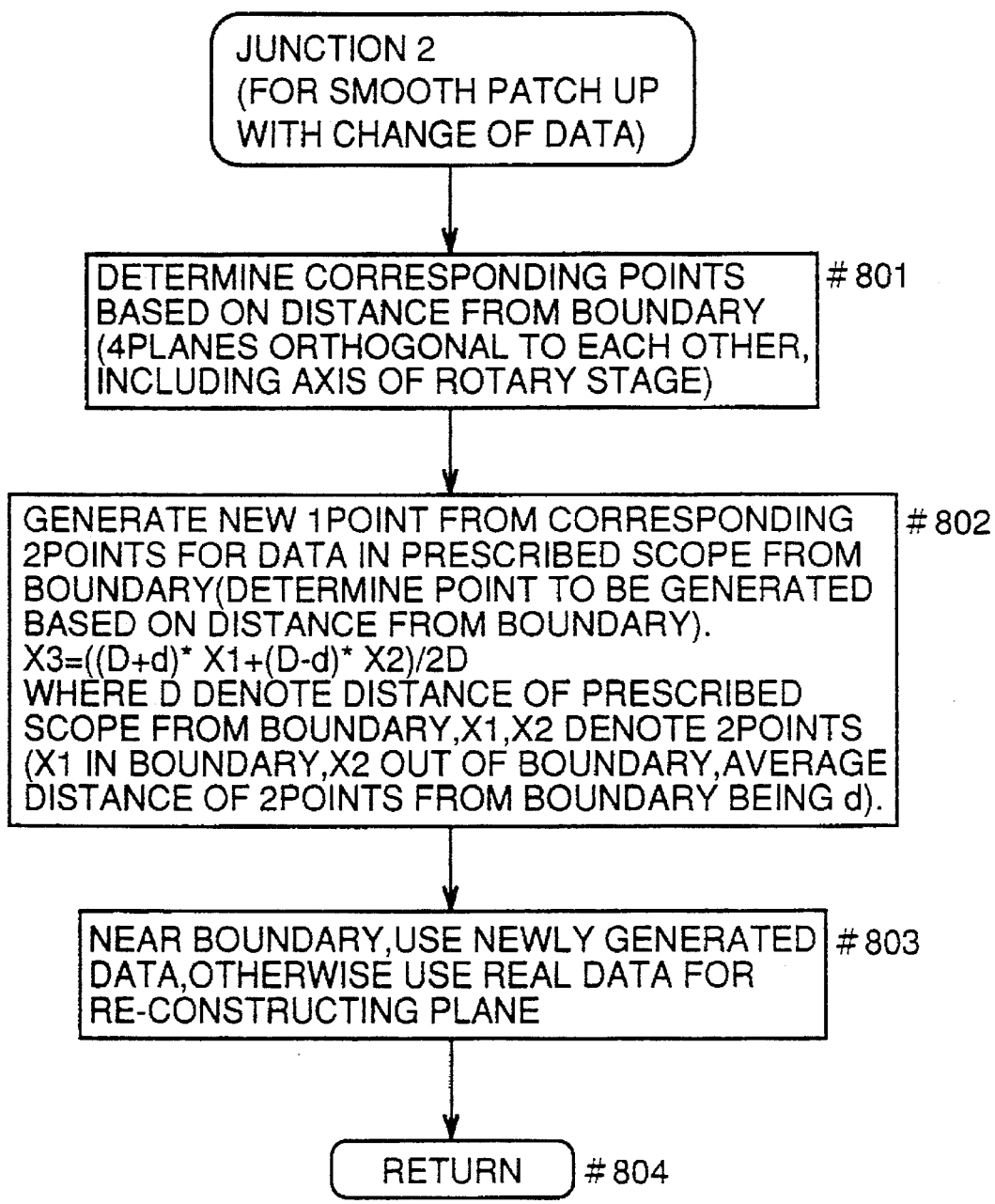
FIG. 50 is a flow chart showing a method of setting the junction portion (width change of real data) in accordance with the second embodiment of the present invention.
Figure 51:
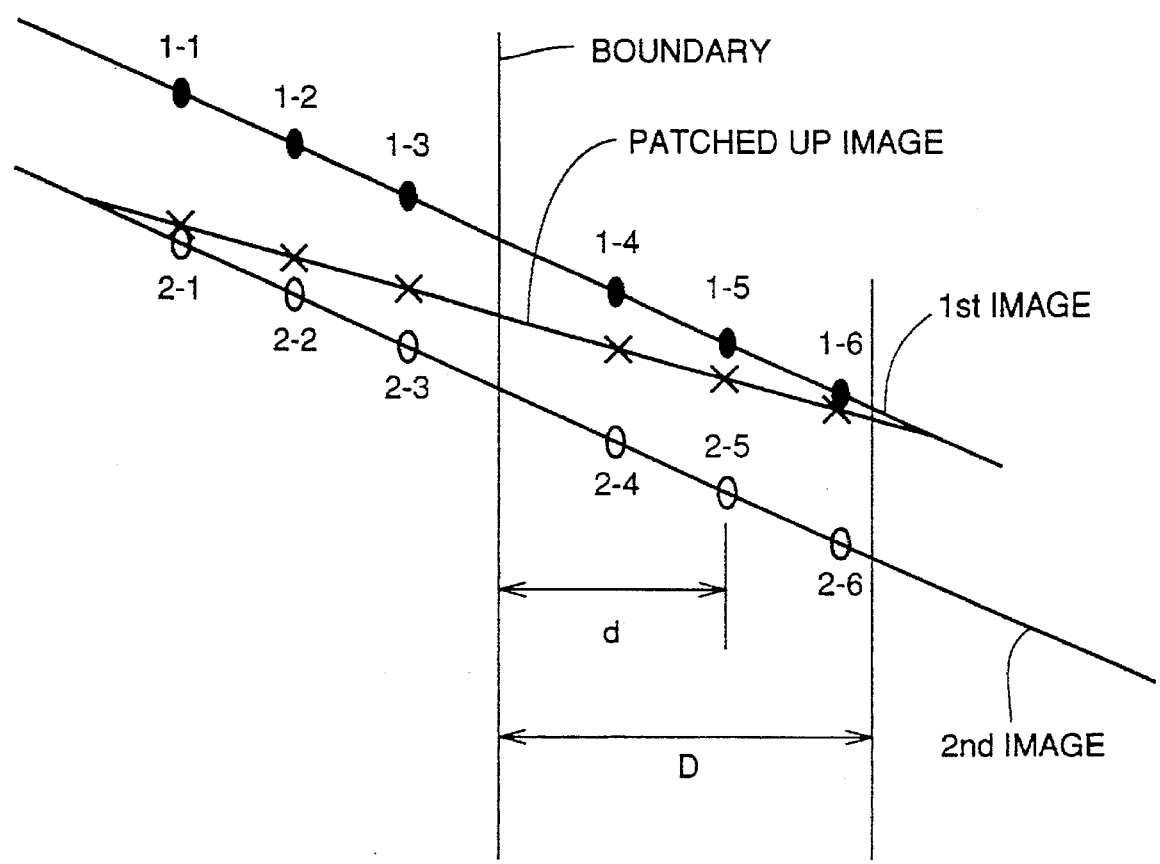
FIG. 51 shows data generation points in the method of setting the junction portion (with the change in real data) in accordance with the second embodiment of the present invention.

An example in which photographed data are changed for smooth patch up operation will be described with reference to the flow chart of FIG. 50 and to FIG. 51. With respect to photographed data, points approximately at the same distance from the boundary between the images (four planes including the axis of the rotary stage and orthogonal to each other) are determined as corresponding points (1-1 and 2-1, 1-2 and 2-2, ..., 1-n and 2-n of FIG. 51) (step #801), and a new point (the point marked by x in FIG. 51) is generated based on two points corresponding to the data up to a prescribed distance from the boundary (step #803). The new point which is to be generated is determined in the following manner, in accordance with the distance from the boundary.

When we represent a prescribed scope (in which the new point is generated) from the boundary as D, the point of one photographed data as X1, the point of another photographed data as X2, average distance from the boundary to the two points (X1, X2) as d and the newly generated point as X3, the following relation holds:

$$X3=((D+d)\times X1+(D-d)\times X2)/(2\times D).$$

The plane is re-constructed by using the newly generated data near the boundary (the scope whose distance from the boundary is up to D) and by using real data at other portions (the scope whose distance from the boundary exceeds D) (step #803), and the flow returns to the main routine (step #804).

Further, by applying a recess/projection at every 90° on the rotary stage as shown in FIG. 44(b), the angle of rotation can be made very precise at extremely low cost. By performing coordinate conversion based on the axis of rotation calculated in advance for the four images photographed with the stage rotated, the entire peripheral data can be obtained. When such a rotary stage is used, the object can be set at an arbitrary position within the scope of measurement, and therefore sensingoperation is much facilitated.

Figure 52:
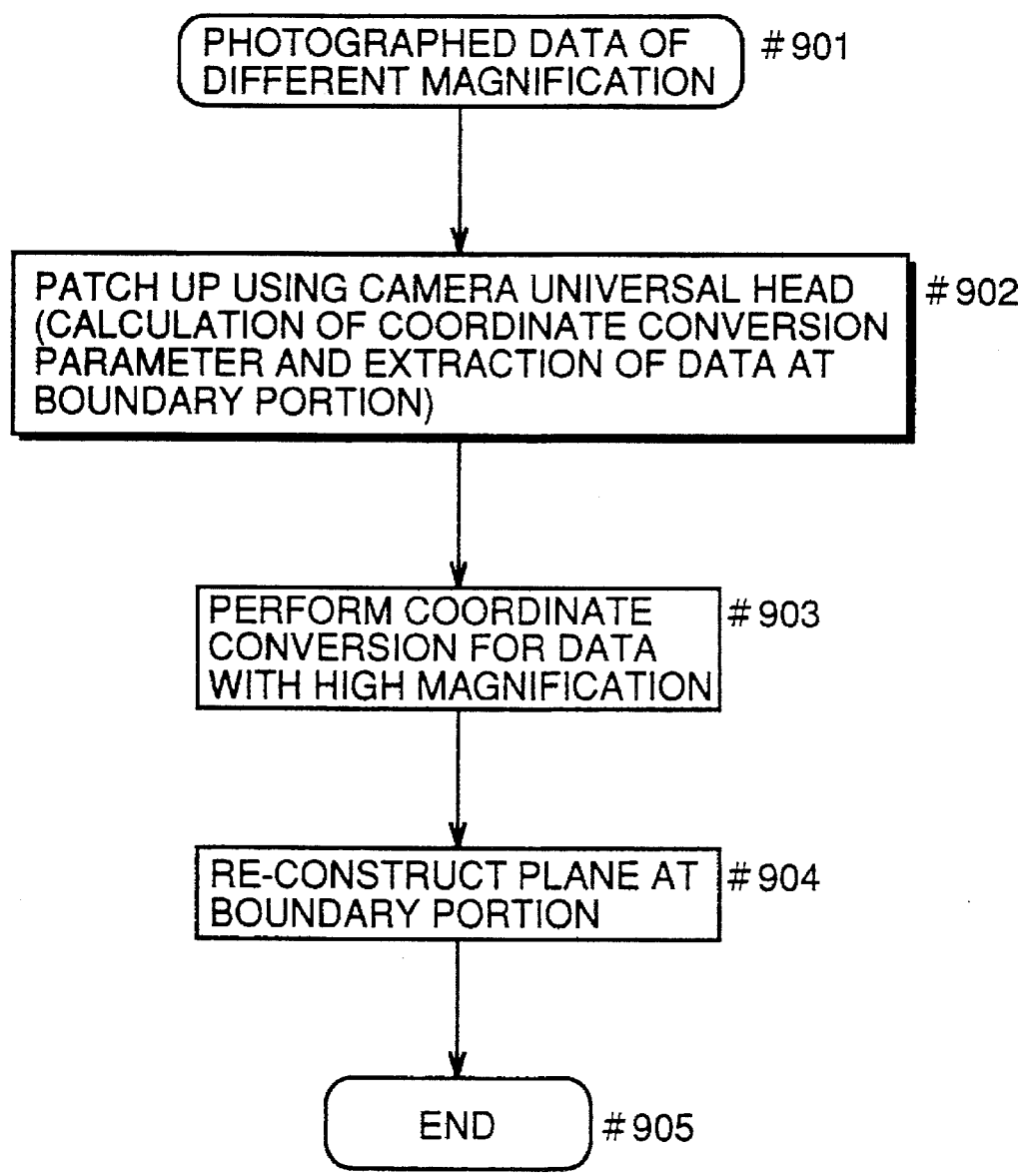
FIG. 52 is a flow chart showing an operation of patching up three-dimensional data photographed with zooming, using the camera frame in accordance with the second embodiment of the present invention.

Zoom patch up method when zooming input is provided as mentioned above will be described with reference to the flow chart of FIG. 52.

First, photographed data having different magnifications are taken in accordance with the method described with reference to zooming input (step #901). Then, patched up of the images using the camera universal head is performed in the same manner as shown in the flow chart of FIG. 37 described above (except the last patch up operation), and parameters for coordinate conversion and extraction of data at the boundary portion are performed (step #902). Here, before searching the junction point from two-dimensional color images (step#302 of FIG. 37), re-sampling is performed for the two-dimensional images and for the three-dimensional images (the method will be described later).

Thereafter, coordinate conversion is performed with respect to the data having high magnification, the data having high magnification is integrated to the coordinate system of data having low magnification (step #903), a plane is re-constructed at the boundary portion (step #904), and the patch up operation is completed (step #905).

Figure 53:
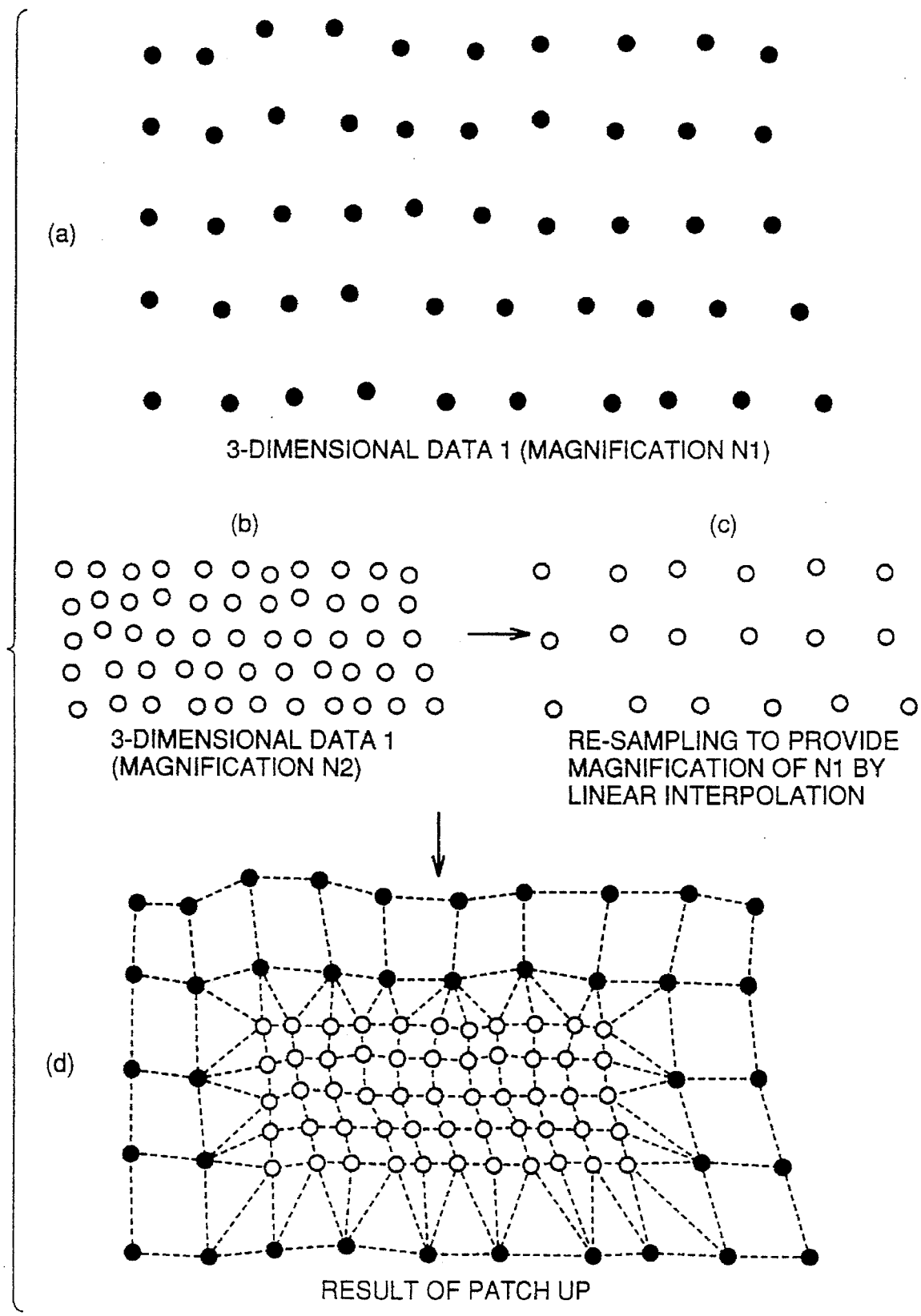
FIGS. 53(a–d) are an illustration of patch up of data photographed with zooming in accordance with the second embodiment of the present invention.

FIG. 53 is a model of the zooming patch up operation. First, data (having magnification of N2) of FIG. 53(b) is re-sampled so that it comes to have the magnification of N1 as shown in FIG. 53(c), and then re-sampled data is patched up with the data (having the magnification of N1) of FIG. 53(a). Thereafter, the portion which had the magnification of N2 is returned to have the original magnification (N2), and as a result, a patched up image such as shown in FIG. 53(d) is obtained.

The method of re-sampling of two dimensional image and the three-dimensional image will be described in greater detail.

The method for the two-dimensional image will be described with reference to FIG. 54.

Figure 54:
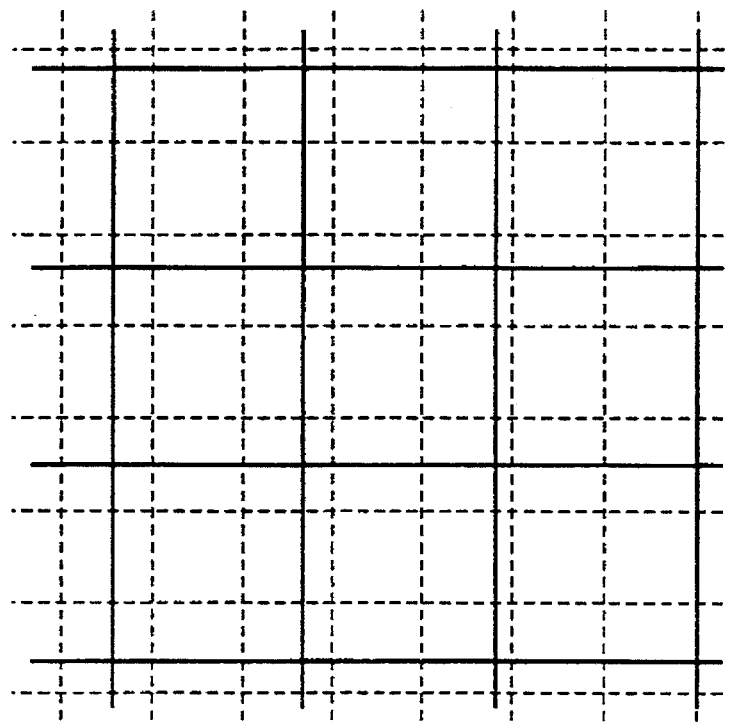
FIG. 54 is an illustration of re-sampling of two-dimensional images in accordance with the second embodiment of the present invention.

In FIG. 54, the image represented by the solid lines is the image having the magnification of N1, while the image represented by the dotted lines is the image having the magnification of N2 (in both images, the minimum square corresponds to one pixel, where N1<N2).

Re-sampling is performed for the image having the magnification of N2. The phase is matched so that the pixel at the upper left end of the image having the magnification N2 coincides with a sampling point of the image having the magnification of N1.

Re-sampling value (average brightness) is calculated by using a weighted mean value of the area of the pixels of the image having magnification of N2 included in the pixels of the image having the magnification of N1. More specifically, the product of the brightness and area of the image having the magnification of N2 included in 1 pixel of the image having the magnification N1 are all added, and the result is divided by the area of one pixel of the image having the magnification of N1.

Figure 55:
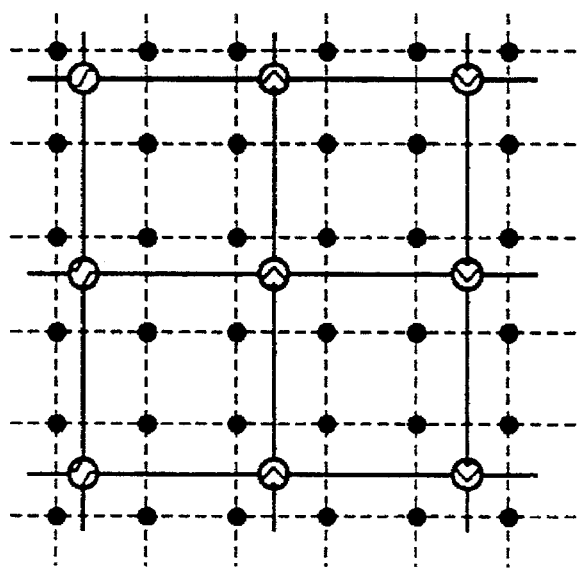
FIG. 55 is an illustration of re-sampling of three-dimensional images in accordance with the second embodiment of the present invention.

The operation for the three-dimensional image will be described with reference to FIG. 55. FIG. 55 is a representation viewed from the camera.

In FIG. 55, the image represented by the solid lines and the white circles is the image having the magnification of N1, while the image represented by the dotted lines and the black circles is the image having the magnification of N2 (in both images, the minimum square represents 1 pixel, N1<N2).

Re-sampling is performed on the image having the magnification of N2. The phase is matched such that the pixel at the upper left end of the image having the magnification of N2 coincides with a sampling point of the image having the magnification of N1.

The re-sampling value is calculated by using an intersection between the line of sight of the camera passing through the point of the image having the magnification of N1, and a two-dimensional curved plane consisting of four points of the image having the magnification of N2 surrounding said point.

In the above described embodiment, calculation of the parameters for coordinate conversion is performed by using both the two-dimensional color image and three-dimensional data. However, the coordinate conversion parameters can be calculated by using only the three-dimensional data, without searching for the junction point from the two-dimensional color image. Though three-dimensional input has been described in the present embodiment, this invention can be similarly applied to the two-dimensional image input.

A third embodiment of the present invention will be described in the following.

Figure 56:
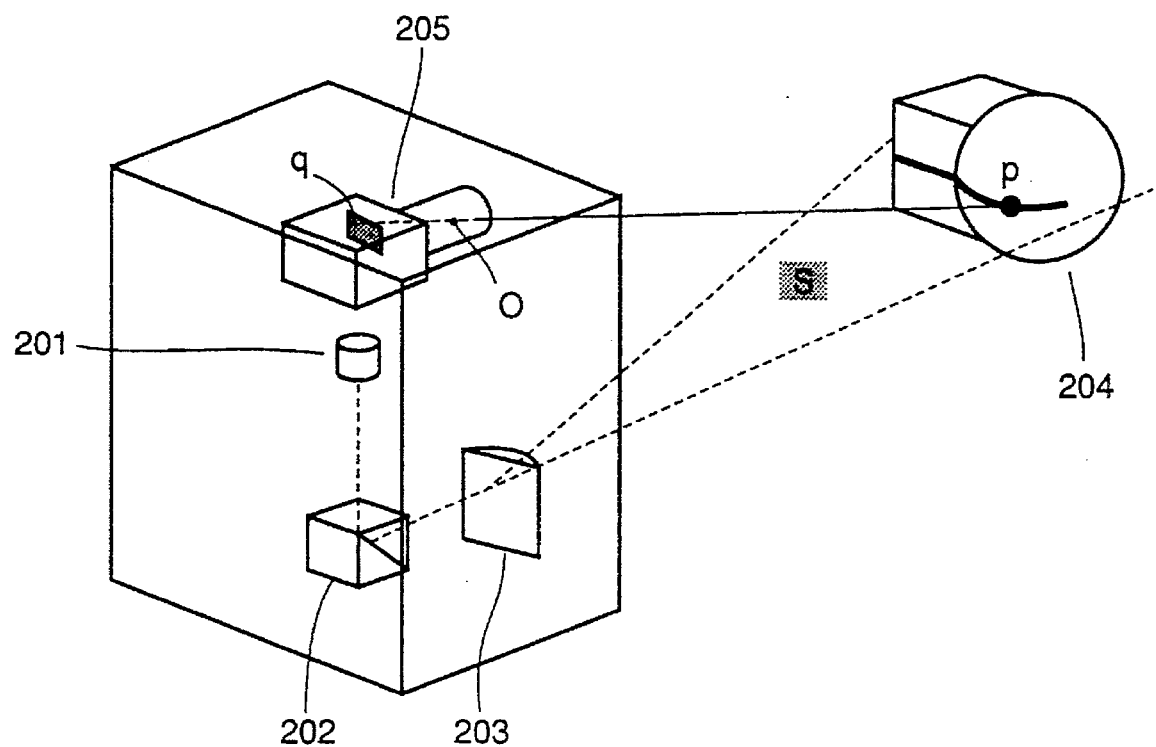
FIG. 56 shows a typical structure of a three-dimensional shape inputting apparatus in accordance with a third embodiment of the present invention.

FIG. 56 shows a basic structure of a three-dimensional shape input apparatus. A light beam projected from a light source 201 has its optical path deflected by a first optical path deflecting apparatus 202 such as a galvano scanner or a polygon scanner, extended in one direction by means of a cylindrical lens 203 and thus the light beam which has been turned into a slit shaped light is directed to an object 204. The slit shaped light is moved in a direction orthogonal to the longitudinal direction of the slit shaped light for scanning, by means of a first optical path deflecting apparatus 202. Further, the image to which the slit shaped light is directed is photographed by a sensingsystem 205 arranged spaced by a prescribed distance from the light projecting optical system.

Actual measurement using the three-dimensional shape input apparatus will be described referring to an example in which an image having information of distance of 256 points in the longitudinal direction of the slit shaped light and 324 points in the scanning direction (hereinafter referred to as a distance image) is generated. In this case, the distance image sensor provided in the sensingsystem 205 is constituted by a two-dimensional CCD area sensor having at least 256×324 pixels.

The slit shaped light projected with a very narrow width is moved for scanning by 1 pitch of the distance image sensor by means of the first optical path deflecting apparatus 202 while the distance image sensor performs one image accumulation. The distance image sensor provides the accumulated image information and performs next image accumulation. Based on the image information obtained by one image accumulation, the position of the centroid of the received light intensity is calculated for each of 256 columns orthogonal to the longitudinal direction of the slit shaped light. The calculated value constitute the distance information of 256 points in 1 pitch of the distance image sensor. Since the image illuminated by the slit shaped light is displaced in the direction of the scanning corresponding to the shape of the object, the obtained distance information represents the shape of the object at a position which is irradiated with the slit shaped light. When repeating this image accumulation for the number of pitches of the distance image sensor, that is, 324 times, distance image corresponding to 256×324 points is generated.

Here, when the distance to the object is changed or when the angle of view for sensing by the distance image sensor (that is, focal length of the optical system) is changed, the region of the object photographed by the distance image sensor varies (details will be described later). Therefore, when the scanning region of the slit shaped lights is kept constant in such a case, there would be a region not scanned, or regions outside the measurement region would be scanned. For this reason, the scanning region of the slit shaped light should be appropriately set in accordance with the distance to the object and the sensing angle of view.

The time for scanning by the slit shaped light for 1 pitch of the distance image sensor must be sufficiently longer than the time necessary for the distance image sensor to output the accumulated image information. If the speed of scanning is too fast, the time of accumulation of image becomes too short, and the S/N ratio decreases, resulting in poor precision in calculation of the distance information. However, if the speed of scanning is too slow, the time for accumulation of the image becomes too long, possibly resulting in saturation of the sensor. This also leads to poor precision in calculating the distance information. In view of the foregoing, the speed of scanning by the slit shaped light should be set at an appropriate constant value on the plane of the distance image sensor, that is, the imaging plane of the sensingsystem.

Figure 57:
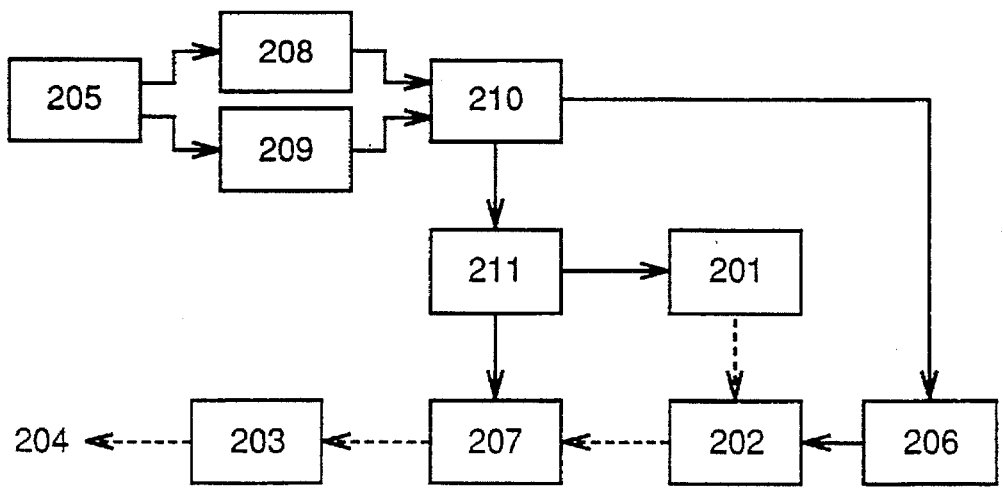
FIG. 57 is a block diagram showing a basic structure of the apparatus in accordance with the third embodiment of the present invention.

FIG. 57 shows a basic structure of an embodiment in which the scanning region and the scanning speed of the slit shaped light can be changed. In the figure, the solid arrow denotes the row of information, while the dotted arrows show progress of the light beam and slit shaped light.

The light beam projected from light source 201 has its path deflected by the first optical path deflecting apparatus 202. The first optical path deflecting apparatus 202 is driven at a prescribed timing and at a prescribed speed by a scan speed control apparatus 206. Further, a second optical path deflecting apparatus 207 on which angle of deflection can be changed is provided on the optical path. By means of this apparatus, the light beam has its path further deflected to enter a cylindrical lens 203 in which the beam is extended to a slit shaped light, and finally directed to the object 204.

Meanwhile, the sensingsystem 205 includes an object distance detecting apparatus 208 and an angle of view detecting apparatus 209, for detecting the distance to the object and the sensing angle of view of the sensingsystem 5, respectively. A point of focus detecting apparatus used in an auto focus camera, for example, may be used as the object distance detecting apparatus 208. An encoder provided at the lens driving portion may be used, when the sensingsystem consist of a zoom lens unit, as the angle of view detecting apparatus 209. The object distance information output from object distance detecting apparatus 208 and the sensing angle of view information output from the angle of view detecting apparatus 209 are taken in the calculating apparatus 210. In the calculating apparatus 210, the region of the field of view monitored by the sensingsystem 205 at that point is estimated based on the object distance information and sensing angle of view information, and the apparatus determines the scan start angle and scan end angle for scanning the region thoroughly with the slit shaped light. A scanning scope control apparatus 211 adjusts the direction of projection of slit shaped light by driving the second optical path deflecting apparatus 207 based on the scan start angle and scan end angle determined by calculating apparatus 210, and adjusts light projection start time and light projection end time by controlling the light source 201, thus controls the scanning scope with the slit shaped light. In calculating apparatus 210, the speed of scanning by which the speed of movement of the slit-shaped image on the imaging plane of the sensingsystem comes to have a prescribed value, is determined based on the determined scanning scope, and based on this information, the scanning speed control apparatus 206 drives the first optical path deflecting apparatus 202.

Namely, based on the object distance information and the sensing angle of view information, the speed of scanning with the slit shaped light is controlled by the scanning speed control apparatus 206, and the scope of scanning with the slit shaped light is controlled by the scanning scope control apparatus 211, respectively.

By the above described structure, even when the object distance or the sensing angle of view is changed, the sensing region of the sensingsystem 205 can be scanned thoroughly with the slit shaped light, and the speed of movement of the slit shaped light on the imaging plane is kept constant. Further, scanning of invalid region outside the sensing region can be avoided as much as possible. Therefore, when measurement is to be continuously carried out, the time lag from completion of one image input to the start of next image input can be made very short.

Figure 58:
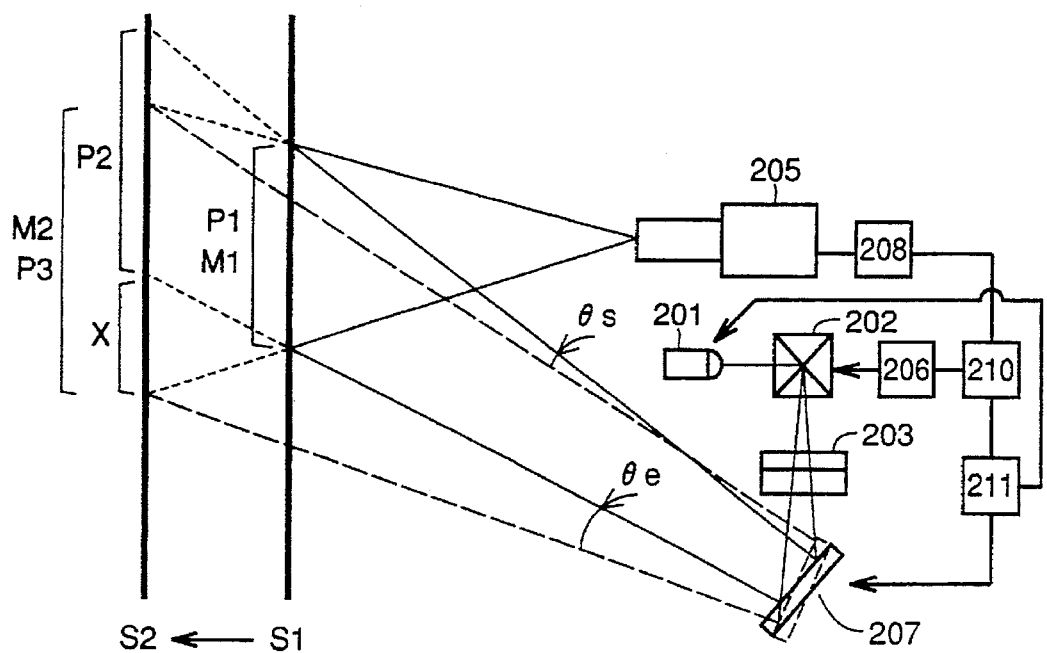
FIG. 58 shows a structure of an apparatus in accordance with the third embodiment of the present invention.

FIG. 58 is an illustration of the third embodiment of the present invention. In this embodiment, a galvano scanner is used as the second optical path deflecting apparatus 207. The slit shaped light is projected in a direction vertical to the sheet of paper. Now, assume that the scanning region P1 with the slit shaped light and the monitoring region M1 are matched at a position of the object plane S1, and that the object plane moves to the position of S2. This time, the region to be scanned is changed to the region P2, and the region to be photographed is changed to M2, resulting in deviation between the regions. Accordingly, there will be a portion X which would not be scanned, in the region which is photographed. Accordingly, based on the result of calculation by calculating apparatus 210 based on the object distance information detected by the object distance detecting apparatus 208, the scanning scope control apparatus 211 changes the angle of deflection of the slit by driving the second optical path deflecting apparatus 207, and shifts the scan start angle and the scan end angle by θs and θe, respectively, by controlling the projection start time and projection end time of the light source 201. This allows scanning of the region P3, which corresponds to the sensing region M2.

Assume that the speed of scanning with the slit shaped light is constant, then the speed of movement of the slit shaped light on the imaging plane of the sensingsystem becomes slower as the scanning region becomes larger (in this embodiment, the distance to the object becomes longer), resulting in difference in measurement precision dependent on the distance. Therefore, based on the newly determined scan start angle and the scan end angle, the calculating apparatus 210 calculates the speed of scanning by which the speed of movement of the slit shaped light on the imaging plane of the sensingsystem is kept at a prescribed value. Based on the result of calculation, the scan speed control apparatus 206 controls the speed of driving of the first optical path deflecting apparatus 202. The first optical path deflecting apparatus 202 is always driven under the condition in which the scanning angular region is the largest, that is, in a deflection angle region which corresponds to the case where the distance to the object is the largest (in the measurable region).

Other than the reflective type apparatus such as a galvano scanner, a prism of which angle of diffraction can be changed may be used as the second optical path deflecting apparatus 207 to obtain the same effect. Further, the angular region of deflection by the first optical path deflecting apparatus 202 may be constant, and therefore when a rotary type scanner such as a polygon scanner is used, scanning at higher speed becomes possible.

Figure 59:
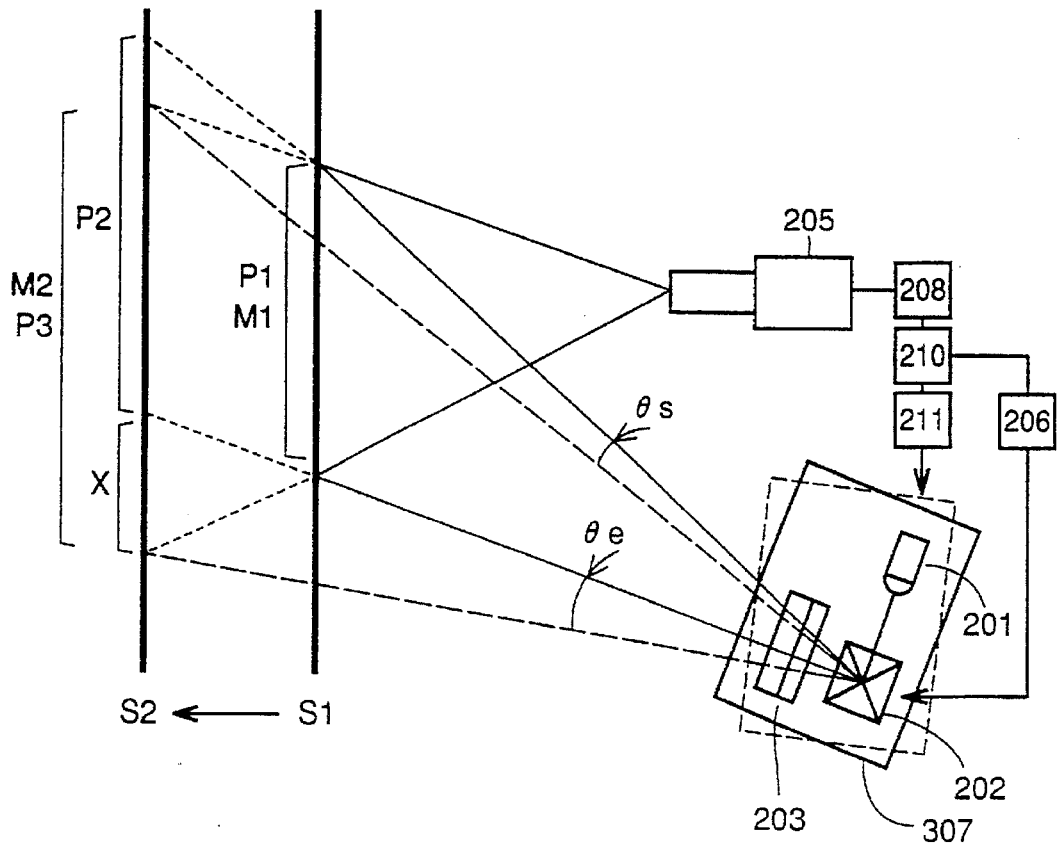
FIG. 59 shows a structure of an apparatus in accordance with the fourth embodiment of the present invention.

FIG. 59 is an illustration of the fourth embodiment of the present invention. In this embodiment, the whole scanning system or part of the scanning system including a light source 201, scanning speed control apparatus 202 and a cylindrical lens 203 is mounted on a movable apparatus 307, and the angle of mounting with respect to the whole apparatus can be changed. The movable apparatus 307 serves as the scanning scope control apparatus.

Similar to the third embodiment, assume that the plane of the object moves from the position S1 to the position S2. At this time, based on the object distance information detected by the object distance detecting apparatus 208, the scanning scope control apparatus 211 changes the angle of setting with respect to the entire apparatus by driving the movable apparatus 30, whereby the angle of projection of the slit shaped light is changed. Further, the project start time and the project end time of the light source 1 are controlled so that the scanning start angle and scanning end angle are shifted by θs and θe, respectively. Thus the region scanned would be P3, which matches the monitoring region M2. The control for changing the scanning speed by the first optical path deflecting apparatus 202 is carried out in the similar manner as in the third embodiment.

Referring to the present embodiment, a rotary scanner such as a polygon scanner may be used as a first optical path deflecting apparatus 202 as in the third embodiment, enabling scanning at higher speed. Further, since the scanning scope changing apparatus is not provided on the optical path, the loss of the slit shaped light beam intensity can be reduced. Meanwhile, similar effect can be obtained by fixing the scanning system and attaching the sensingsystem on a movable apparatus to change the angle of setting with respect to the whole apparatus such that the scanning region and the monitoring region match with each other.

Figure 60:
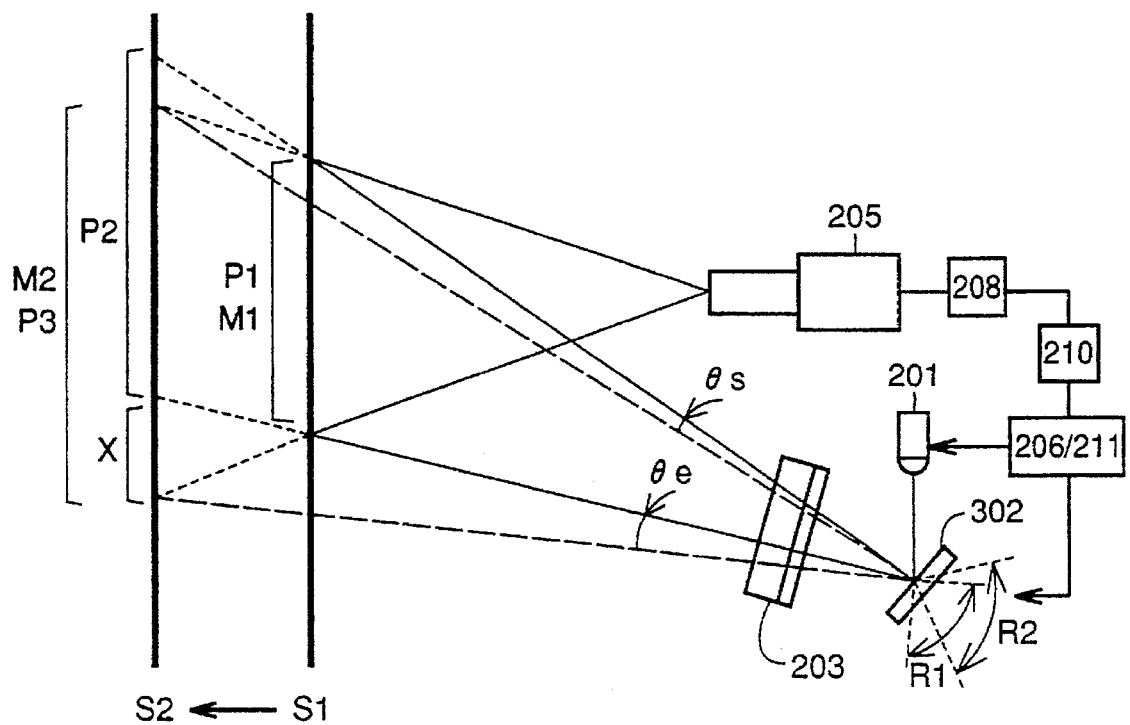
FIG. 60 shows a structure of an apparatus in accordance with the fifth embodiment of the present invention.

FIG. 60 is an illustration of the fifth embodiment of the present invention. In this embodiment, an apparatus in which the scan start angle, the scan end angle and the speed of scanning can be changed, for example, a galvano scanner, is used as the first optical path deflecting apparatus 302.

In this embodiment also, assume that the plane of the object moves from the position S1 to the position S2, as in the third embodiment. At this time, based on the object distance detected by object distance detecting apparatus 208, control apparatus 206/211 controls the operation of the optical path deflecting apparatus 202/207 so as to change the swing angle region from R1 to R2, and control the projection start time and projection end time of the light source 1 to shift the scan start angle and scan end angle by θs and θe, respectively. As a result, the region P3 is scanned, which region matches the monitoring region M2. Control for changing the scanning speed is performed in the similar manner as in the third and fourth embodiments.

The fifth embodiment can be regarded as implementation of the scanning speed control apparatus 206 and scanning scope control apparatus 211 of the third embodiment by one apparatus that is, control apparatus 206/211 and implementation of the first optical path deflecting apparatus 202 and the second optical path deflecting apparatus 207 by one apparatus, that is, optical path deflecting apparatus 202/207. Therefore, the structure of the apparatus is made simple.

Figure 61:
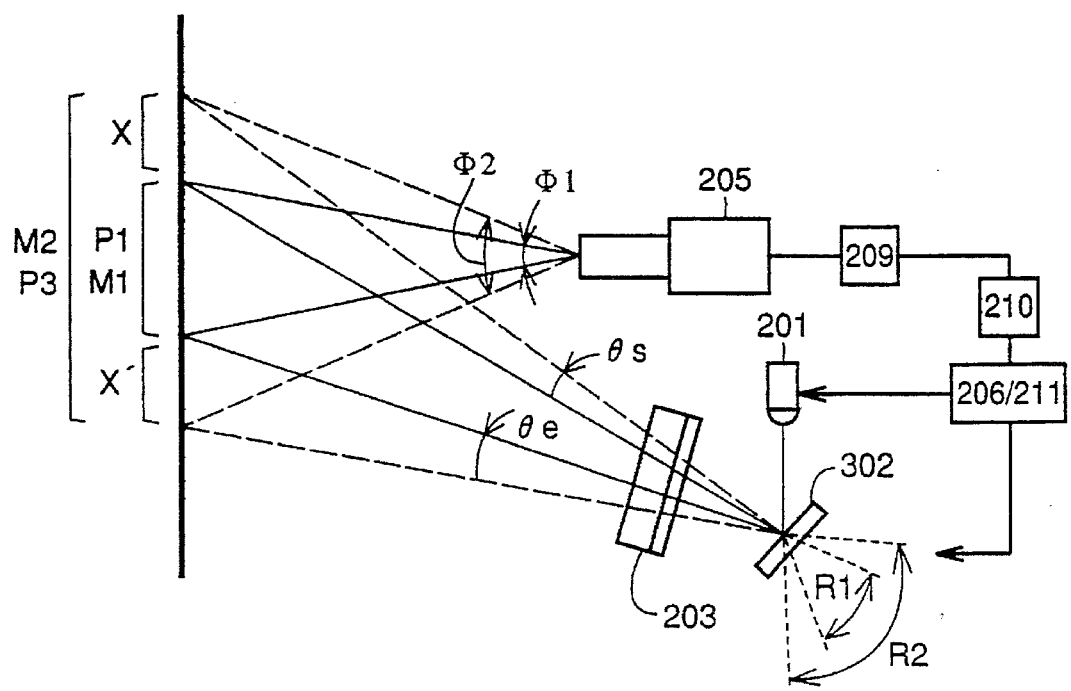
FIG. 61 is an illustration showing the change of the photographing angle of view in the fifth embodiment of the present invention.

FIG. 61 shows control when the angle of view for sensing of the sensingsystem 205 is changed in the fifth embodiment described above. Now, assume that from the state in which the scanning region P1 matches the monitoring region M1 with the angle of view of the sensingsystem 205 being Φ1, the angle of view of the sensingsystem 205 is changed to Φ2, that is, to wide angle side. At this time, the monitoring region would be M2, so that there is difference between the scanning region and the monitoring region, and hence portions X and X' which are not scanned would exist in the monitoring region, hindering successful measurement. Therefore, based on the view angle information detected by the view angle detecting apparatus 209, control apparatus 206/211 controls the operation of the optical path reflecting apparatus 202/207 so as to change the rotation angle from R1 to R2, and the projection start time and projection end time of the light source 201 are controlled so as to shift the scan start angle and scan end angle by θs and θe, respectively. Consequently, the region to be scanned would be P2, which matches the monitoring region M2. It goes without saying that the speed of scanning is changed under the control of optical path reflecting apparatus 202/207.

Figure 62:
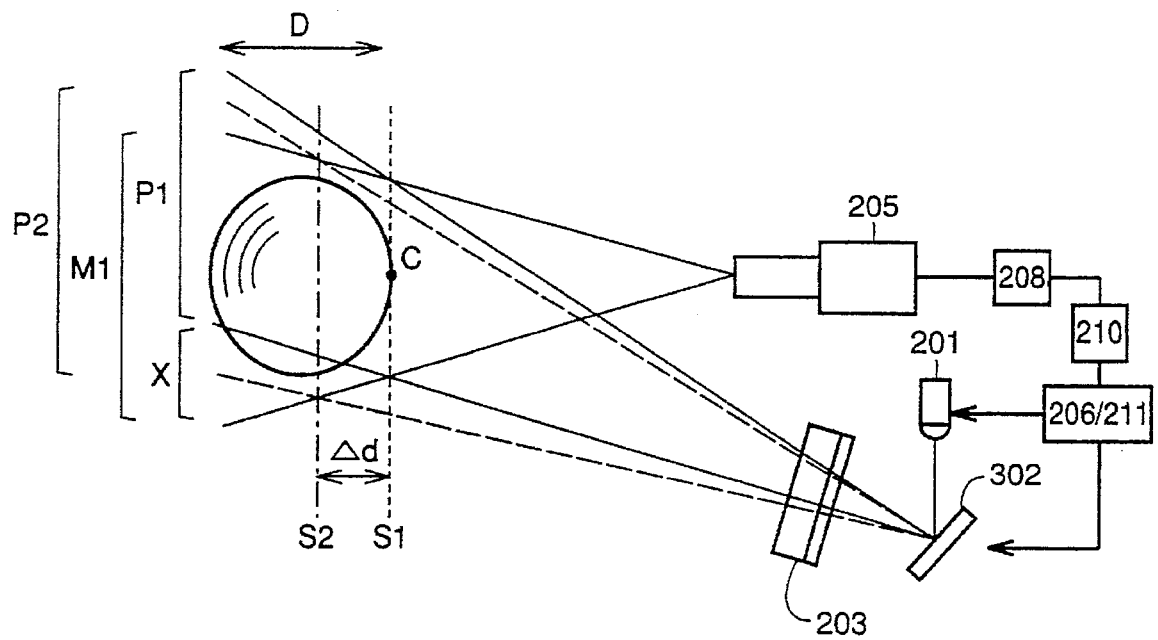
FIG. 62 shows an illustration showing an operation for an object having depth in accordance with the fifth embodiment of the present invention.
Figure 63:
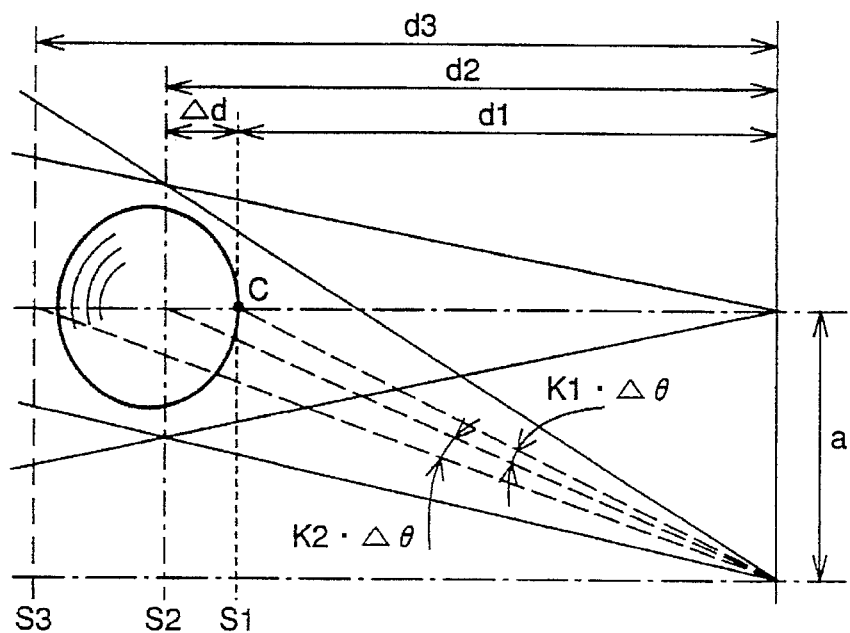
FIG. 63 is an illustration showing an operation for an object having depth in accordance with the fifth embodiment of the present invention.

FIG. 62 is an illustration taking into consideration the depth D of the object in the fifth embodiment. Though it depends on the conditions of setting the object distance detecting apparatus 208, the distance detected by the object distance detecting apparatus 208 is in most cases, a position near the center of field of view, for example, the point C. However, when the plane of the object S1 is positioned at this point C, the scanning region would be P1 with respect to the monitoring region M1, and therefore the depths of the object cannot be taken into account, resulting in a portion X which is not scanned. Therefore, to the object distance detected by the object distance detecting apparatus 208, an offset Δd taking into account the depth is added, and the result is regarded as the object distance. By this operation, referring to FIG. 62, the plane of the object is assumed to be at the position S2. The scanning region for the position S2 is P2, which can cover the depth of the object. The amount of offset Δd can be determined in the following manner, for example. Now, in measurement, let us assume that a constant depth corresponding to −K1 pixel −K2 pixel, in the direction of scanning, that is, depth corresponding to the width of K1+K2 pixels should be ensured for an arbitrary pixel on the image pickup device of the sensingsystem. At this time, in order to set the object distance d1 detected by the object distance detecting apparatus 208 coincide with the limit S1 of the depth closest to the sensingsystem, a virtual object plane S2 should be placed at a distance d2 provided geometrically by the following equation:

$$d2=\alpha/\tan(\arctan(\alpha/d1)-K1.\Delta\theta)$$

where the scanning angle per 1 pixel in the slit scanning direction of the image pickup device of the sensingsystem 205 is represented by Δθ, and the base length, which is a space in a direction vertical to the optical axis of the sensingsystem, between the main point of the light emitting scanning system and the main point of the sensingsystem is represented by α. Therefore, the amount of offset is obtained by $$\Delta d=d2-d1=\alpha/\tan(\arctan(\alpha/d1)-K1.\Delta\theta)-d1$$

At this time, the limit d3 of the depth which is farthest from the sensingsystem is given by the following equation:

$$d3=\alpha/\tan(\arctan(\alpha/d1)-K1.\Delta\theta-K2.\theta).$$

Figure 64:
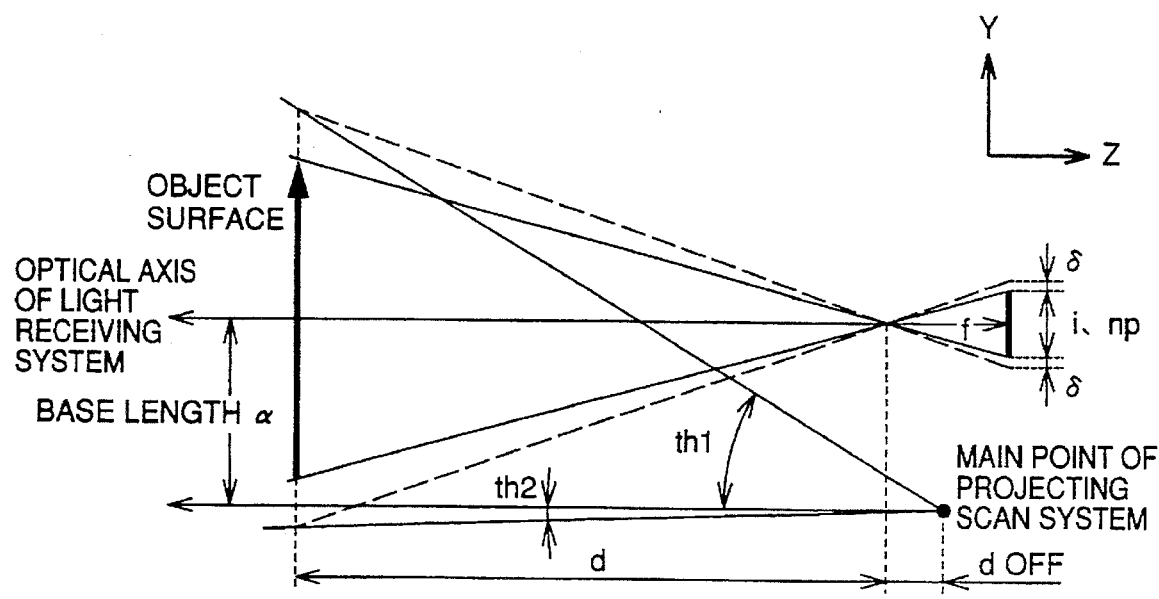
FIG. 64 shows various parameters used in the fifth embodiment of the present invention.

Example of a method for determining scan start angle, scan end angle and scanning speed will be described with reference to the fifth embodiment. Referring to FIG. 64, α represents the base length which is a space in the Y direction between the main point of the light emitting scanning system and the main point of the sensingsystem; doff represents offset in the Z direction which is the space in the Z direction; d represents the object plane distance; i represents size (image size) of the distance image sensor used in the sensingsystem; δ represents over-scan amount for scanning slightly wider region than the light receiving field of view, in order to ensure the depth for three-dimensional detection at end portion corresponding to start and end of the scanning, similar to the central portions; np represents the number of effective pixels of the image sensor in the Y direction, and f represents focal length of the sensingsystem. At this time, the start angle th1, scan end angle th2 and scan angular speed ω are given by the following equations:

$$th1(°)=\arctan[\{d(i/2+\delta)/f+\alpha\}/(d+doff)]\times180/\pi$$

$$th2(°)=\arctan[\{-d(i/2+\delta)/f+\alpha\}/(d+doff)]\times180/\pi$$

$$\omega=k.(th1-th2)/np \text{ (}k\text{ is a constant)}.$$

Figure 65:
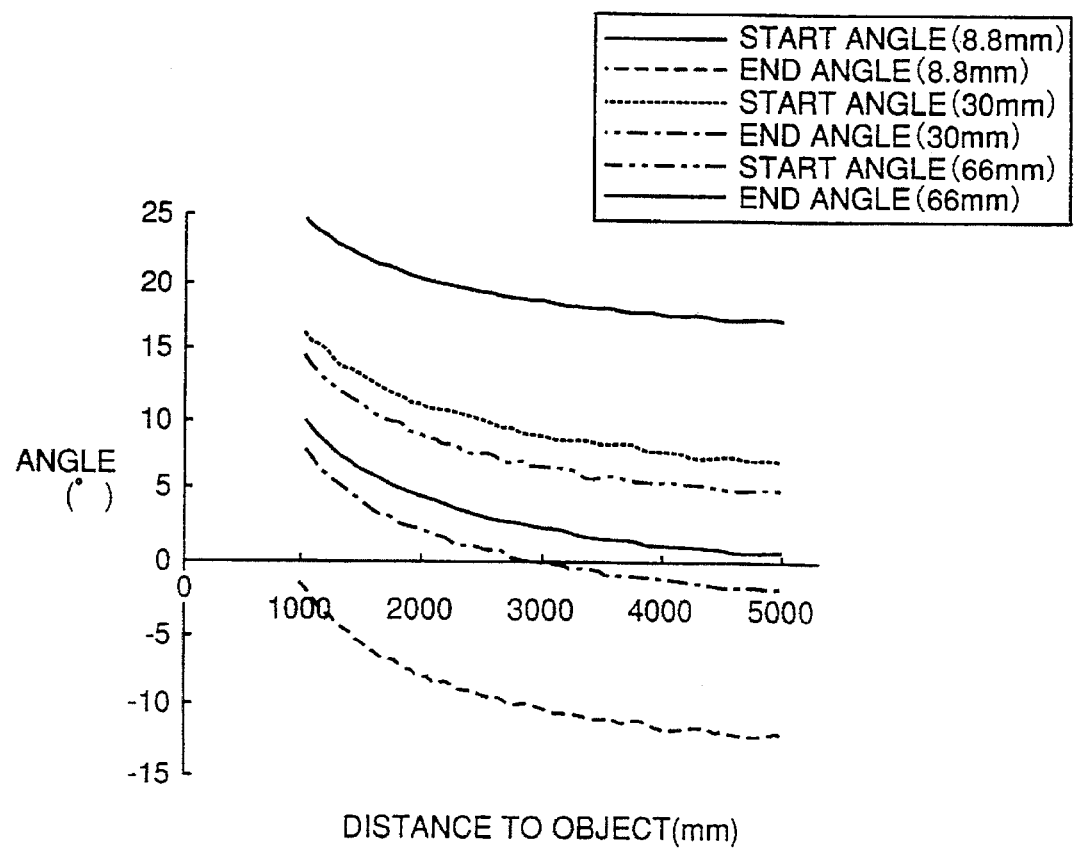
FIG. 65 shows relation between scanning angle and distance to the object plane in accordance with the fifth embodiment of the present invention.
Figure 66:
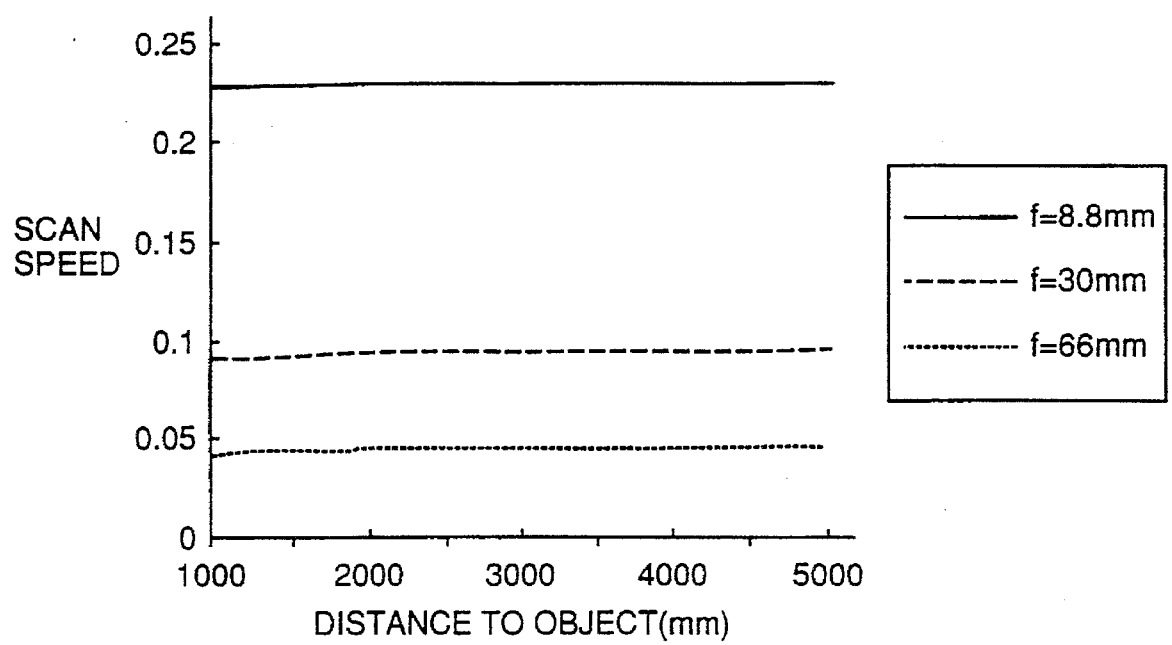
FIG. 66 shows a relation between scanning speed and the distance to the object plane in accordance with the fifth embodiment of the present invention.

The calculated values th1 and th2 are shown in FIG. 65, in which f is used as a parameter and the abscissa represents the object plane distance. Similarly, the calculated value ω is shown in FIG. 66. In this embodiment, the image size is assumed to be ½ inch, the constant k=1 and the base length α=250 mm. Because of this base length, there is a parallax between the scanning system and the sensingsystem, and therefore the start angle and end angle vary widely dependent on the object plane distance. The ordinate represents the angle formed by the optical axis of the sensingsystem and the projected slit.

In the above described embodiments, the scanning scope of the slit-shaped light beam (scanning direction and scan start angle and scan end angle) is changed in accordance with the distance to the object or in accordance with the sensing angle of view. However, it is possible to scan a sufficiently large area with the slit shaped light so as to cover entire scanning region (that is, entire field of view of the sensingsystem) which may fluctuate due to the change in the distance to the object or the change in the sensing angle of view. In that case, unnecessary region outside the measurement region may be scanned. However, mechanism and control necessary for scanning only the measurement region becomes unnecessary, and therefore the apparatus can be simplified.

Figure 67:
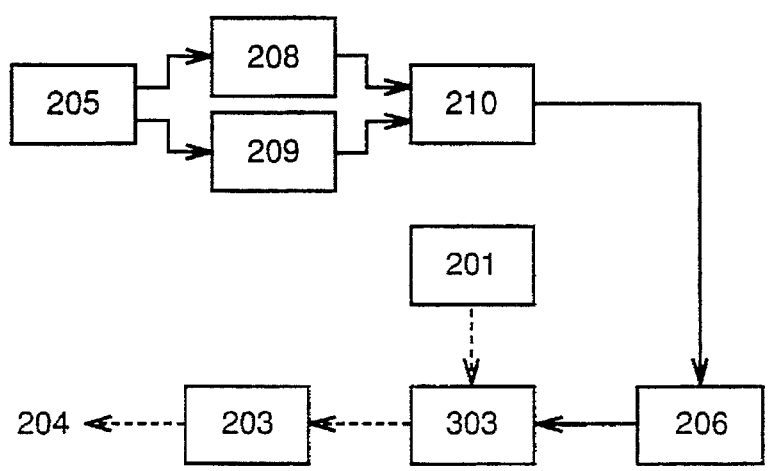
FIG. 67 is a block diagram showing a basic structure in accordance with the sixth embodiment of the present invention.

FIG. 67 shows a specific structure of an apparatus in accordance with the sixth embodiment in which only the change in the scanning speed of the slit shaped light is possible (the scanning scope is always constant). As in FIG. 57, the solid arrow represents the flow of information, while a dotted arrow represents progress of the light beam and the slit shaped light. What is different from FIG. 57 is that there is not the scanning scope control apparatus 211 and the second optical path deflecting apparatus 207 provided for changing the scanning scope.

Figure 68:
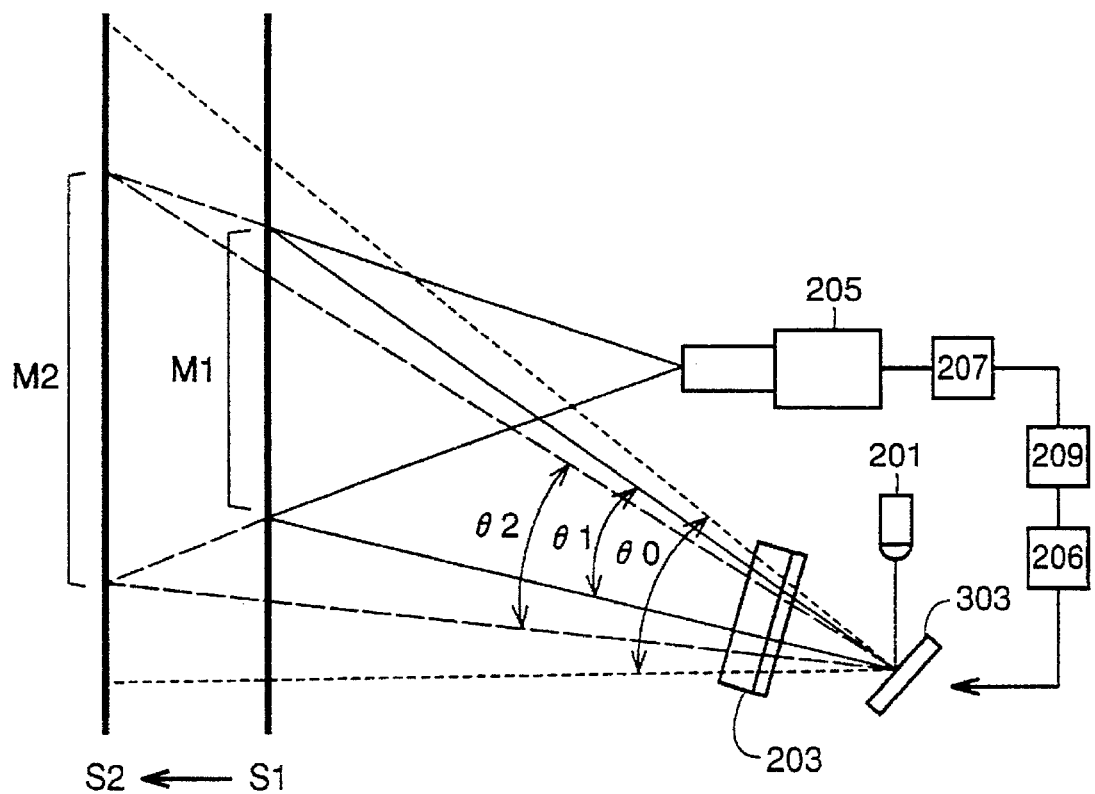
FIG. 68 shows a structure of an apparatus in accordance with the seventh embodiment of the present invention.
Figure 69:
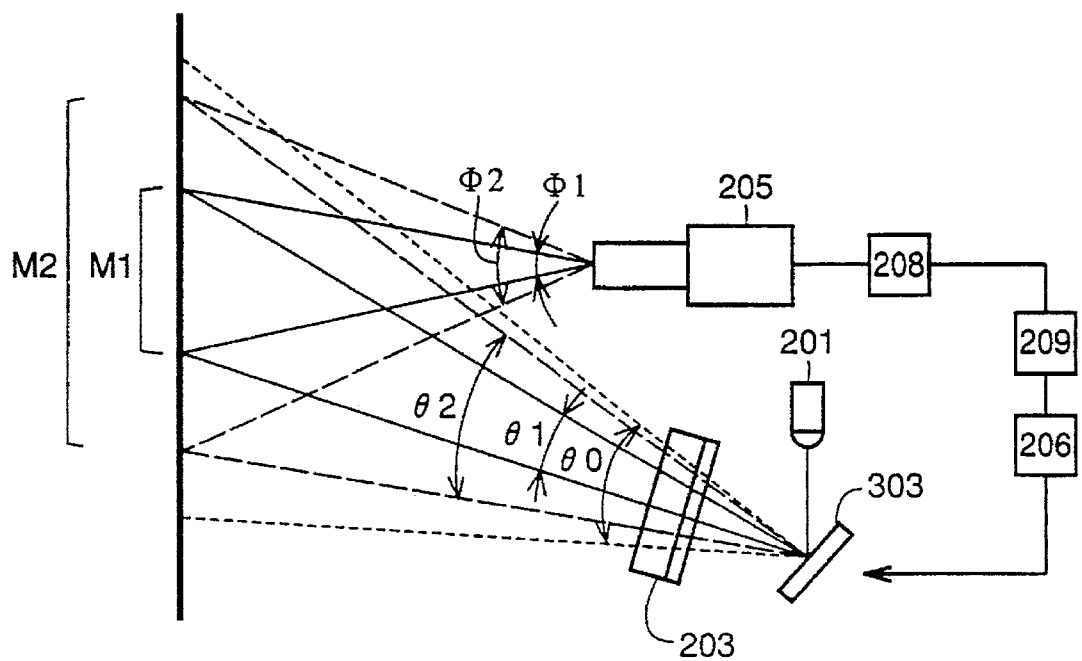
FIG. 69 shows a change in the photographing angle of view in accordance with the seventh embodiment of the present invention.

FIGS. 68 and 69 are illustrations of the seventh embodiment of the present invention. This embodiment is based on the fifth embodiment above, and differs in that the optical deflecting apparatus 202 is not driven for changing the scanning scope. FIG. 68 shows an example in which the distance to the object is changed, and FIG. 69 shows the change in the sensing angle of view, which correspond to FIGS. 60 and 61 of the fifth embodiment, respectively. For controlling the scanning speed, equations given above can be directly used.

Table 1 below shows apparatuses for actually controlling the scanning scope and the scanning speed in the third to fifth and seventh embodiments.

TABLE 1

| Embodiment | FIG. | Control of Scanning Scope | | Control of Scanning Speed |
|---|---|---|---|---|
| | | Direction | Start-End | |
| 3rd Embodiment | FIG. 58 | 207 | 201 | 202 |
| 4th Embodiment | FIG. 59 | 307 | 201 | 202 |
| 5th Embodiment | FIG. 60 | 302 | 201 | 302 |
| 7th Embodiment | FIG. 68 | NONE | NONE | 303 |

Next, the problem that the number of pixels receiving the light on the light receiving element changes when the sensing angle of view changes while the width of slit shaped light is kept constant, will be discussed.

Figure 70:
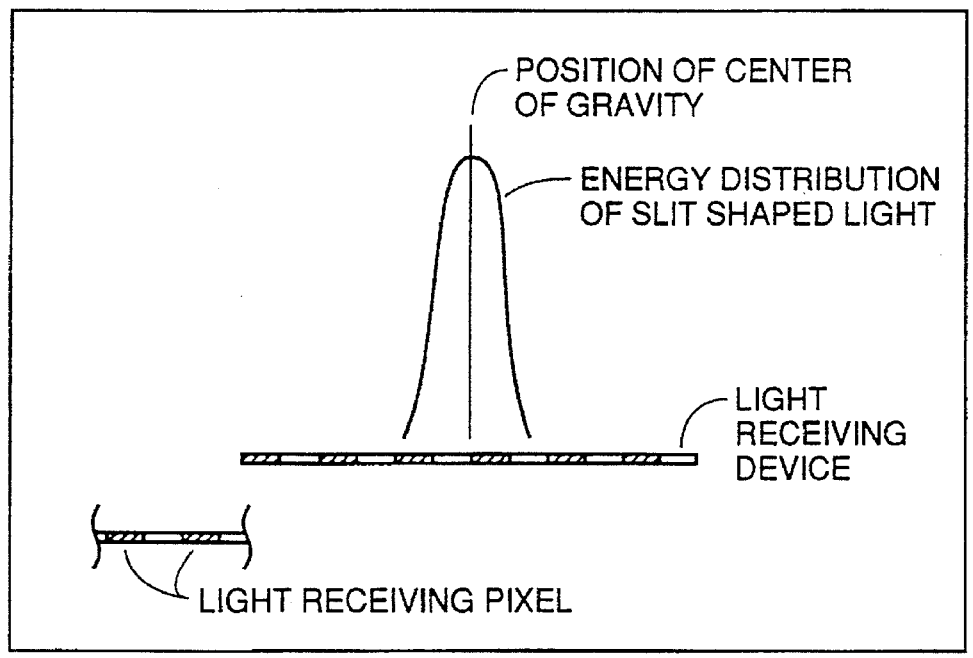
FIG. 70 shows a object caused by the difference in received light distribution of the slit shaped light in accordance with the seventh embodiment of the present invention.
Figure 71:
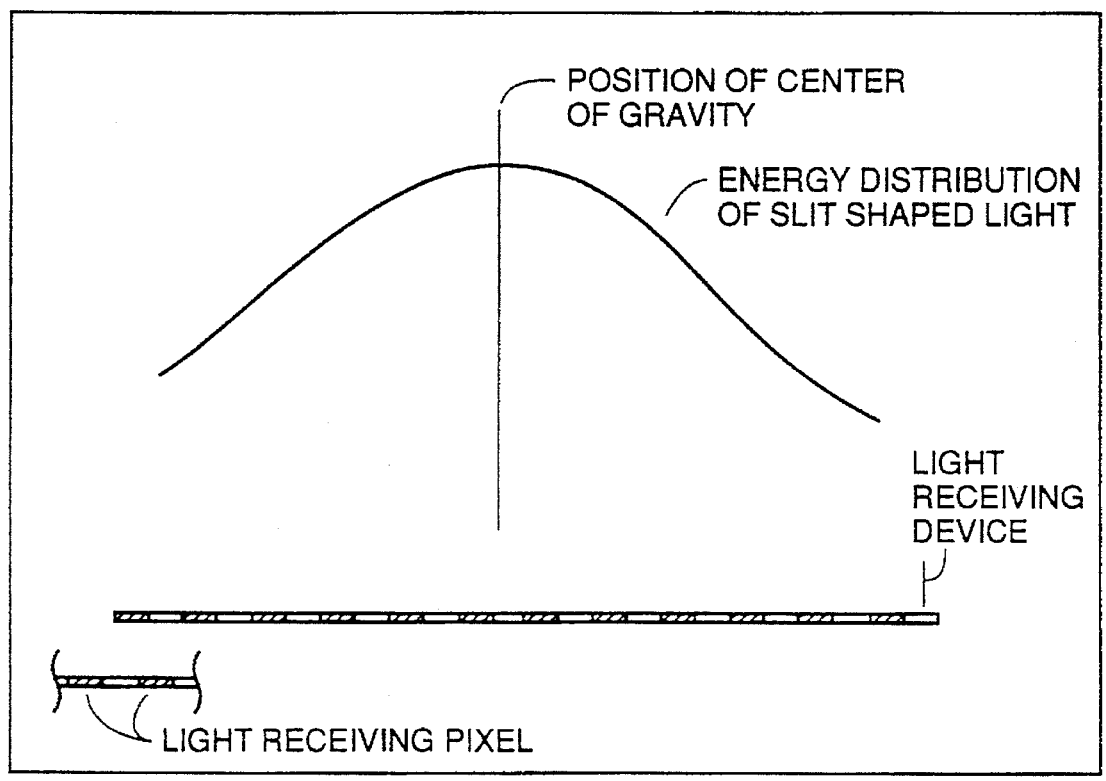
FIG. 71 shows a object caused by the difference in received light distribution of the slit shaped light in accordance with the seventh embodiment of the present invention.

In order to detect the position of the slit with high accuracy, it is preferable that the width of the slit viewed by the sensingsystem and the distribution of light intensity are always kept constant. It is possible to calculate the centroid of the slit shaped light in the widthwise direction when the width of the slit shape light changes. However, since the width of the slit varies dependent on the angle of view, the precision in calculating the centroid, that is the precision in measurement, would also be dependent on the angle of view, which is not preferable. Assume that the slit shaped light has approximately Gaussian distribution, for example. Then, the precision in calculating the centroid is poor when the slit shaped light is narrow and the number of pixels receiving the light beam is too small (FIG. 70), and the precision in calculating the centroid is also poor when the slit shaped light beam is too wide and the number of pixels receiving the light is too many (FIG. 71). Therefore, the width of the slit shaped light should preferably have a constant width of several pixels on the light receiving device, regardless of the angle of field of the light receiving lens.

For example, when the sensing region changes from region A to region B of FIG. 72 by the zooming operation of the light receiving lens while the width of the slit shaped light does not change in relation to the change of the angle of view, the light receiving region on the light receiving plane such as the area sensor would be changed from the state of FIG. 73(a) to FIG. 73(b) (Quantatively, it would be changed by the same amount as the zooming ratio). Consequently, the number of light receiving pixels in the width direction changes, resulting in variation of precision in measurement dependent on the angle of view. If the zooming ratio is large, there would be an angle of view at which measurement becomes impossible.

There is also a problem generated as the sensing angle of view changes in the longitudinal direction of the slit shaped light. For example, when the sensing region is changed from region A to region B in FIG. 70, the slit shaped light adjusted to illuminate the region A appropriately would illuminate the region B as well as unnecessary region surrounding the region B, which is wasteful.

Figure 74:
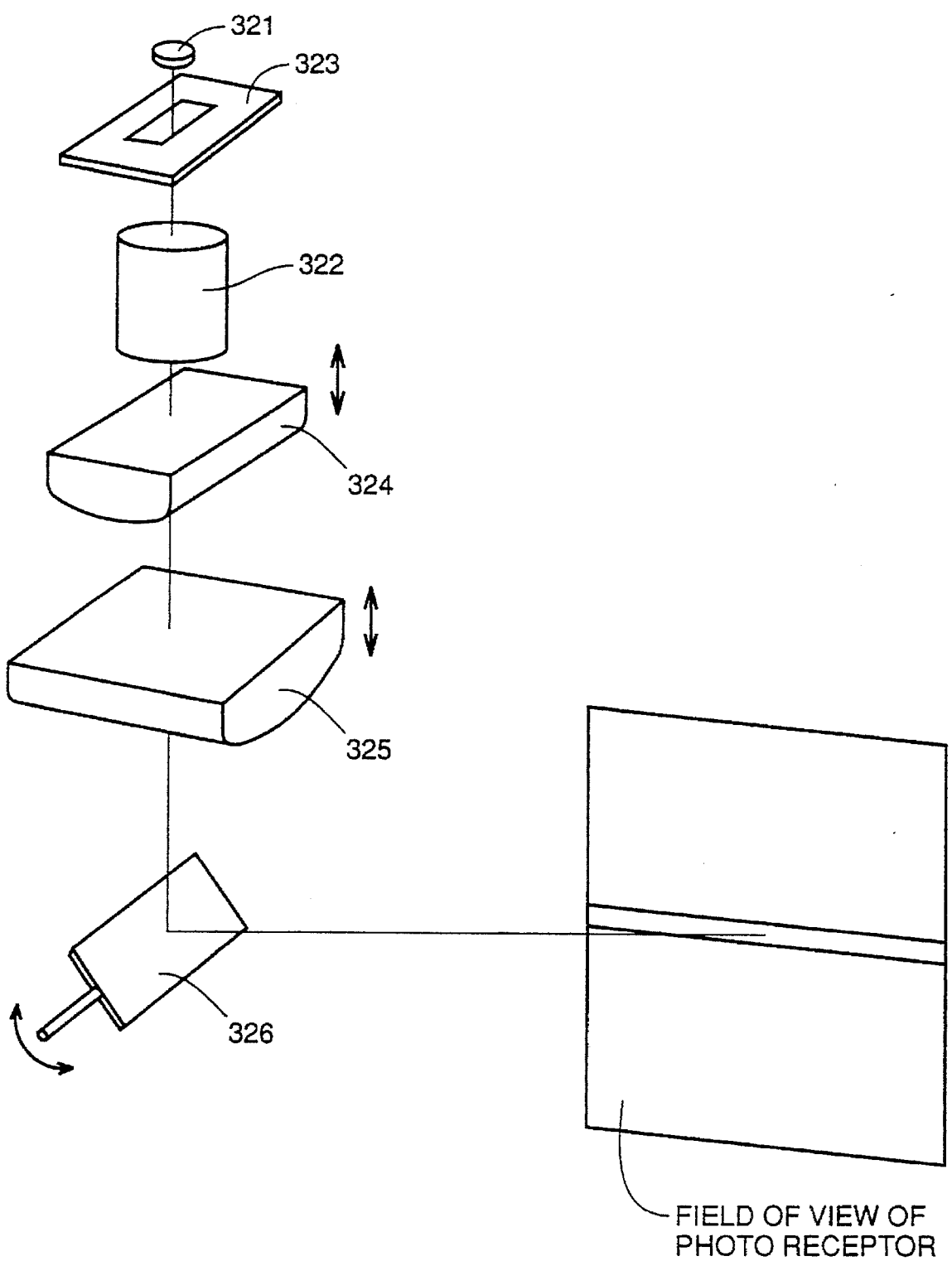
FIG. 74 shows a structure of an apparatus in accordance with an eighth embodiment of the present invention.

FIG. 74 shows an eighth embodiment of the present invention. Referring to FIG. 74, a collimator lens 22 is provided below a light source (hereinafter referred to as LD) 21 such as a semiconductor laser, for receiving the luminous flux from the LD and emitting the luminous flux with a prescribed angular extension near parallel flux. A mask 23 regulates the luminous flux incident on the collimator lens. The mask intercepts light beam out of the Gaussian distribution, from the light beam emitted from the laser light source. Consequently, a light beam of which light intensity has Gaussian distribution is obtained, and hence the received light also comes to have approximately Gaussian distribution.

Lenses 324 and 325 change the length and the width of the projected slit shaped light, and a cylindrical lens (A) 324 has curvature only in one direction. A cylindrical lens (B) 325 has curvature in a direction orthogonal to the direction of curvature of cylindrical lens (A) 324. By using two or more cylindrical lenses, the slit shaped light can be readily generated of which width and length can be freely controlled. More specifically, the collimeter lens monotonously changes the diameter of the emitted luminous flux in the direction of the optical axis, so that when the position of the cylindrical lens is changed in the direction of the optical axis, the incident height to the cylindrical lens changes, and hence the shape of the slit shaped light can be changed. Therefore, the shape of the slit shaped light, that is width and length can be arbitrarily controlled by a simple structure.

Figure 75:
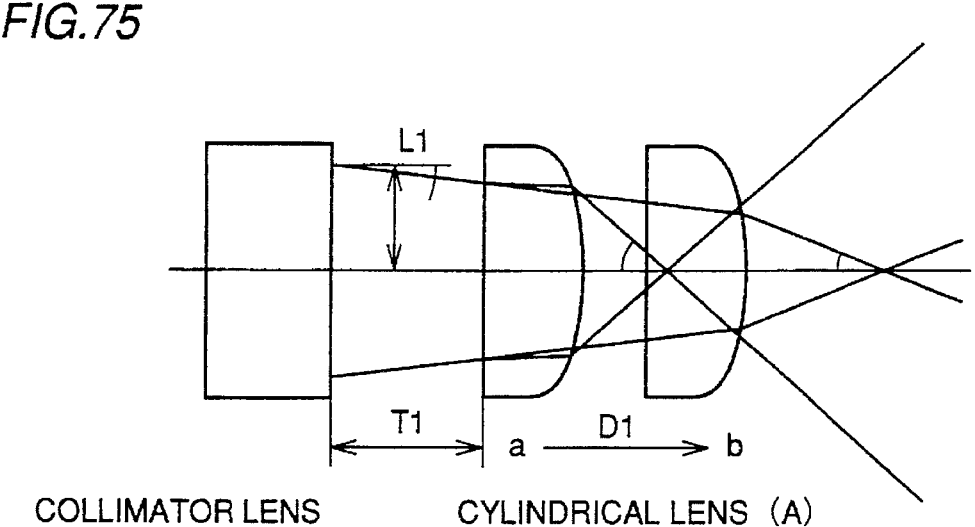
FIG. 75 shows the reason why the width of the slit shaped light changes in the eighth embodiment of the present invention.

For example, when the position of cylindrical lens A changes from position a to position b of FIG. 75 by the distance D1, the incident height to the cylindrical lens A and the incident angle to the curved surface C1 of the light beam L1 (outermost light beam of the emitted luminous flux) emitted at an angle δ from the collimator lens changed, and hence the emission angle of cylindrical lens A changes from an angle θa1 to θa2 with respect to the optical axis. The same applies to the cylindrical lens B. Therefore, by driving the cylindrical lenses (A) and (B) in the direction of the optical axis, the shape of the slit shape light on the object can be changed to an arbitrary shaped.

The curvature of each cylindrical lens is determined based on the amount of driving of the cylindrical lens and the ratio of change of the shape of the slit shaped light as it is driven. At this time, the distance between the collimator lens and the cylindrical lens and the emission angle of the luminous flux from the collimator lens may preferably be referred to as parameters, so as to facilitate control of driving two cylindrical lenses. For example, when the proportion of driving gears of two cylindrical lenses are selected to be the same, the two lenses can be driven by one driving source, enabling reduction in size of the apparatus and reduction in power consumption. The two cylindrical lenses are each held in a holder (not shown), and the holder is connected to the driving source through driving means such as a ball-like screw. A rack and a pinion or a cam may be used as the driving means.

For example, optical scanning means 326 such as a galvano mirror is arranged close to the object in the optical path. By this arrangement, highly linear slit shaped light can be projected, regardless of the direction angle of the projected slit shaped light. By contrast, if the cylindrical lens is arranged nearer to the object than the optical scanning means and the cylindrical lens has general shape, end portions of the slit shaped light may possible be deformed, dependent on the angle of projection. In order to avoid such a problem, the shape of the cylindrical lens must be arcuate with the start point of scanning being the center, resulting in larger lens and larger apparatus as a whole. Therefore, the arrangement of the optical system in accordance with this embodiment realizes reduction in size of the cylindrical lens and of the three-dimensional measuring apparatus. The light optical scanning means may be a rotary polygon mirror.

In the present invention, prior to measurement of the three-dimensional shape, the image obtained at the light receiving device is displayed on a monitor and framing of the image is performed. During framing, the operator monitors the image and changes the direction of the measuring apparatus, and position and focal distance of the light receiving lens. When the focal length (that is, sensing angle of view) of the light receiving lens is changed by zooming, a signal is transmitted from an angle of view detecting means detecting the change in the angle of view based on the position of the light receiving lens to the driving amount control portion. Based on the transmitted signal, the driving amount control portion calculates the amount of driving cylindrical lenses (A) and (B), provides a driving signal, and drives the cylindrical lenses.

Figure 76:
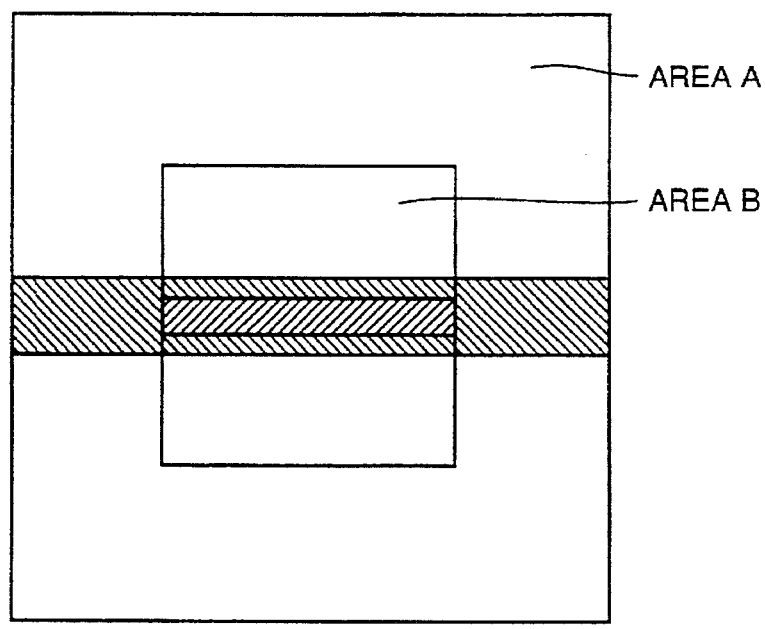
FIG. 76 is an illustration showing an example in which the width of the slit shaped light changes in the eighth embodiment of the present invention.
Figure 77:
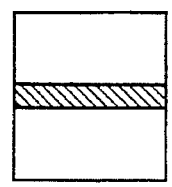
FIG. 77 is an illustration showing an example in which the width of the slit shaped light changes in the eighth embodiment of the present invention.

By this method, the shape of the beam can be optimized without troublesome operation by the user. For example, when the magnification changes from β1 (region A of FIG. 76) to β2 (region B of FIG. 76) by changing the angle of view of the light receiving lens, the cylindrical lenses A and B are driven such that the width W and length L of the slit shaped light attain W×(β1/β2) and L×(β1/β2), that is, the values before zooming are multiplied by β1/β2. As a result, the width and length of the slit on the light receiving device are always kept constant regardless of the zooming of the light receiving lens, as shown in FIG. 77. Therefore, three-dimensional shape can be measured while there is hardly a variation in precision caused by zooming.

When the light receiving lens has high magnification rate, the change in size of the slit shaped light is also large.

Figure 78:
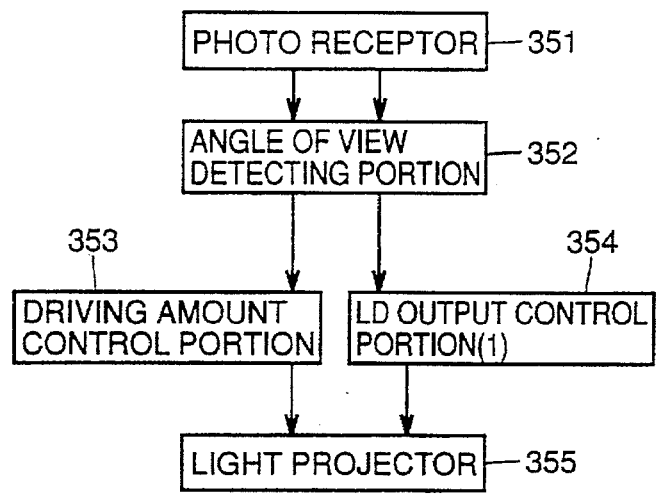
FIG. 78 is a block diagram showing an example of an exposure amount adjusting portion in accordance with the eighth embodiment of the present invention.
Figure 79:
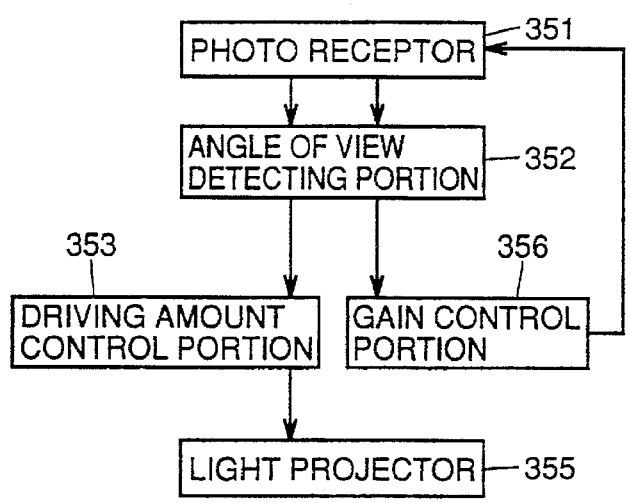
FIG. 79 is a block diagram showing another example of the exposure amount adjusting portion in accordance with the eighth embodiment of the present invention.
Figure 80:
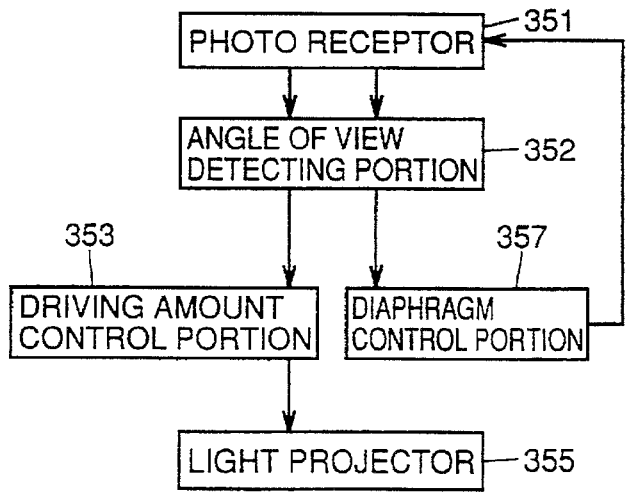
FIG. 80 is a block diagram showing another example of the exposure amount adjusting portion in accordance with the eighth embodiment of the present invention.
Figure 81:
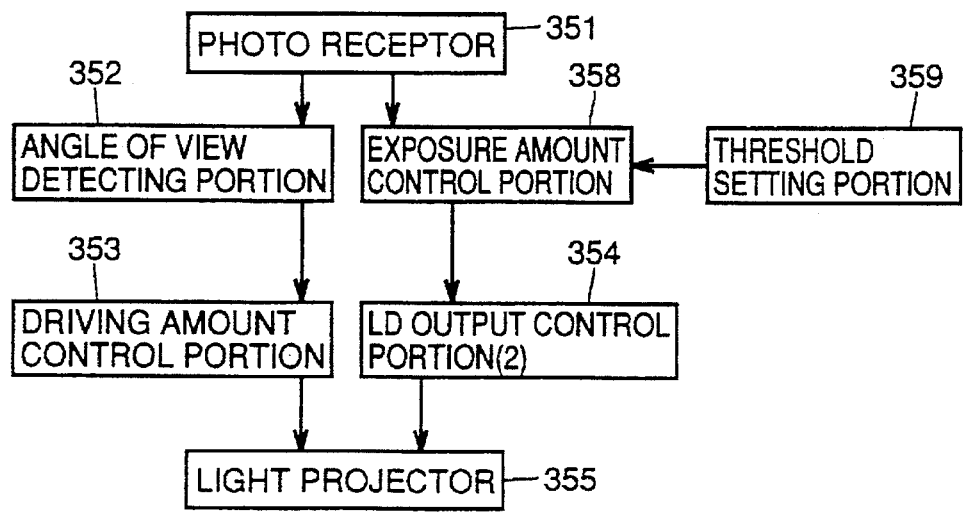
FIG. 81 is a block diagram showing another example of the exposure amount adjusting portion in accordance with the eighth embodiment of the present invention.

Therefore, when LD having a prescribed constant output is used, the change in the amount of exposure at the light receiving device is also large. Therefore, exposure amount adjusting means for adjusting the amount of exposure becomes necessary. In this embodiment (FIG. 78), the amount of exposure is adjusted by an LD output control portion 1. For example, when the magnification of the sensingsystem changes from β1 to β2 by β12 (=β2/β1) and the area of the slit shaped light changes by the square of (1/β12), the amount of light on the light receiving device become square times (1/β12). Therefore, in the present embodiment, when magnification β12 is calculated from the output of the angle of view detecting portion 352, the LD output is controlled by the LD output control portion (1) 354 so that the LD output attains square times (β12), as the necessary amount of exposure is square times (β12) before the change of the angle of view. By this method, the amount of exposure can be adjusted without any additional mechanical structure, and therefore it is not expensive. Further, even when the light receiving lens for the slit shaped light is also used as a light receiving lens for framing, the amount of exposure can be adjusted independent from the amount of exposure at the light receiving device for framing, and therefore measurement can be done with optimal amount of exposure.

As a modification of the exposure amount adjusting means, a gain control portion 356 for calculating and controlling the gain of the light receiving device which is necessary for obtaining appropriate amount of exposure from the output of the angle of view detecting portion may be provided at the light receiving device. The calculation of the gain is as follows.

For example, when the magnification changes from β1 to β2 by β12 (=β2/β1) and the area of the slit shaped light changes square times (1/β12), then light intensity on the light receiving device is square times (1/β12). Therefore, the gain is controlled by the gain control portion 356 so that the gain becomes square times (β12) of the value before the change of the angle of view. By this method, the gain can be adjusted without any additional mechanical structure, and therefore it is inexpensive. Further, even when the light receiving lens for the slit shaped light is also used as the light receiving lens for framing, adjustment can be performed independent from the amount of exposure at the light receiving device for framing, and therefore measurement can be done with optimal amount of exposure.

As another modification of the exposure amount adjusting means, a diaphragm may be provided on the entrance side of the light receiving element, and a diaphragm control portion for calculating and controlling the amount of stepping down of the diaphragm necessary for obtaining the appropriate amount of exposure from the output of the angle of view detecting portion 352 may be provided at the light receiving apparatus. For example, when the magnification changes from 1 to 2 by 12 (=β2/β1) and the area of the slit shaped light changes square times (1/β12), the amount of light on the light receiving device becomes square times (1/β12). Therefore, the calculated amount of stepping down of the diaphragm is the value before the change of the angle of view times (β12), in terms of the area of opening.

As a further modification of the exposure amount adjusting means, an amount of exposure detecting portion 358 for determining whether or not the amount of exposure at the light receiving device is lower than the threshold values set at a threshold value setting portion may be provided, and when it is determined that the amount of exposure is lower than the threshold value, the output of LD may be controlled so that the LD output exceeds the threshold value. By this method, the amount of exposure can be adjusted without any additional mechanical structure, and therefore it is not expensive. Even when the light receiving lens for the slit shaped light is also used as the light receiving lens for framing, the adjustment can be carried out independent from the amount of exposure for the light receiving device for framing, and therefore measurement can be done with optimal amount of exposure.

Figure 82:
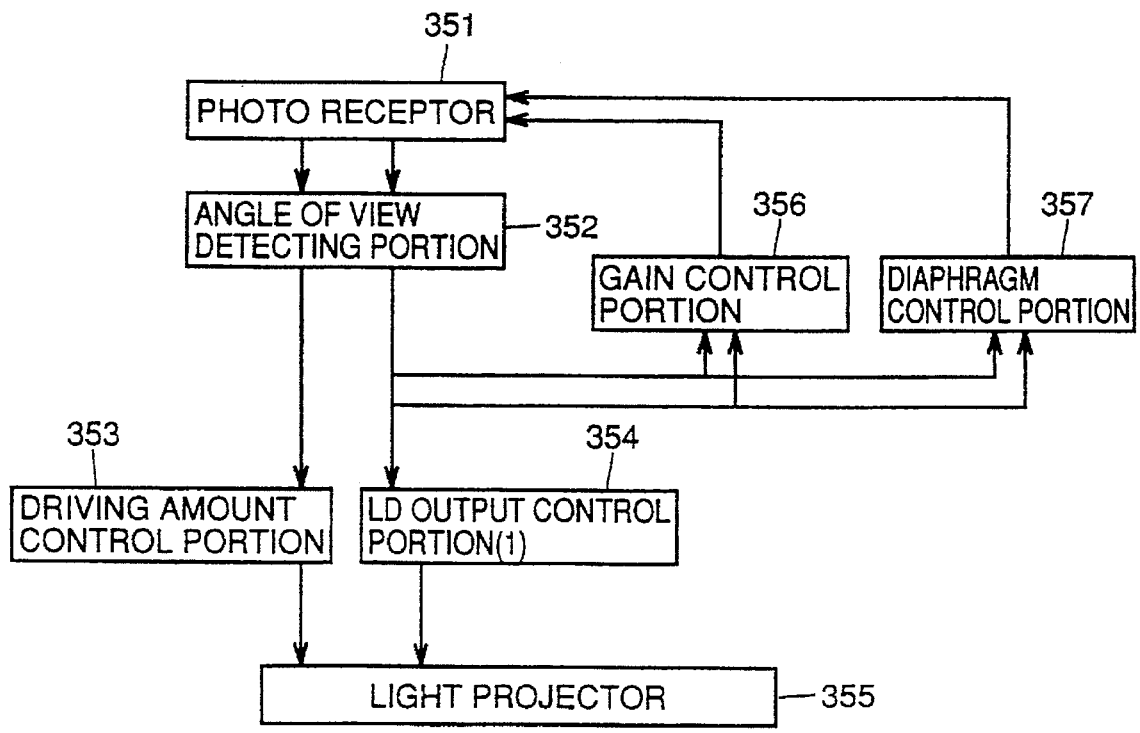
FIG. 82 is a block diagram showing another example of the exposure amount adjusting portion in accordance with the eighth embodiment of the present invention.

One of the above described several means for adjusting amount of exposure may be used by itself, or some of these means may be used in combination. FIG. 82 is a flow chart showing an operation when LD output control portion 1, the gain control portion and the diaphragm control portion are provided as means for adjusting the amount of exposure.

Though two cylindrical lenses are used in the eighth embodiment, a structure employing an anamorphic lens is also possible. In this case, the degree of freedom is reduced compared with the example using two or more cylindrical lenses. However, by arranging a beam expander having cylindrical axis in the same direction as either of the cylindrical lenses between the collimator lens and the anamorphic lens, a desired projection angle is obtained using h and γ of FIG. 75 as parameters. By this method, the number of cylindrical lenses can be reduced to 1, and only one driving portion and only one driving source are necessary. Therefore, the apparatus can be made compact and the cost of manufacturing can be reduced.

Figure 83:
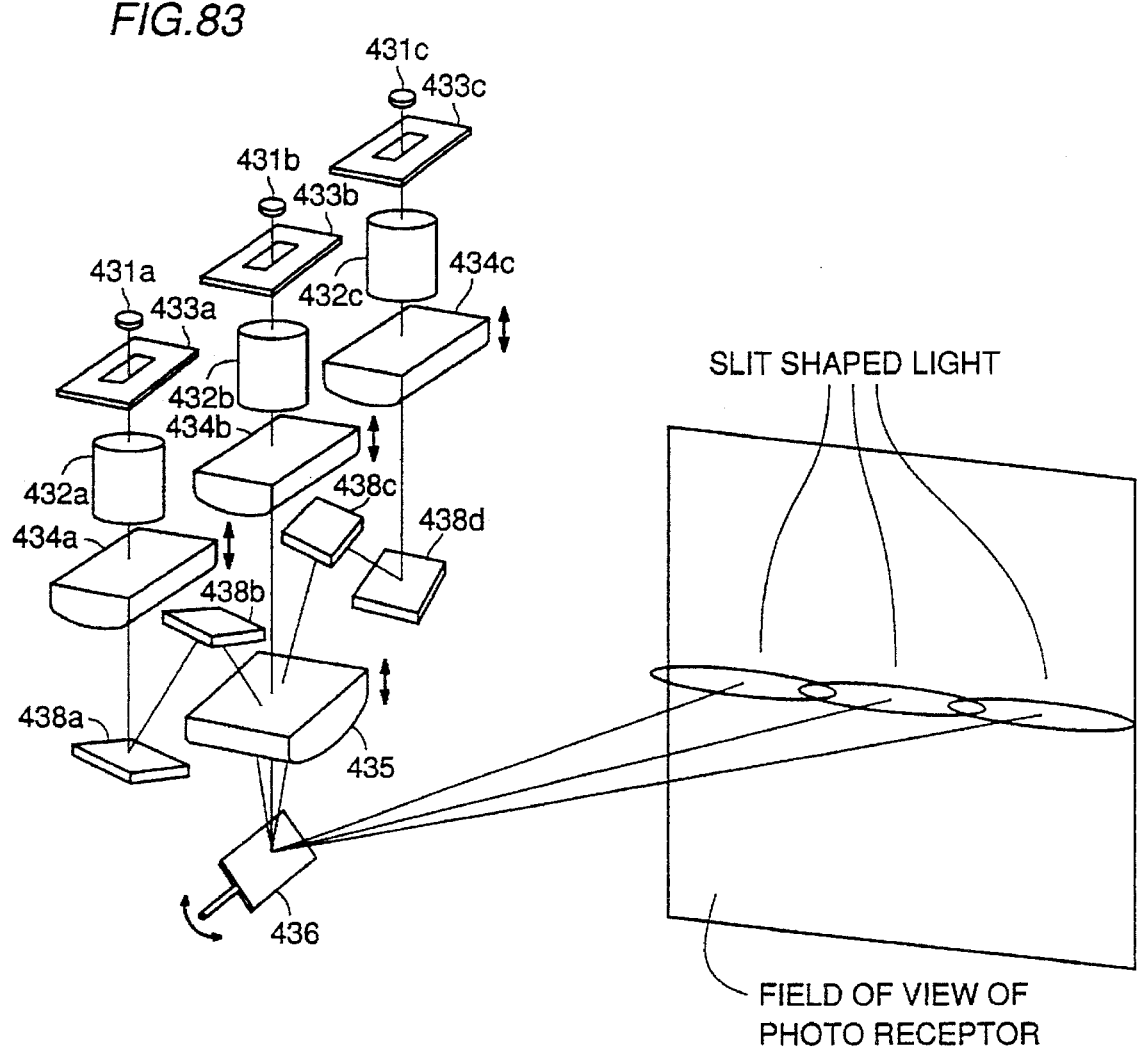
FIG. 83 shows a structure of an apparatus in accordance with the ninth embodiment of the present invention.
Figure 84:
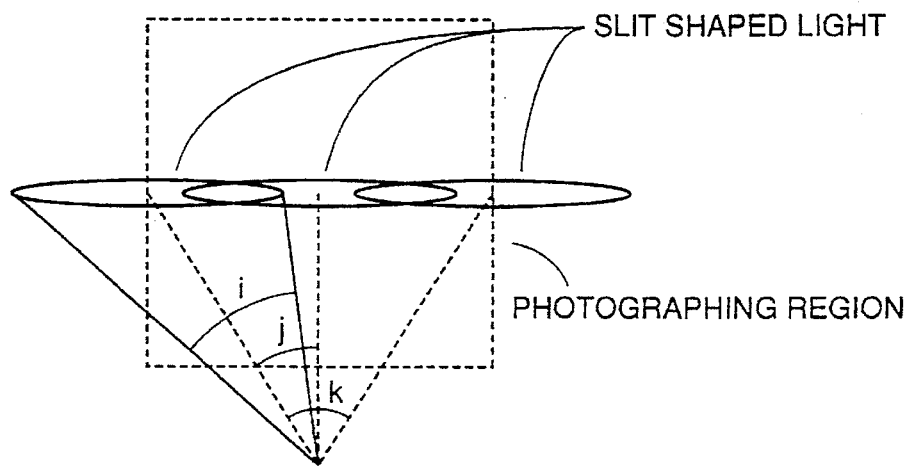
FIG. 84 shows one slit shaped light formed by three LDs in accordance with the ninth embodiment of the present invention.

FIG. 83 shows a ninth embodiment of the present invention. Compared to the eighth embodiment, in th ninth embodiment, there are three light emitting portions 31, three collimator lenses 32, three masks 33 and three cylindrical lenses (A) 34. The light beam emitted from three light emitting portions 431a to 431c are adapted such that the light beam passed through the cylindrical lens (b) 435 and then projected as one slit. Therefore, only one cylindrical lens 435 is sufficient, and the cost can be reduced and adjustment is simple. Since the beams are turned to one slit shaped light after passing through the cylindrical lens 435, only one optical scanning means 436 is sufficient, and therefore the number of parts can be reduced, the size of the apparatus can be reduced and the manufacturing cost can also be reduced. Referring to FIG. 34, the relation between the extension angle i in the longitudinal direction of the slit after the passage through cylindrical lens (B) and the angle j provided by main axis of adjacent slits is maintained such that part of each slit are overlapped on the plane of projection irradiated with the slit shaped light.

Figure 85:
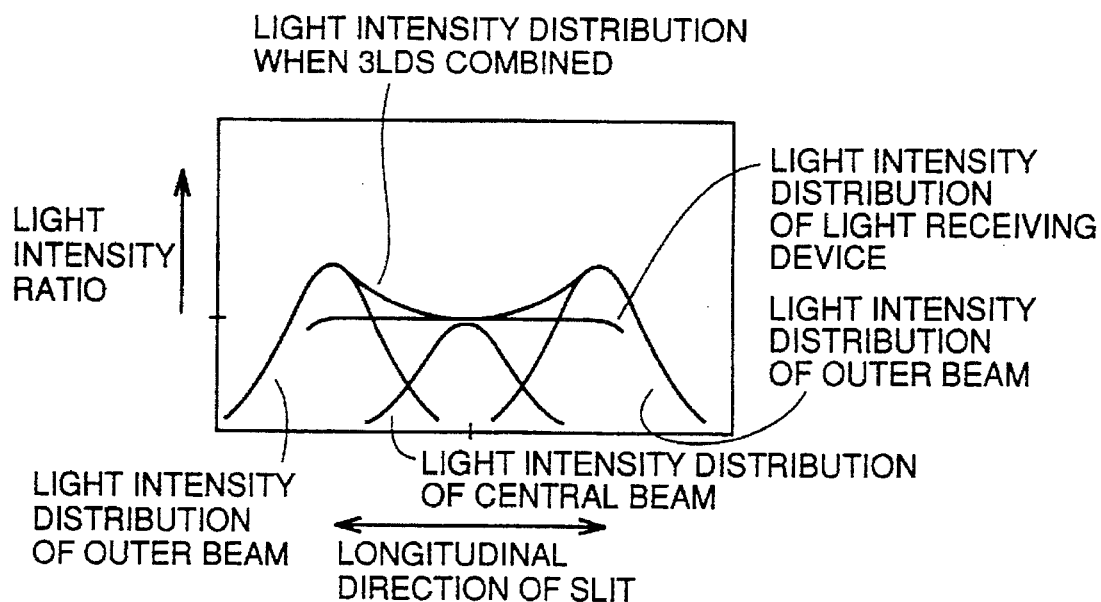
FIG. 85 shows distribution of light intensity in the longitudinal direction of the slit shaped light in accordance with the ninth embodiment of the present invention.

Assuming that the beam intensity has Gaussian distribution, light intensity with outer portion having higher intensities such as shown in FIG. 85 can be obtained by adjusting the angle k formed by outer two beams is close to the angle of view of the field of view and by adjusting the ratio of outputs of the outer beams and the central beam. By this intensity distribution, reduction of the amount of light at the periphery derived from cosine fourth law and shading after passage through the light receiving lens can be compensated for. As a result, three-dimensional shape can be measured with high precision even at the edges of the sensing region.

Figure 86:
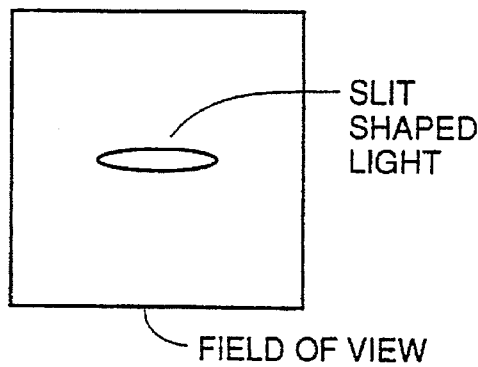
FIG. 86 shows the slit shaped light formed by one LD in accordance with the ninth embodiment of the present invention.
Figure 87:
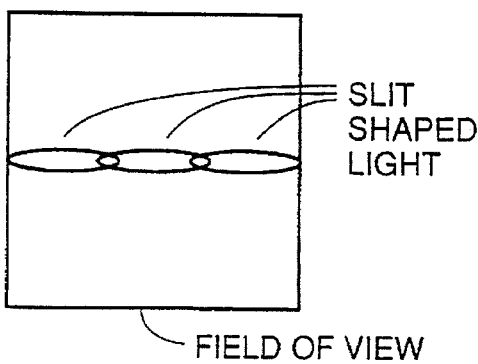
FIG. 87 shows a slit shaped light formed by three LDs in accordance with the ninth embodiment of the present invention.
Figure 88:
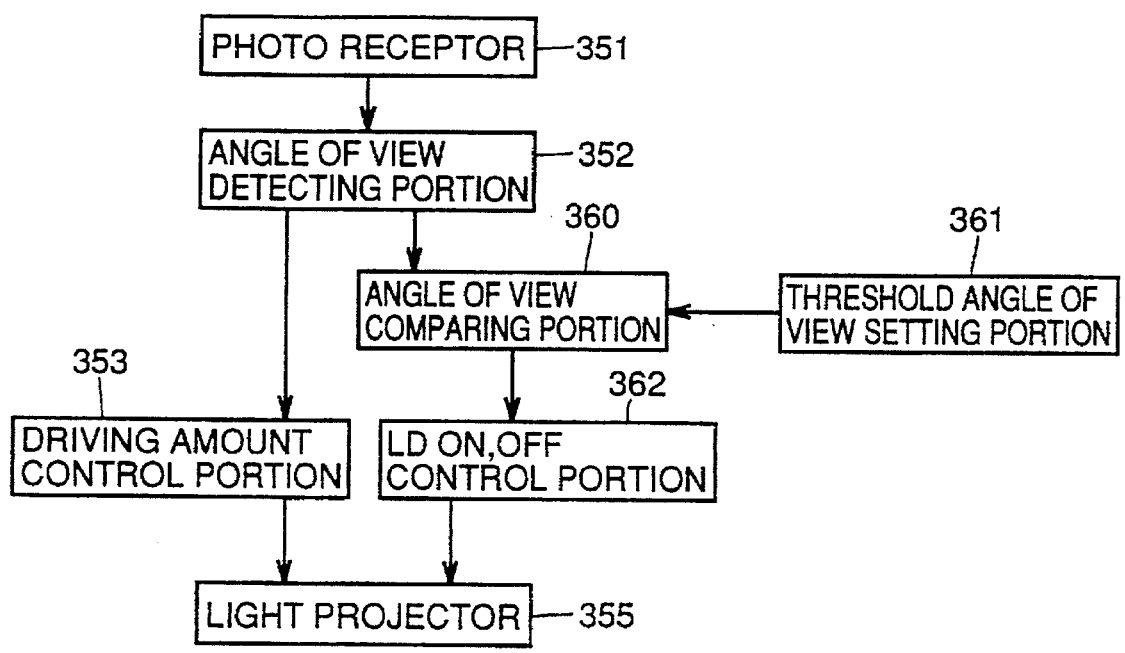
FIG. 88 is a block diagram showing one example of the exposure amount adjusting portion in accordance with the ninth embodiment of the present invention.

This embodiment includes, as shown in FIG. 86, a threshold angle of view setting portion for setting the threshold angle of view at which the field of view cannot be covered by projection by one slit, an angle of view comparing portion for comparing the set threshold angle of view and the value of the angle of view from the angle of view detecting portion, and an LD on/off control portion for controlling on/off of three LDs. For example, when it is found that one LD is not enough to cover the field of view as a result of the comparison, three LDs are all turned on by the LD on/off control portion, so that light is projected to the entire field of view for measurement (FIG. 87). By this embodiment, the driving portion can be eliminated, and therefore the power consumption can be reduced, manufacturing cost can be reduced as the number of part is reduced, and the size of the apparatus can be made smaller. FIG. 88 is a flow chart of operation of this embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system, comprising:
a light projector which projects light toward an object and scans the object with the light, wherein a scanned area where the object is scanned with light can be varied;
a sensor, being apart from the light projector, which receives the light reflected on the object, wherein a sensed area is varied; and
a controller which controls the light projector so as to automatically change the scanned area on the basis of the current sensed area.

2. A system as claimed in claim 1, wherein the sensed area is determined by detecting a distance to the object from the system.

3. A measuring system as claimed in claim 2, further comprising an auto focus sensor which detects the distance to the object from the system.

4. A measuring system as claimed in claim 1, further comprising an object lens located in front of the sensor, and wherein the sensed area is determined by detecting a sensing angle of view of the object lens.

5. A measuring system as claimed in claim 4, further comprising an encoder which detects the sensing angle of view of the object lens.

6. A measuring system as claimed in claim 1, wherein the controller adjusts the scanned area by changing a projected direction of the light.

7. A system as claimed in claim 1, wherein the controller adjusts the scanned area by controlling a time period when the light projector projects the light.

8. A measuring system as claimed in claim 1, wherein the light projector scans the object with a slit shaped light, and the system measures a three-dimensional shape of the object on the basis of output signals from the sensor.

9. A system, comprising,
a light projector which projects light toward an object and scans the object with the light;
a sensor, being apart from the light projector, which receives the light reflected on the object, wherein a sensed area is varied; and
a controller which controls the light projector so as to automatically change a scanning operation on the basis of the current sensed area.

10. A system as claimed in claim 9, wherein the sensed area is determined by detecting a distance to the object from the system.

11. A system as claimed in claim 10, further comprising an auto focus sensor which detects the distance to the object from the system.

12. A system as claimed in claim 9, further comprising an object lens located in front of the sensor, and wherein the sensed area is determined by detecting a sensing angle of view of the object lens.

13. A system as claimed in claim 12, further comprising an encoder which detects the sensing angle of view of the object lens.

14. A system as claimed in claim 9, wherein the controller adjusts the scanning operation by adjusting a scanned area scanned by the light projector.

15. A system as claimed in claim 9, wherein the controller adjusts the scanning operation by adjusting a scanning speed of the light projector.

16. A system as claimed in claim 9, wherein the light projector scans the object with a slit shaped light, and the system measures a three-dimensional shape of the object on the basis of output signals from the sensor.

17. A system as claimed in claim 16, wherein the controller adjusts the scanning operation by adjusting a size of the slit shaped light.

18. A system, comprising:
a light projector which projects a slit shaped light toward an object and scans the object with the slit shaped light;
a sensor, being apart from the light projector, which receives the slit shaped light reflected off the object; and
a controller which controls the light projector so as to adjust a size of the slit shaped light off the basis of a sensed area by the sensor.

19. A system as claimed in claim 18, wherein the controller further controls an output of the light projector on the basis of the sensed area.

20. A system as claimed in claim 18, wherein the controller further controls gain of the sensor on the basis of the sensed area.

21. A system as claimed in claim 18, further comprising a diaphragm in front of the sensor, and wherein the controller further controls a size of the diaphragm on the basis of the sensed area.

22. A system as claimed in claim 18, wherein the controller further controls an output of the light projector on the basis of sensed amount of the sensor.

23. A system as claimed in claim 18, further comprising an object lens located in front of the sensor, and wherein the sensed area is determined by detecting a sensing angle of view of the object lens.

24. A system as claimed in claim 23, further comprising an encoder which detects the sensing angle of view of the object lens.

25. A system as claimed in claim 18, wherein the controller adjusts the size of the slit shaped light by changing a width of the slit shaped light.

26. A system as claimed in claim 18, wherein the controller adjusts the size of the slit shaped light by changing a length of the slit shaped light.

27. A system as claimed in claim 18, wherein the system measures a three-dimensional shape of the object on the basis of output signals from the sensor.

28. A system, comprising:
a light projector which projects a slit shaped light toward an object and scans the object with the slit shaped light;
an area sensor, being apart from the light projector, which receives the light reflected on the object, wherein its sensed area is varied depending on a distance from the area sensor to the object;
a distance measuring device which measures a distance to the object from the area sensor;
a first calculator which calculates a current sensed area of the area sensor on a basis of the measured distance to the object;

a controller which automatically changes a scanning operation of the light projector on the basis of the calculated current sensed area; and a second calculator which calculates a three-dimensional shape of the object on a basis of output signals from the area sensor.

29. A system as claimed in claim 28, wherein the controller changes the scanning operation by changing a scanned area by the light projector.

30. A system as claimed in claim 28, wherein the controller changes the scanning operation by changing a scanning speed of the light projector.

31. A system, comprising:

a projector which projects radiation toward an object and scans the object with the radiation;

a sensor, being apart from the projector, which receives the radiation reflected on the object, wherein its sensed area is varied; and a controller which automatically changes a scanning operation of the projector on a basis of a current sensed area.

32. A system comprising:

a light projector which projects a light toward an object;

an area sensor, being apart from the light projector, which receives the light reflected on the object, wherein its sensed area is varied depending on a distance to the object;

a distance measuring device which measures a distance to the object from the area sensor;

a first calculator which calculates the current sensed area of the area sensor on a basis of the measured distance to the object; and a controller which changes a projection area by the light projector on a basis of the calculated current sensed area.

* * * * *